(12) United States Patent
Oyasato et al.

(10) Patent No.: US 7,340,351 B2
(45) Date of Patent: Mar. 4, 2008

(54) EVALUATION SUPPORT APPARATUS AND METHOD FOR EVALUATION OF RECYCLABILITY/ENVIRONMENTAL LOAD

(75) Inventors: Naohiko Oyasato, Yokohama (JP); Toshimitsu Kumazawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 853 days.

(21) Appl. No.: 10/607,000

(22) Filed: Jun. 27, 2003

(65) Prior Publication Data

US 2004/0054516 A1    Mar. 18, 2004

(30) Foreign Application Priority Data

Jun. 28, 2002  (JP)  .............. 2002-190662
Jun. 28, 2002  (JP)  .............. 2002-190663

(51) Int. Cl.
*G01N 31/00* (2006.01)
(52) U.S. Cl. ...................................... 702/30
(58) Field of Classification Search .............. 702/30; 705/7; 700/97
See application file for complete search history.

(56) References Cited

U.S. PATENT DOCUMENTS 6,477,438 B1 *   11/2002  Sakai et al. .................. 700/97
2002/0099587 A1 *   7/2002  Kakihana et al. ............. 705/7

FOREIGN PATENT DOCUMENTS

| JP | 7-311792 | 11/1995 |
|---|---|---|
| JP | 10-222554 | 8/1998 |
| JP | 2000-105778 | 4/2000 |
| JP | 2000-189936 | 7/2000 |
| JP | 2000-348068 | 12/2000 |
| JP | 2001-005855 | 1/2001 |
| JP | 2001116662 A * | 4/2001 |
| JP | 2002-024303 | 1/2002 |
| JP | 2002-200477 | 7/2002 |
| KR | 2000-0014382 | 3/2000 |

OTHER PUBLICATIONS

Jun Fujimoto, et al., "Development of Environmental Total Solution System", 4th Environmental Engineering General Symposium '94 Collected Papers of Lectures, No. 940-23, Jul. 1, 1994, pp. 166-169 (with English abstract).

H. Y. Kang, et al., Proc. of the 2nd Int. Symp. on Environmentally Conscious Design and Inverse Manufacturing, pp. 309-314, "Recycling Oriented Design—A Case Study on House Appliances Using the Software Atroid", Dec. 11, 2001.

Y. Hiroshige, et al., Proc. of the 2nd Int. Symp. on Environmentally Conscious Design and Inverse Manufacturing, pp. 315-320, "Recyclability Evaluation Method (REM) and Its Applications", Dec. 11, 2001.

* cited by examiner

*Primary Examiner*—John Barlow
*Assistant Examiner*—Xiuqin Sun
(74) *Attorney, Agent, or Firm*—Oblon, Spivak, McClelland, Maier & Neustadt, P.C.

(57) ABSTRACT

A design support apparatus includes an evaluation unit that evaluates a recyclability of the product, using evaluation condition and parts/material data, an analysis unit that analyzes a factor obstructing the recyclability based on an evaluation result of the evaluating unit, and a display unit that displays a remedy against an obstruction factor provided as an analysis result of the analysis unit.

12 Claims, 45 Drawing Sheets

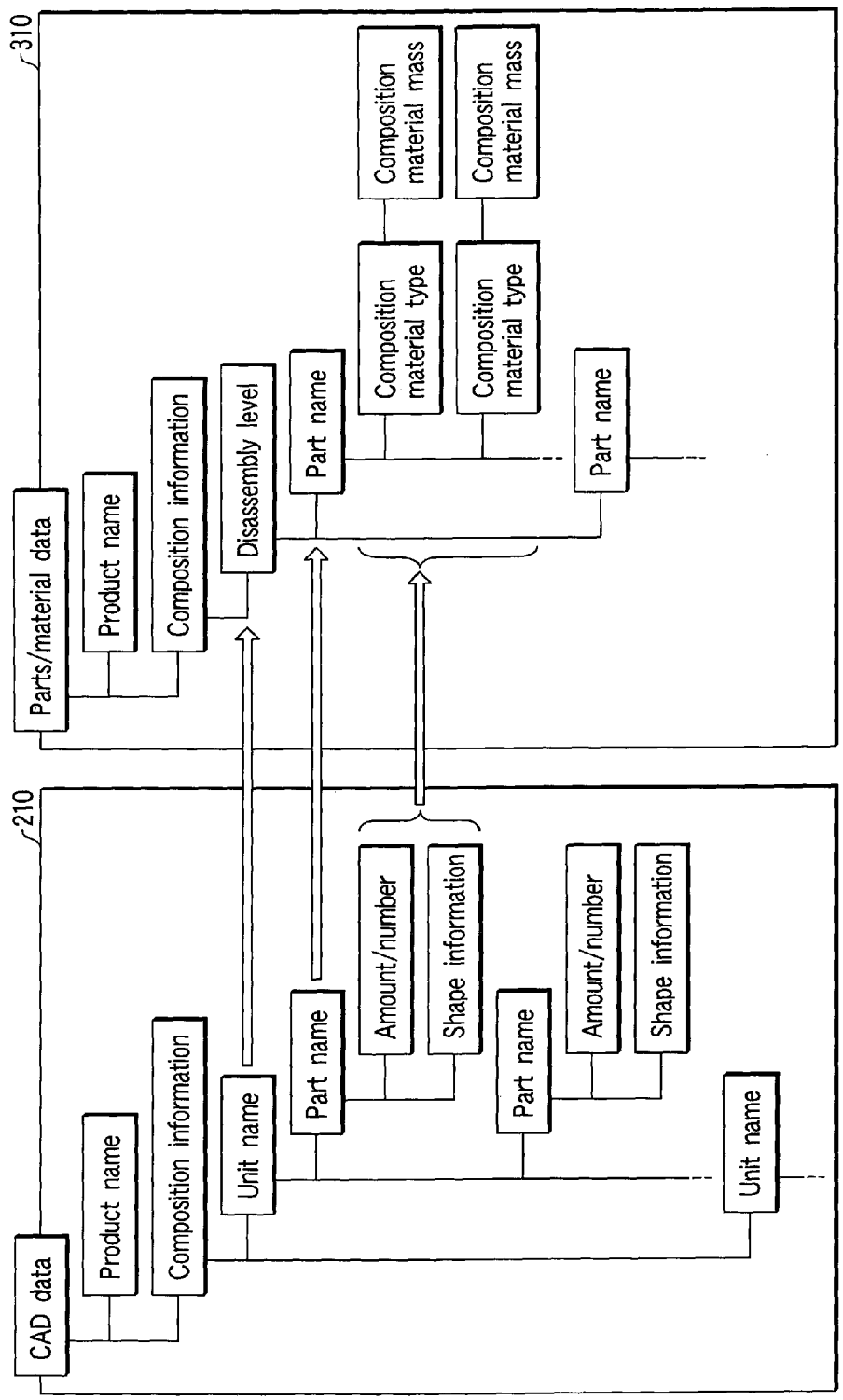
F I G. 3

Parts basic information database

| Part name | Composition material | | | |
|---|---|---|---|---|
| | | Material type | Mass (g) | Density (g/m³) |
| Part A | Metal | Metal (1-1-2)<br>Metal (1-1-3) | 250<br>20 | |
| Part B | Metal | Metal (2-2-1)<br>Metal (2-2-2) | | 10<br>20 |
| | | | | |

Parts/material database

Product name: Product 1

| Disassembly level | | | | | | | Raw material classification/g | | | |
|---|---|---|---|---|---|---|---|---|---|---|
| First disassembled part | | Second disassembled part | | Third disassembled part | | | Metal | | | |
| Article name | Weight /g | Article name | Weight /g | Article name | Weight /g | Metal 1 | Metal 2 | Metal 3 | Metal 4 |
| Part (1) |  | Part (1-1) |  | Part (1-1-1) | 100 |  | 60 | 40 |  |
|  |  |  |  | Part (1-1-2) | 250 | 250 |  |  |  |
|  |  |  | 380 | Part (1-1-3) | 30 | 20 |  |  |  |
|  |  | Part (1-2) |  | Part (1-2-1) | 400 |  |  |  |  |
|  |  |  |  | Part (1-2-2) | 200 |  |  |  | 10 |
|  |  |  |  | Part (1-2-3) | 50 |  | 50 |  |  |
|  |  |  | 700 | Part (1-2-4) | 50 |  | 50 |  |  |
|  |  | Part (1-3) |  | Part (1-3-1) | 1500 |  |  |  |  |
|  | 2780 |  | 1700 | Part (1-3-2) | 200 |  |  |  |  |
| Part (2) |  | Part (2-1) | 2000 |  | 2000 |  |  |  |  |
|  |  | Part (2-2) |  | Part (2-2-1) | 200 |  | 200 |  |  |
|  | 2300 |  | 300 | Part (2-2-2) | 100 | 20 |  | 10 |  |
| Part (3) |  | Part (3-1) | 100 |  | 100 |  |  |  |  |
|  | 300 | Part (3-2) | 200 |  | 200 |  | 200 |  |  |
| Total | 5380 |  | 5380 |  | 5380 | 290 | 560 | 50 | 10 |

FIG. 7A

| Plastic | | | | Others | | | | | | | |
|---|---|---|---|---|---|---|---|---|---|---|---|
| Resin 1 | Resin 2 | Resin 3 | Resin 4 | Glass 1 | Glass 2 | Glass 3 | Paper 1 | Paper 2 | Wood | Fiber | Fats |
| | | | | | | | | | | | |
| | | | | | | | | | | | |
| 10 | | | | | | | | | | | |
| 400 | | | | | | | | | | | |
| | 190 | | | | | | | | | | |
| | | | | | | | | | | | |
| | 1480 | 10 | | | | | 10 | | | | |
| | | | 200 | | | | | | | | |
| 1200 | 800 | | | | | | | | | | |
| | | | | | | | | | | | |
| | | | | 70 | | | | | | | |
| | | | | | | | | | | | 100 |
| | | | | | | | | | | | |
| 1610 | 2470 | 10 | 200 | 70 | 0 | 0 | 10 | 0 | 0 | 0 | 100 |

FIG. 7B

Impurity permissible dose of plastic
~Impurity content~

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1  | /// | 1.0 | 2.0 | 2.0 | 2.0 | 0.5 | 1.0 | 1.0 | 0.5 | 1.0 | 1.0 | 1.0 |
| Resin 2  | 1.0 | /// | 2.0 | 2.0 | 2.0 | 0.5 | 1.0 | 1.0 | 0.5 | 1.0 | 1.0 | 1.0 |
| Resin 3  | 1.0 | 1.0 | /// | 2.0 | 2.0 | 0.5 | 1.0 | 1.0 | 0.5 | 1.0 | 1.0 | 1.0 |
| Resin 4  | 1.0 | 1.0 | 2.0 | /// | 2.0 | 0.5 | 1.0 | 1.0 | 0.5 | 1.0 | 1.0 | 1.0 |
| Resin 5  | 1.0 | 1.0 | 2.0 | 2.0 | /// | 0.5 | 1.0 | 1.0 | 0.5 | 1.0 | 1.0 | 1.0 |
| Resin 6  | 1.0 | 1.0 | 2.0 | 2.0 | 2.0 | /// | 1.0 | 1.0 | 0.5 | 1.0 | 1.0 | 1.0 |
| Resin 7  | 1.0 | 1.0 | 2.0 | 2.0 | 2.0 | 0.5 | /// | 1.0 | 0.5 | 1.0 | 1.0 | 1.0 |
| Resin 8  | 1.0 | 1.0 | 2.0 | 2.0 | 2.0 | 0.5 | 1.0 | /// | 0.5 | 1.0 | 1.0 | 1.0 |
| Resin 9  | 1.0 | 1.0 | 2.0 | 2.0 | 2.0 | 0.5 | 1.0 | 1.0 | /// | 1.0 | 1.0 | 1.0 |
| Resin 10 | 1.0 | 1.0 | 2.0 | 2.0 | 2.0 | 0.5 | 1.0 | 1.0 | 0.5 | /// | 1.0 | 1.0 |
| Resin 11 | 1.0 | 1.0 | 2.0 | 2.0 | 2.0 | 0.5 | 1.0 | 1.0 | 0.5 | 1.0 | /// | 1.0 |
| Resin 12 | 1.0 | 1.0 | 2.0 | 2.0 | 2.0 | 0.5 | 1.0 | 1.0 | 0.5 | 1.0 | 1.0 | /// |

(Note) (second component weight/first component weight) × 100 [unit : %]

FIG. 11

Removal admissibility of plastic composite
~Discrimination/separation technique~

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1  | ///  | X    | X    | X    | X    | O    | X    | △    | O    | X    | X    | X    |
| Resin 2  | X    | ///  | X    | X    | X    | O    | X    | △    | O    | X    | X    | X    |
| Resin 3  | X    | X    | ///  | X    | X    | O    | X    | △    | O    | X    | X    | X    |
| Resin 4  | X    | X    | X    | ///  | X    | O    | X    | △    | O    | X    | X    | X    |
| Resin 5  | X    | X    | X    | X    | ///  | O    | O    | △    | O    | X    | X    | X    |
| Resin 6  | O    | O    | O    | O    | O    | ///  | O    | O    | X    | O    | O    | O    |
| Resin 7  | X    | X    | X    | X    | O    | O    | ///  | △    | O    | X    | X    | X    |
| Resin 8  | △    | △    | △    | △    | △    | O    | △    | ///  | O    | △    | △    | △    |
| Resin 9  | O    | O    | O    | O    | O    | X    | O    | O    | ///  | O    | O    | O    |
| Resin 10 | X    | X    | X    | X    | X    | O    | X    | △    | O    | ///  | X    | X    |
| Resin 11 | X    | X    | X    | X    | X    | O    | X    | △    | O    | X    | ///  | X    |
| Resin 12 | X    | X    | X    | X    | X    | O    | X    | △    | O    | X    | X    | ///  |

(Note)  O : Automatic screening technique is available
△ : Automatic screening technique is available, and screening technique depends on shape etc
X : Screening is difficult

FIG. 12

Compatibility of plastic
~Compatible polymer blend and polymer alloy using compatibiliser~

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1  |     | s   | c   | n   | c   | c   | c   | c   | c   | c   | n   | c   |
| Resin 2  | s   |     | n   | n   | c   | c   | c   | c   | c   | c   | c   | c   |
| Resin 3  | c   | n   |     | s,c | n   | c   | s   | n   | c   | n   | s,c | n   |
| Resin 4  | n   | n   | s,c |     | n   | n   | c   | n   | c   | c   | c   | c   |
| Resin 5  | c   | c   | n   | n   |     | n   | s   | n   | n   | c   | n   | c   |
| Resin 6  | c   | c   | s   | c   | n   |     | c   | c   | c   | c   | c   | c   |
| Resin 7  | c   | c   | c   | c   | n   | c   |     | c   | n   | n   | n   | n   |
| Resin 8  | c   | c   | c   | c   | c   | n   | n   |     | c   | c   | c   | n   |
| Resin 9  | c   | c   | c   | c   | n   | c   | c   | n   |     | c   | s   | n   |
| Resin 10 | c   | c   | n   | c   | c   | c   | c   | n   | s   |     | s   | n   |
| Resin 11 | n   | c   | s,c | c   | n   | n   | n   | n   | n   | n   |     | c   |
| Resin 12 | c   | c   | n   | c   | c   | c   | n   | n   | n   | n   | c   |     |

(Note)  s : Compatible polymer blend
c : Incompatible polymer blend with precedent of alloy using compatibiliser
n : No compatibility information

F I G. 13

Marketability of plastic composite
~Commercially available polymer blend~

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1  | ▨ | △ | ○ | X | △ | ○ | X | X | X | ○ | X | ○ |
| Resin 2  | △ | ▨ | X | △ | X | X | △ | X | X | X | X | ○ |
| Resin 3  | ○ | X | ▨ | △ | X | ○ | △ | X | ○ | X | ○ | X |
| Resin 4  | X | △ | △ | ▨ | X | X | △ | X | X | △ | X | X |
| Resin 5  | △ | X | ○ | X | ▨ | ○ | ○ | X | X | ○ | ○ | X |
| Resin 6  | ○ | X | △ | X | ○ | ▨ | ○ | ○ | ○ | X | ○ | ○ |
| Resin 7  | X | △ | X | △ | ○ | X | ▨ | X | X | X | X | X |
| Resin 8  | X | X | ○ | X | ○ | X | ○ | ▨ | △ | X | X | X |
| Resin 9  | X | X | ○ | △ | ○ | ○ | ○ | X | ▨ | ○ | ○ | X |
| Resin 10 | ○ | X | X | △ | ○ | ○ | X | X | △ | ▨ | ○ | X |
| Resin 11 | X | X | ○ | X | ○ | ○ | X | X | ○ | ○ | ▨ | X |
| Resin 12 | ○ | ○ | X | X | X | ○ | ○ | X | X | X | X | ▨ |

(Note)  ○ : Commercially available blend composite
△ : Combination with expected marketability
X : Combination with low marketability

FIG. 14

Plastic composite admissibility for material recycle

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1 | — | A | A | B | B | A | B | B | B | A | D | A |
| Resin 2 | A | — | D | C | B | B | B | D | B | B | B | A |
| Resin 3 | A | D | — | A | D | A | B | D | A | D | A | D |
| Resin 4 | B | C | A | — | D | B | A | D | B | B | B | B |
| Resin 5 | B | B | D | D | — | A | A | D | A | A | A | B |
| Resin 6 | A | B | A | B | A | — | A | D | B | A | A | A |
| Resin 7 | B | B | B | B | A | A | — | B | B | D | B | B |
| Resin 8 | B | D | D | D | D | D | B | — | D | B | D | D |
| Resin 9 | B | B | D | B | A | B | B | D | — | B | D | B |
| Resin 10 | A | B | A | B | A | B | D | D | B | — | A | D |
| Resin 11 | D | B | D | B | A | A | B | D | A | A | — | B |
| Resin 12 | A | A | D | B | B | A | B | D | D | B | B | — |

| Evaluation | Details | Classification |
|---|---|---|
| A | Potential demand of recycled article is present | Compatible polymer blend and commercially available polymer blend |
| B | Composite admissibility may be present if new application purpose for recycled material is found | Incompatible polymer blend with precedent of alloy using compatibiliser |
| C | Composite admissibility may be present upon technology development in future | Although marketability is expected, no precedent of alloy is present |
| D | Separating is recommended, and dismantlement property needs to be increased | No marketability, no compatibility, and no precedent of alloy are present |

FIG. 15

Metal composite admissibility for material recycle

| First component \ Second component | Resin 1 | Resin 2 | Resin 3 | Resin 4 | Resin 5 | Resin 6 | Resin 7 | Resin 8 | Resin 9 | Resin 10 | Resin 11 | Resin 12 |
|---|---|---|---|---|---|---|---|---|---|---|---|---|
| Resin 1  | ///  | C    | D    | A    | A    | B    | B    | B    | B    | C    | B    | B    |
| Resin 2  | A    | ///  | A    | A    | A    | A    | C    | A    | A    | A    | D    | D    |
| Resin 3  | C    | C    | ///  | C    | C    | D    | D    | D    | D    | C    | D    | D    |
| Resin 4  | A    | D    | A    | ///  | B    | D    | D    | D    | D    | D    | B    | B    |
| Resin 5  | D    | A    | D    | D    | ///  | D    | D    | D    | D    | A    | A    | A    |
| Resin 6  | B    | D    | D    | D    | D    | ///  | D    | D    | D    | D    | D    | D    |
| Resin 7  | B    | D    | D    | D    | D    | D    | ///  | D    | D    | D    | D    | D    |
| Resin 8  | B    | D    | D    | D    | D    | D    | D    | ///  | D    | D    | D    | D    |
| Resin 9  | B    | D    | A    | D    | D    | D    | D    | A    | ///  | D    | D    | D    |
| Resin 10 | A    | A    | D    | D    | D    | D    | A    | D    | D    | ///  | D    | D    |
| Resin 11 | D    | D    | D    | D    | D    | D    | D    | D    | D    | D    | ///  | D    |
| Resin 12 | C    | C    | C    | A    | D    | C    | C    | D    | D    | D    | D    | ///  |

| Explanatory note | Evaluation | Details |
|---|---|---|
| | A | Potential demand of recycled article is present |
| | B | Composite admissibility may be present if new application purpose for recycled material is found |
| | C | Separating is recommended, and dismantlement property needs to be increased |
| | D | Separating is recommended, and dismantlement property needs to be increased |

| Classification |
|---|
| Separation by refining is possible, or application purpose for alloy is present |
| Separate by refining is difficult, and degree of accumulation (degree of urgent measure) is low |
| Although marketability is expected, no precedent of alloy is present |
| No data |

FIG. 16

Discard/recycling process classification/basic unit database

| Process classification | | | Recyclability evaluation basic unit | | | Environmental load evaluation basic unit | | | |
|---|---|---|---|---|---|---|---|---|---|
| | | | Collection yield | Process reduction ratio | ······*** | Energy | CO2 | NOx | ······*** |
| Material recycle | Material recycle | Closed recycle (for same application purpose) | *** | | | | | | |
| | | Closed recycle (for same application purpose) | *** | *** | *** | *** | *** | *** | *** |
| | | Open recycle (for another application purpose, cascade) | *** | *** | *** | *** | *** | *** | *** |
| | One-way recycle | Blast furnace reducing material | *** | *** | *** | *** | *** | *** | *** |
| | | Solid fuel generation | *** | *** | *** | *** | *** | *** | *** |
| | | Liquefaction fuel generation | *** | *** | *** | *** | *** | *** | *** |
| Heat recovery | | Incineration with power generation | *** | *** | *** | *** | *** | *** | *** |
| | | Incineration with heat utilization | *** | *** | *** | *** | *** | *** | *** |
| Discard | | Simple incineration | *** | *** | *** | *** | *** | *** | *** |
| | | Simple landfill | *** | *** | *** | *** | *** | *** | *** |

F I G. 17

Distribution ratio

| 1 | 2 | 3 | 4 | Recycle amount Collection amount |
|---|---|---|---|---|
|   |   |   |   | % |
| Waste in Japan |   |   |   | *** |
|   | Industrial waste |   |   | *** |
|   |   | Dehydration process |   | *** |
|   |   |   | Sludge | *** |
|   |   |   | Animal excrement | *** |
|   |   |   | Waste acid | *** |
|   |   |   | Animal and vegetable residue | *** |
|   |   |   | Waste alkali | *** |
|   |   | Incineration process |   | *** |
|   |   |   | Building rubble | *** |
|   |   |   | Wood waste | *** |
|   |   |   | Waste plastics | *** |
|   |   |   | Waste oil | *** |
|   |   |   | Wastepaper | *** |
|   |   |   | Waste rubber | *** |
|   |   |   | Carcass | *** |
|   |   |   | Waste fiber | *** |
|   |   | Shredding process |   | *** |
|   |   |   | Slag | *** |
|   |   |   | Smoke and dust | *** |
|   |   |   | Waste metal | *** |
|   |   |   | Waste glass and waste pottery | *** |
|   |   |   | Combustion residue | *** |
|   | Municipal waste |   |   | *** |
|   |   | Urban garbage |   | *** |
|   |   |   | Combustible | *** |
|   |   |   | Incombustible | *** |
|   |   |   | Large-sized | *** |
|   |   | Business garbage |   | *** |
|   |   |   | Combustible | *** |
|   |   |   | Incombustible | *** |
|   |   |   | Large-sized | *** |

FIG. 18A

| Intermediate process residue amount Collection amount | Landfill amount Intermediate process residue amount | Incineration amount Intermediate process residue amount | Landfill amount Incineration amount |
|---|---|---|---|
| % | % | % | % |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |
| *** | *** | *** | *** |

FIG. 18B

Result output window

Product recyclability evaluation result

Recycle output condition setting

Recycle range

- [✓] Reuse
- [✓] Material (for same application purpose)
- [✓] Material (cascade)
- [ ] Chemical (generation of chemical raw material)
- [ ] Blast furnace reducing material/ coking raw material
- [ ] Chemical (fuel generation)
- [ ] Solid fuel generation (RDF/RPF)
- [ ] Heat recovery (power generation/heat utilization)

Sales price

- [✓] Only collection for pay
- [ ] Pay/reverse charge is not taken into consideration

| | | | Comparison data |
|---|---|---|---|
| Product name | Product A | Product A | Product A |
| Model | | | — |
| Sample | Trial calculation case 2 | Trial calculation case 1 |
| Remark | Copper/iron parts disassembly | Product that is not disassembled |
| Recyclable mass | 950 g | | 0 |
| Discard mass | 50 g | | 1000 |
| Recyclability ratio | 95 % | | 0 |
| Discard/recycle cost | -50 Yen/piece | | 40 |

[OK]

Display unit | Display process method unit | Main menu

FIG. 20

| Cause check item | Cause | Change of evaluation condition | Improvement of parts/material data | |
|---|---|---|---|---|
| | | | Cause check item | Cause check item |
| Is part/material unrecyclable ? (A1) | Part/material is unrecyclable | Register part/material as recyclable part/material | Change part/material to recyclable part/material | Display parts/materials which are recyclable and have same function as that of part/material as change candidates |
| Is raw material classification "others" ? (A2) | Recyclability is unknown because material information is unknown | Input more detailed material information | | Display standard basic information of part/material |
| | No recycle method that can be applied to part/material is present | Newly register recycle method that can be applied to material | | Display recycle methods that can be applied to part/material as change candidates |
| Does part/material contain plurality of raw materials ? (A3) | Collectable materials and recyclability ratio are limited for part/material containing plurality of raw materials | Make raw materials of different kinds dismantable and set another part/material | | Display portions at which part/material dismantles |
| | | | Change part/material to part/material containing single raw material | Display raw material compositions in part/material in descending order of mass |

FIG. 25

| Cause check item | Cause | Change of evaluation condition | Improvement of parts/material data | |
|---|---|---|---|---|
| | | | Cause check item | Cause check item |
| Does the part/material contain plurality of materials? | It is determined as unrecyclable for part/material containing plurality of materials having no composite admissibility | Make part/material dismantlable for each material type to register plurality of parts/materials | | Display portions at which part/material dismantles |
| | | | Change part/material to part/material containing single material | Display material compositions in part/material in descending order of mass |
| | | | Change material having no composite admissibility to material with composite admissibility | Display materials with composite admissibility with another material as change candidates |

A4

F I G. 26

| Cause check item | Cause | Change of evaluation condition | Parts/material data improving means | Support to lay out detailed improvement measure |
|---|---|---|---|---|
| Is step having high environmental load (cost) recycling process step ? | Recycling process with high environmental load (cost) is executed | Select process with low environmental load (cost) from selectable recycling processes | | Display recycling methods that can be applied to part/material as change candidates in ascending order of environmental load (cost) |
| | | | Change part/material to part/material to which process with low environmental load (cost) can be applied | Display parts/materials having same function as that of part/material as change candidates in ascending order of environmental load (cost) of recycling method that can be applied to parts/materials |
| | | | | Display portions at which part/material dismantles as text data or image data |

| Cause check item | Cause | Change of evaluation condition | Parts/material data improving means | Support to lay out detailed improvement measure |
|---|---|---|---|---|
| Is step having high environmental load (cost) transport step ? | Transport with high environmental load (cost) is executed | Select means with low environmental load (cost) from selectable transport means | | Display transport means that can be applied to part/material as change candidates in ascending order of environmental load (cost) |
| | | | Change part/material to part/material to which transport means with low environmental load (cost) can be applied | Display parts/materials having same function as that of part/material as change candidates in ascending order of environmental load (cost) of transport means that can be applied to parts/materials |
| | | | | Display portions at which part/material dismantles as text data or image data |
| | | | Change part/material to part/material which can be transported to transport destination with low environmental load (cost) | Display parts/materials having same function as that of part/material in ascending order of environmental load for transport until transport destination |

B2

F I G. 29

| Cause check item | Cause | Change of evaluation condition | Parts/material data improving means | Support to lay out detailed improvement measure |
|---|---|---|---|---|
| Is step having high environmental load (cost) dismantlement step ? | Dismantlement with high environmental load (cost) is executed | Select means with low environmental load (cost) from selectable dismantlement means | | Display dismantlement means that can be applied to part/material as change candidates in ascending order of environmental load (cost) |
| | | | Change part/material to part/material to which dismantlement means with low environmental load (cost) can be applied | Display parts/materials having same function as that of part/material as change candidates in ascending order of environmental load (cost) of dismantlement means that can be applied to parts/materials |
| | | | | Display portions at which part/material dismantles as text data or image data |
| | | Divide disassembly level | | Display portions at which part/material dismantles as change candidates in ascending order of environmental load (cost) |

FIG. 30

First table

| Part/material name | Recyclability | Applicable recycling method | Environmental load/cost | Presence/absence of connection (joint) portion | Presence/absence of designation of transport means |
|---|---|---|---|---|---|
|  |  |  |  |  |  |

F I G. 31

Second table

| Part/material name | Connection portion | Dismantle ability | Connection method | Dismantlement method | Environmental load/cost |
|---|---|---|---|---|---|
|  |  |  |  |  |  |

F I G. 32

Third table

| Part/material name | Transport means | Environmental load/cost |
|---|---|---|
|  |  |  |

F I G. 33

Fourth table

| Function | Part/<br>material name |
|---|---|
|  |  |

FIG. 34

Fifth table

| Part name | Composition material | | | |
|---|---|---|---|---|
|  |  | Material type | Mass (g) | Density (g/m$^3$) |
| Part A | Metal | Metal (1-1-2) | 250 |  |
|  |  | Metal (1-1-3) | 20 |  |
| Part B | Metal | Metal (2-2-1) |  | 10 |
|  |  | Metal (2-2-2) |  | 20 |

FIG. 35

| Number | Recycle condition |
|---|---|
| 1 | No resin closed recycle, non-recycle part = part E |
| 2 | ABS for closed recycle, non-recycle part = part E |
| 3 | PS for closed recycle, non-recycle part = part E |

| Non-recycle part | | | | | | 1 | | | | ← Presence/absence resin closed recycle |
|---|---|---|---|---|---|---|---|---|---|---|
| | | Part A | Part B | Part C | Part D | Part E | Part F | Part G | Part H | |
| Material name | Mass [g] | | | | | | | | | |
| Steel | 709 | 5 | 90 | | 15 | | 95 | 500 | 4 | |
| Copper alloy | 31 | | 6 | | | | 5 | 20 | | |
| Aluminum alloy | 43 | | 2 | | | | | 24 | 18 | |
| Other metals | 4 | | | | | | | | 4 | |
| | | | | | | | | | | |
| | 0 | | | | | | | | | ↓ |
| Epoxy resin | 32 | | | | | 30 | 2 | | | N |
| Polyethylene | 0 | | | | | | | | | N |
| Polystylene | 0 | | | | | | | | | N |
| Forming polystylene | 0 | | | | | | | | | N |
| AS resin | 0 | | | | | | | | | N |
| ABS resin | 79 | | | | 56 | 23 | | | | N |
| Polypropylene | 424 | 19 | | 2 | 1 | 2 | 400 | | | Y |
| Vinyl chloride resin | 20 | | | | | | 20 | | | N |
| Polycarbonate | 0 | | | | | | | | | N |
| Other resin products | 3 | | | 2 | 1 | | | | | N |
| | | | | | | | | | | |
| Rubber | 1 | | | | | | 1 | | | |
| Glass | 0 | | | | | | | | | |
| Corrugated fiberboard | 0 | | | | | | | | | |
| Paper | 0 | | | | | | | | | |
| Conductor | 138 | | 38 | | | | 9 | 67 | 24 | |
| Semiconductor | 25 | | | | | 20 | | | 5 | |
| Other electronic parts | 10 | | | | | 10 | | | | |
| Others | 2 | | | | 0 | | 2 | | | |
| Total | 1520 | 24 | 35 | 4 | 74 | 62 | 555 | 613 | 53 | |

F I G. 40A

| Recycle collection ratio [%] | Average collection unit price [yen/kg] | Average material unit price [yen/kg] |
|---|---|---|
| 100% | -7 | 88 |
| 100% | -125 | 458 |
| 100% | -150 | 543 |
| 0% | 0 | 723 |
|  |  |  |
|  |  |  |
| 0% | 35 | 340 |
| 100% | 42 | 397 |
| 100% | 50 | 147 |
| 0% | 78 | 197 |
| 100% | 27 | 279 |
| 100% | 23 | 217 |
| 100% | 70 | 284 |
| 100% | 25 | 141 |
| 100% | 25 | 131 |
| 0% | 35 | 458 |
|  |  |  |
| 0% | 0 | 370 |
| 100% | -10 | 299 |
| 0% | 0 | 57 |
| 0% | 0 | 137 |
| 80% | -14 | 1,454 |
| 0% | 0 | 53 |
| 0% | 0 | 8,100 |
| 0% | 0 |  |

| | |
|---|---|
| Intermediate process unit price [yen/kg] | 27 |
| Transport unit price [yen/kg] | 46 |
| Landfill unit price [yen/kg] | 30 |

F I G. 40B

| Degradation factor | Thermal degradation | | | | | | | |
|---|---|---|---|---|---|---|---|---|
| | Chemical degradation | 1 | 1 | 1 | 1 | | | |
| | Photo-degradation | | | | | 1 | 1 | 1 |
| Part composition of product | | Part A | Part B | Part C | Part D | Part E | Part F | Part G | Part H |

F I G. 42

| Part recycle collection amount | | | |
|---|---|---|---|
| Number of degradation factors applied | Minimum value | Maximum value | Probability distribution shape |
| 0 | = Maximum value | Mass of corresponding resin in each part | Uniform |
| 1 | = Maximum value * $\alpha$ | Mass of corresponding resin in each part | Uniform |
| 2 | = Maximum value * $\beta$ | Mass of corresponding resin in each part | Uniform |
| 3 | = Maximum value * $\gamma$ | Mass of corresponding resin in each part | Uniform |

For $0 \leq \alpha, \beta, \gamma < 1$

F I G. 43

| Material name | Mass [g] | Recycle collection ratio [%] | Average collection unit price [yen/kg] | Average material unit price [yen/kg] |
|---|---|---|---|---|
| Steel | 709 | 100% | -7 | 88 |
| Copper alloy | 31 | 100% | -125 | 458 |
| Aluminum alloy | 43 | 100% | -150 | 543 |
| Other metals | 4 | 0% | 0 | 723 |
| | | | | |
| | 0 | | | |
| Epoxy resin | 32 | 0% | 35 | 340 |
| Polyethylene | 0 | 100% | 42 | 397 |
| Polystyrene | 0 | 100% | 50 | 147 |
| Forming polystyrene | 0 | 0% | 78 | 197 |
| AS resin | 0 | 100% | 27 | 279 |
| ABS resin | 79 | 100% | 23 | 217 |
| Polypropylene | 424 | 100% | 70 | 284 |
| Vinyl chloride resin | 20 | 100% | 25 | 141 |
| Polycarbonate | 0 | 100% | 25 | 131 |
| Other resin products | 3 | 0% | 35 | 458 |
| | | | | |
| Rubber | 1 | 0% | 0 | 370 |
| Glass | 0 | 100% | -10 | 299 |
| Corrugated fiberboard | 0 | 0% | 0 | 57 |
| Paper | 0 | 0% | 0 | 137 |
| Conductor | 138 | 80% | -14 | 1,454 |
| Semiconductor | 25 | 0% | 0 | 53 |
| Other electronic parts | 10 | 0% | 0 | 8,100 |
| Others | 2 | 0% | 0 | |

Total    1520

| | |
|---|---|
| Intermediate process unit price [yen/kg] | 27 |
| Transport unit price [yen/kg] | 46 |
| Landfill unit price [yen/kg] | 30 |

F I G. 47

EVALUATION SUPPORT APPARATUS AND METHOD FOR EVALUATION OF RECYCLABILITY/ENVIRONMENTAL LOAD

CROSS-REFERENCE TO RELATED APPLICATIONS

This application is based upon and claims the benefit of priority from the prior Japanese Patent Applications No. 2002-190662, filed Jun. 28, 2002; and No. 2002-190663, filed Jun. 28, 2002, the entire contents of both of which are incorporated herein by reference.

BACKGROUND OF THE INVENTION

1. Field of the Invention

The present invention relates to an evaluation support apparatus that uses CAD (Computer Aided Design) data containing part names and the amounts or numbers of parts for each product to evaluate the recyclability or environmental load of the product.

2. Description of the Related Art

The evaluation apparatus that evaluates environmental loads in recyclability and life cycle of products is mainly directed to support selection of parts and materials for manufacture of products with improvement of recyclability of products.

To evaluate the recyclability and environmental load of products, kinds of materials forming the part or mass of the materials of the parts is input for each of parts constructing the product. The recycling rate on the product and quantity of the environment load causing in the whole life cycle are computed based on the input parameters.

However, even if the recycling rate on the product and the quantity of the environmental load are computed by this evaluation apparatus, it is unclear what obstructs recycling or what deteriorates environment load. If the evaluation result of recyclability on the product and environmental load are not reflected by part/material selection, the evaluation in itself becomes meaningless.

It is an object of evaluation to support selection of part/materials in a design stage. Therefore, for the purpose of attaining this object the evaluation result of recyclability and environmental load on the product is provided for a user. The user is required to grasp that where of the product is a problem with respect to the recyclability and environmental load and how it is to be improved.

Conventionally, a CAD (Computer aided design) unit is used in the stage of a product design. CAD data generated by this CAD unit includes information that indicates parts composing the product, the quantity of parts, the number of parts, the shape of each parts, etc. Using the CAD data for evaluation of environmental load in the recyclability and life cycle of the product reduces workload for data input and is very useful for performing the evaluation in efficiency.

What obstructs recyclability and what deteriorates the environmental load are analyzed based on recyclability on a product and an evaluation result of environmental load. If it is possible to take a support for improving them, it may attain the recyclability/environment load evaluation to make CAD data reflect an improvement result.

Conventionally, even if an evaluation result of a recyclability of a product and an environmental load of the product are provided in a design stage of the product, it is difficult to analyze an obstruction factor of the recyclability and an aggravation factor of the environmental based on the evaluation result and take a remedy directly associated with the obstruction factor of recyclability and the aggravation factor of environmental load directly.

Therefore, there is a problem not to be able to make selection of parts and materials composing a product reflect an evaluation result of recyclability of a product and an environmental load easily.

BRIEF SUMMARY OF THE INVENTION

It is an object of the present invention to provide an evaluation support apparatus and method which can efficiently evaluate the recyclability or environmental load of a product at the stage of product design by directly using the CAD data of the product for evaluation of the recyclability or environmental load and also reduce the user's work-load for evaluation of the recyclability or environmental load of the product.

According to an aspect of the invention, there is provided an evaluation support apparatus using CAD (Computer aided design) data for evaluation of a recyclability of products each configured by a plurality of parts and environmental load thereof, the apparatus comprising: a memory which stores parts basic data containing kinds of materials forming the parts and masses or densities of the materials; a part data generator which generates, for each of the parts, parts/material data from the CAD data referring to the parts basic data of the memory, the parts/material data including parts names, kinds of materials forming the parts, masses of the materials; and an estimation unit configured to estimate the recyclability of each of the products and the environmental load thereof based on the parts/material data.

According to another aspect of the invention, there is provided a design support apparatus which supports a design of a product, the apparatus comprising: a data generator which generates parts/material data including parts composing the product, kinds of materials composing the parts and mass of each of the materials that differ in kind; a setting unit configured to set an evaluation condition; an evaluation unit configured to evaluate a recyclability of the product, using the evaluation condition and the parts/material data; an analysis unit configured to analyze a factor obstructing the recyclability based on an evaluation result of the evaluating unit; and an output unit configured to output a remedy for an obstruction factor provided as an analysis result of the analysis unit.

BRIEF DESCRIPTION OF THE SEVERAL VIEWS OF THE DRAWING

FIG. 3 is a view for explaining CAD data and parts/material data;

FIGS. 7A and 7B show a table showing an example of a parts/material database;

FIG. 11 is a table for explaining an example of a plastic impurity permissible dose database;

FIG. 12 is a table for explaining an example of a plastic removal admissibility database;

FIG. 13 is a table for explaining an example of a plastic compatibility database;

FIG. 14 is a table for explaining an example of a plastic marketability database;

FIG. 15 is a table for explaining an example of a plastic composite admissibility database;

FIG. 16 is a table for explaining an example of a metal composite admissibility database;

FIG. 17 is a table for explaining an example of a discard/recycling process classification/basic unit database;

FIGS. 18A and 18B show a table for explaining an example of a distribution ratio database by waste classification;

FIG. 20 is a view showing an example of an evaluation result output window;

FIG. 25 is a table showing the correlation between a recyclability impeding factor analysis method, recyclability impeding factors (causes) obtained upon analysis, and evaluation conditions and parts/material data improvement measures corresponding to the impeding factors;

FIG. 26 is a table showing the correlation between a recyclability impeding factor analysis method, recyclability impeding factors (causes) obtained upon analysis, and evaluation conditions and parts/material data improvement measures corresponding to the impeding factors;

FIG. 28 is a table showing the correlation between an environmental load/cost deteriorating factor analysis method, deteriorating factors (causes) obtained upon analysis, and evaluation conditions and parts/material data improvement measures corresponding to the deteriorating factors;

FIG. 29 is a table showing the correlation between an environmental load/cost deteriorating factor analysis method, deteriorating factors (causes) obtained upon analysis, and evaluation conditions and parts/material data improvement measures corresponding to the deteriorating factors;

FIG. 30 is a table showing the correlation between an environmental load/cost deteriorating factor analysis method, deteriorating factors (causes) obtained upon analysis, and evaluation conditions and parts/material data improvement measures corresponding to the deteriorating factors;

FIG. 31 is a view for explaining the registration contents of the first table as one of the information tables stored in the improvement proposal basic information database;

FIG. 32 is a view for explaining the registration contents of the second table as one of the information tables stored in the improvement proposal basic information database;

FIG. 33 is a view for explaining the registration contents of the third table as one of the information tables stored in the improvement proposal basic information database;

FIG. 34 is a view for explaining the registration contents of the fourth table as one of the information tables stored in the improvement proposal basic information database;

FIG. 35 is a view for explaining the registration contents of the fifth table as one of the information tables stored in the improvement proposal basic information database;

FIGS. 40A and 40B show a table showing a use data set load example under recycle condition 3;

FIG. 42 is a table showing a degradation item setting example;

FIG. 43 is a table showing a setting example of a recycle collection amount variation width for each part;

FIG. 47 is a table showing an example of data load in the fourth embodiment;

DETAILED DESCRIPTION OF THE INVENTION

The embodiments of the present invention will be described below with reference to the accompanying drawings.

Figure 1:
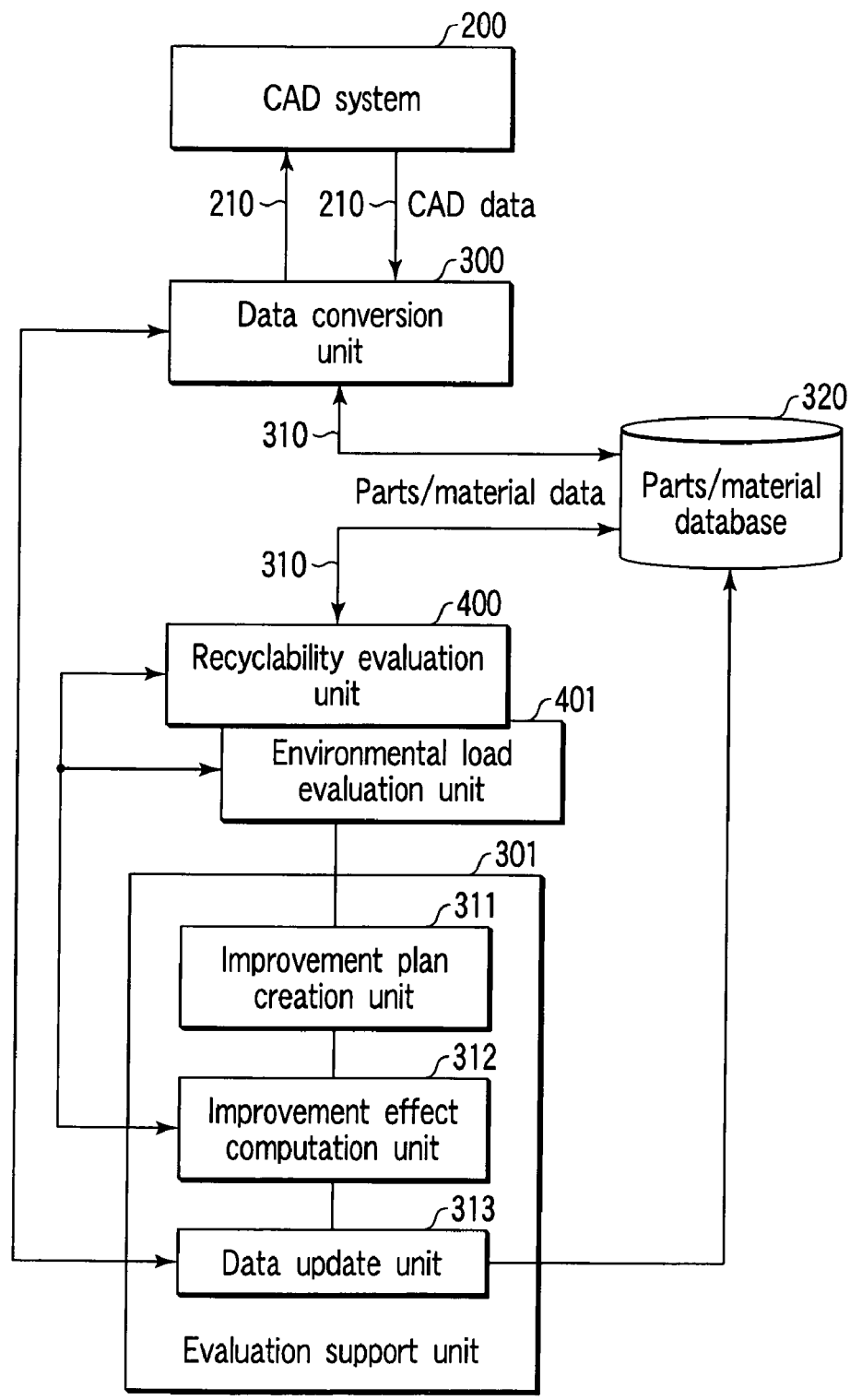
FIG. 1 is a block diagram schematically showing the functional arrangement of an apparatus according to the present invention.

FIG. 1 schematically shows the functional arrangement of a recyclability evaluation apparatus according to an embodiment of the present invention, which can support selection of part/materials for production aiming at increasing the recyclability of a product.

As shown in FIG. 1, the recyclability evaluation support apparatus comprises a CAD (Computer Aided Design) unit 200, a data conversion unit 300, a recyclability evaluation unit 400, an environmental load evaluation unit 401, and an evaluation support unit 301. The CAD unit 200 is a machine which executes design, drawing, and the like using a computer. The CAD unit has a variety of applications for mechanics, electronics, construction, and the like, though the fields are not particularly limited here. For example, the CAD unit 200 outputs, for each product, CAD data 210 containing parts used for manufacturing the product, the quantity of the parts or the number of the parts, and the shapes of the parts, the materials of the parts, the masses of the parts, etc. The CAD data 210 contains CAD viewer data.

The data conversion unit 300 receives the CAD data 210 output from the CAD unit 200. On the basis of the CAD data 210, the data conversion unit 300 generates parts/material data 310 to be processed by the recyclability evaluation unit 400 and environmental load evaluation unit 401.

Parts/material data 310 generated here is stored in a parts/material data base 320. The parts/material data stored in the parts/material data base 320 is converted to the computer aided design data 210 in response to a designation from the evaluation support unit 301.

The recyclability evaluation unit 400 evaluates a recyclability using the parts/material data stored in the parts/material database (parts/material data 310 generated by the evaluation support unit 300 and the parts/material data updated by the evaluation support unit 301) as described hereinafter.

The evaluation support unit 301 is used for supporting a design of a product based on an evaluation result obtained by the recyclability evaluation unit 400 and environmental load evaluation unit 401. The evaluation support unit 301 comprises an improvement plan creation unit 311, an improvement effect test computation unit 312 and a data update unit 313.

The improvement plan creation unit 311 analyzes an obstruction factor of recyclability of a product and an aggravation factor of environment load based on an evaluation result of the recyclability evaluation unit 400 and environment load evaluation unit 401. The improvement plan creation unit 311 displays an improvement plan (or a remedy) for the obstruction factor and aggravation factor provided as an analysis result.

An improvement effect test computation unit 312 updates provisionally evaluation condition and parts/material data used in the evaluation by the recyclability evaluation unit 400 and environment load evaluation unit 401, based on a remedy displayed on the improvement plan creation unit 311. The recyclability evaluation unit 400 and environment load evaluation unit 401 evaluate the recyclability of the product and the environment load of the product based on the updated evaluation condition and parts/material data. The improvement effect test computation unit 312 computes an improvement effect based on the evaluation results. The improvement effect test computation unit 312 outputs the evaluation results of the recyclability evaluation unit 400 and environmental load evaluation unit 401 as a test computation result of an improvement effect.

The data update unit 313 updates the parts/material data stored in the parts/material data base 320 with the parts/material data 310 updated provisionally for a test computation of the improvement effect, based on instructions from the user. In addition, the data update unit 313 makes the data conversion unit 300 convert the updated parts/material data of the parts/material database 320 to CAD data. The environmental load evaluation unit 401 executes environmental load evaluation (to be described later) using the parts/material data 310 generated by the data conversion unit 300.

Figure 2:
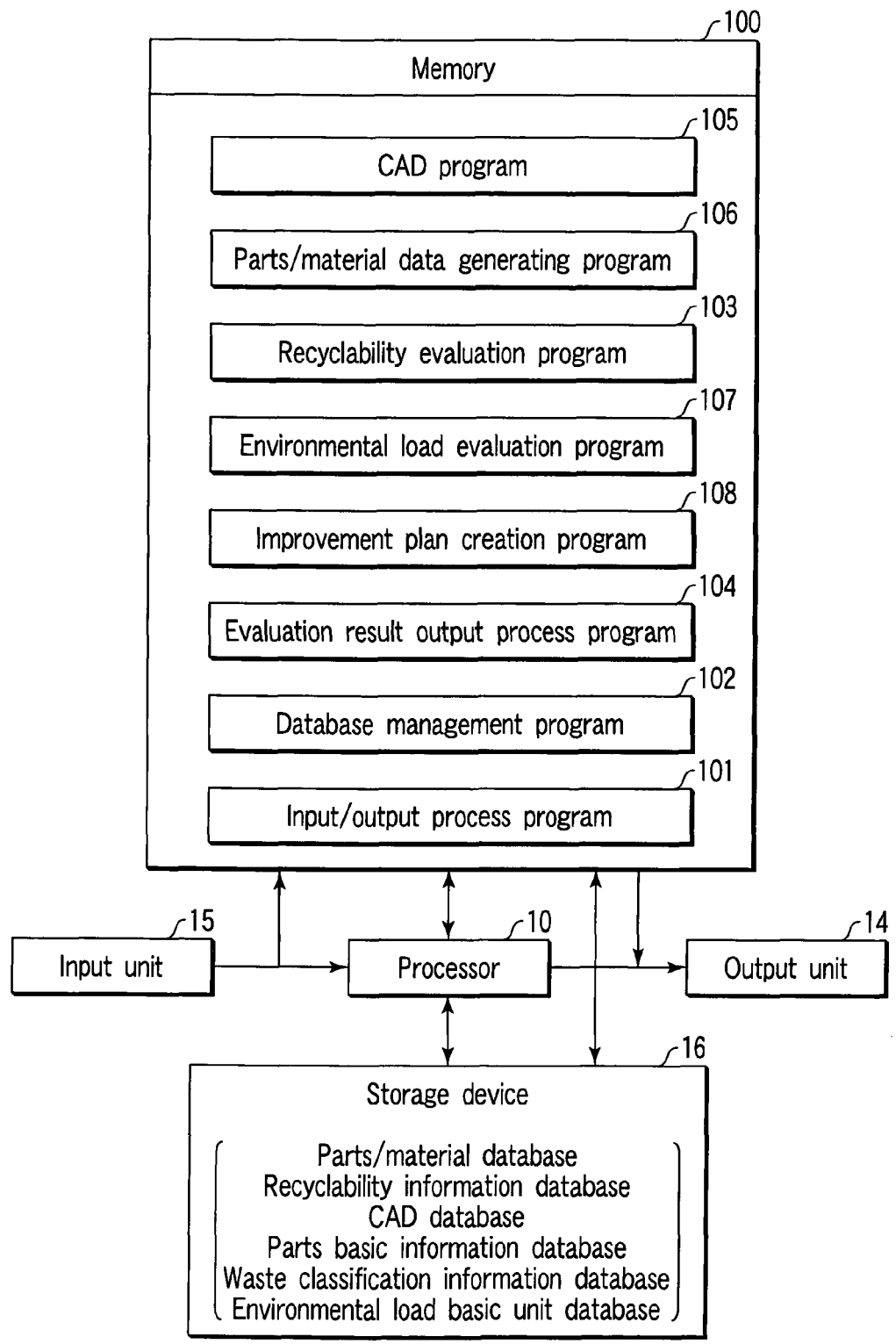
FIG. 2 is a block diagram showing an arrangement which implements the recyclability evaluation unit shown in FIG. 1 on, e.g., a computer.

FIG. 2 shows an arrangement which implements the recyclability evaluation unit shown in FIG. 1 by, e.g., a computer. Referring to FIG. 2, the recyclability evaluation unit comprises a processor (CPU) 10, a memory 100, an output unit 14 such as a display or printer, an input unit 15 such as a mouse or keyboard, and a storage unit 16. Of these components, the memory 100 is used to store programs serving as the center of control or temporarily hold data and also used as a working area for program execution. More specifically, the memory 100 stores a CAD program 105, a parts/material data generation program 106, a recyclability evaluation program 103 including an evaluation condition input program and evaluation computing program, an environmental load evaluation program 107, an improvement proposal creation program 108, an evaluation result output program 104, a database management program 102, an input/output program 101, and the like. The processor 10 executes various necessary control processes including input/output control, various arithmetic processes, and evaluation process by executing the programs in the memory 100.

The storage unit 16 stores in advance, e.g., a CAD database which manages and stores parts data to be used for design/drawing in the CAD unit, a recycling information database, a parts basic information database, and a waste classification information database. In addition to these databases, the storage unit 16 can store an environmental load basic unit database. The storage unit 16 also stores a parts/material database which stores and manages the parts/material data generated when the processor 10 executes the parts/material data generation program in the memory 100.

The processor 10 provides a CAD use environment corresponding to the CAD unit 200 shown in FIG. 1 on the recyclability evaluation unit shown in FIG. 2 by executing the CAD program 105 in the memory 100. The processor 10 also executes a function corresponding to the data conversion unit 300 shown in FIG. 1 on the recyclability evaluation unit shown in FIG. 2 by executing the parts/material data generation program 106 in the memory 100. The processor 10 also executes a function corresponding to the recyclability evaluation unit 400 shown in FIG. 1 on the recyclability evaluation unit shown in FIG. 2 by executing the recyclability evaluation program 103 in the memory 100. The processor 10 also executes a function corresponding to the environmental load evaluation unit 401 shown in FIG. 1 on the recyclability evaluation unit shown in FIG. 2 by executing the environmental load evaluation program 107 in the memory 100. The processor 10 executes mainly an improvement suggestion making processing program 108 in the memory 100. Thus, the processor 10 carries out a function corresponding to the evaluation support unit 301 on the recyclability evaluation unit shown in FIG. 2. The CAD data generation step used in the recyclability evaluation unit shown in FIG. 2 is not the gist of the present invention, and a description thereof will be omitted. The CAD data is general CAD data generated using a conventional technique, and the CAD data itself has no special characteristic features.

CAD data generally contains a product name (or product identification information such as a model), the dimensions of the product, and composition information representing the composition of the product as shown in FIG. 3. Further, the CAD data contains the names of parts used in the unit, the amounts or numbers of parts, and shape information representing the shapes of the parts.

The data set usable as CAD data including the above information, that is, data output from the CAD and data input in the CAD, e.g., CAD viewer data can be treated similarly. The processor 10 executes the CAD program 105 to generate the CAD data 210 having the contents shown in FIG. 3. The processor 10 executes the parts/material data generation program 106 to process the CAD data. With this process, the parts/material data 310 having contents shown in FIG. 3 is generated. The parts/material data 310 is stored in the parts/material database in the storage unit 16.

When the processor 10 executes the parts/material data generation program 106, the recyclability evaluation unit obtains, for each part contained in the CAD data 210, the kind (composition material kind) of materials in the parts and the mass (composition material mass) of the material in the parts while referring to parts basic data stored in the parts basic information database held in the storage unit 16. With this process, the parts/material data 310 for each product, which contains at least the parts name, the kind (composition material kind) of material in each part, and the mass (composition material mass) of each material, is generated and stored in the parts/material database in the storage unit 16. When the parts/material data is generated, each unit name in the CAD data may be replaced with identification information (e.g., a name representing a disassembly level) representing the hierarchical position (level) of a corresponding part.

When the processor 10 executes the parts/material data creation program 106, the data converter 300 of FIG. 1 converts parts/material data of the parts/material database stored in the storage unit 16 to the CAD data. In other words, for each of parts included in, for example, parts/material data, information such as the kind of materials composing the part and mass of the materials is omitted. When the part name and unit name are substituted with another names, they are returned to the names of the original CAD data. The parts/material data is converted to the original CAD data of a format shown in FIG. 3 and including shape information that shows shape of the part, depending on the part name and the quantity/number of the parts, and the kind of the parts. Of course, the CAD data provided by converting the parts/material data are available in the CAD unit 200.

Figure 4:
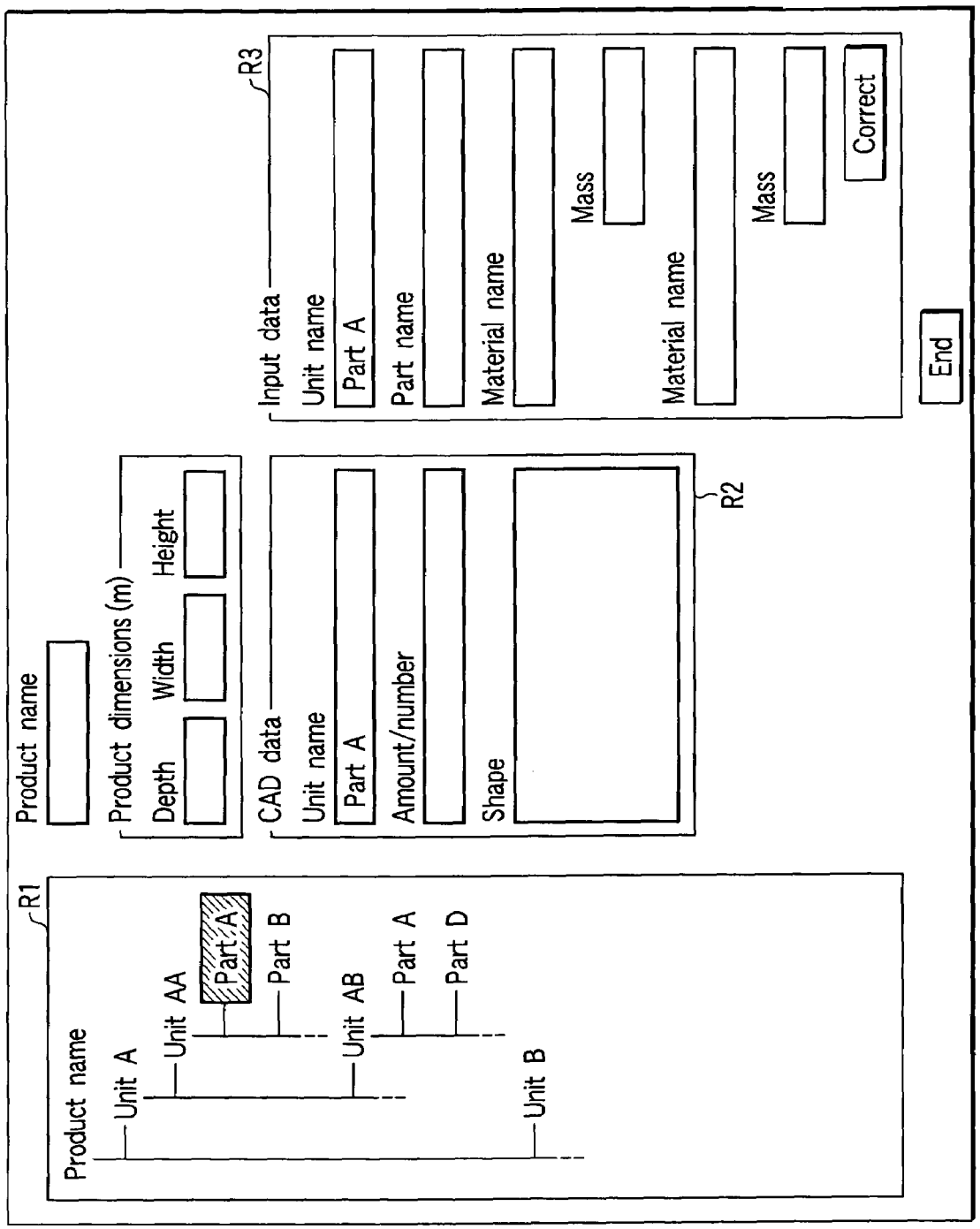
FIG. 4 is a view showing an example of a display window displayed on a display when parts/material data is generated on the basis of CAD data.

FIG. 4 shows an example of a display window displayed on a predetermined display serving as the output unit 14 when parts/material data is generated on the basis of the CAD data 210 in the recyclability evaluation unit. The hierarchical structure of units that comprises the product is displayed in a tree format in a display region R1 of the display window on the basis of, e.g., composition information contained in the CAD data 210. The shape or composition of the product itself may be displayed in a 3D format. The shape or composition of the product may be displayed using both the tree format and the 3D format.

When, e.g., a desired part is selected from the display region R1, CAD data about the selected part is displayed in a display region R2. In addition, parts/material data corresponding to the part is read out from the parts/material database in the storage unit 16 and displays in a display region R3 as input data to be used to evaluate the recyclability and environmental load. For example, when "part A" is selected from the display region R1, the part name, amount, number, or and shape of parts A are displayed in the display region R2. In addition, the part name of the parts, the kind of the composition material (material name) as the kind of material in the parts, and the composition material mass (mass) as the mass of material are displayed in the display region R3. When the part contains a plurality of materials, the names and masses of all the materials are displayed. In this state, if the user wants to correct a material name or the like displayed in the display region R3, he/she can correct it using the input unit 15 such as a keyboard or mouse to update the parts/material database.

For part selection in the region R1, units that use the same material or same part as the selected part may be displayed as a list or as a color image in the 3D format. In this case, the materials of the entire product can easily be grasped. A plurality of units that use the same material or same part as the selected part may be simultaneously selected, displayed in the display region R2, subjected to data conversion, and then displayed in the display region R3.

Figures 5, 6:
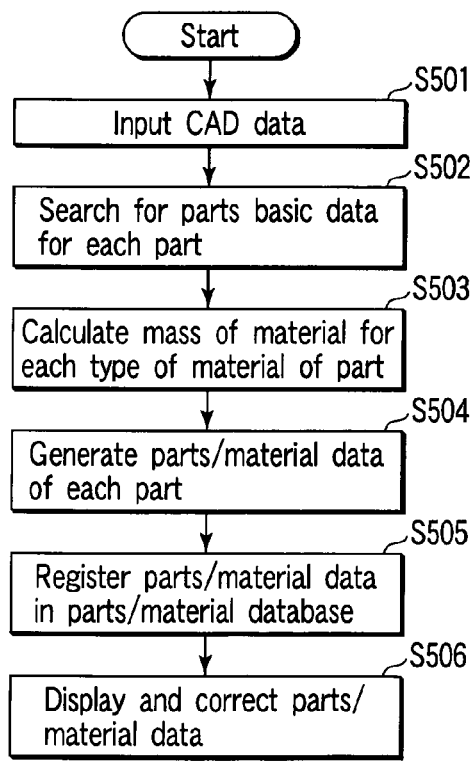
FIG. 5 is a table showing an example of a parts basic database.
FIG. 6 is a flow chart for explaining a parts/material data generation procedure.

The storage unit 16 stores the parts basic information database to be used to generate the parts/material data 310 from the CAD data 210. Parts basic data having, e.g., a format shown in FIG. 5 are stored in the parts basic information database. As shown in FIG. 5, the parts basic data of each part contains information representing the kinds of materials of the part and the mass or density of each material in the part.

It is preferable that for each kind of material, the mass of the material in the part be contained as parts basic data. However, it may be impossible for a part or material of a certain kind to simply convert the content into a mass. In this case, the parts basic data contains a density, i.e., a mass per unit volume of a part for each kind of material in the part. A case wherein the parts basic data contains a mass or density for each kind of material in each part will be described. However, the present invention is not limited to this case. The parts basic data only needs to contain, for each part, data of a mass conversion coefficient such as a length, amount, or mass per unit with which the mass of each kind of material in the part can be computed.

To evaluate the recyclability or environmental load of a product, the kind of material in each part of the product and the mass of material in the part must be obtained. When parts basic data contains the mass of material for each kind of material, the mass for each kind of material can be computed by directly using the mass of material for each kind or by multiplying the mass by the number or amount of parts, which is contained in the CAD data. When parts basic data contains the density of material for each kind of material, the volume of the part is computed first on the basis of the shape information of the part, which is contained in the CAD data. The shape information is information of, e.g., the vertical size, horizontal size, height, length, or thickness of the part, which represents the shape or size of the part. A density corresponding to the kind of material contained in the parts basic data is multiplied by the computed volume of the part. Alternatively, when the volume of the part is multiplied by the number or amount of the parts, which is contained in the CAD data, the mass of each material can be computed for each kind of material in the part.

The process operation of the recyclability evaluation unit (the process operation of the data conversion unit 300 shown in FIG. 1) when the processor 10 executes the parts/material data generation program will be described with reference to the flow chart shown in FIG. 6.

First, the processor 10 executes the CAD program 105 to generate the CAD data 210 (step S501). When the user causes the processor 10 to execute the parts/material data generation program, the processor 10 accesses the parts basic information database stored in the storage unit 16 and searches for parts basic data for each parts contained in the CAD data 210 (step S502). On the basis of the parts basic data found upon search, the kind and mass of material in each part are computed (step S503).

When the found parts basic data contains the value of the mass of material of each kind, the mass of material of each kind is computed by, e.g., multiplying the mass by the number or amount of parts contained in the CAD data. When the parts basic data contains the value of the density of material of each kind, the volume of the part is computed first on the basis of the shape information of the part, which is contained in the CAD data. The computed volume of the part is multiplied by a density corresponding to the material kind, which is contained in the parts basic data, and then by the number or amount of parts, which is contained in the CAD data, thereby calculating the mass of material of each kind.

In this way, while referring to the parts basic data, information (e.g., the kind of material in the parts and the mass of material of each kind) that are not contained in the CAD data are obtained from the CAD data in correspondence with each part to generate the parts/material data of each part (step S504). In addition, on the basis of the composition information of the product, which is contained in the CAD data, the parts/material data of the respective parts are classified or put into order and stored in the storage unit 16. With this process, a parts/material database as shown in FIGS. 7A and 7B can be generated (step S505).

FIGS. 7A and 7B show a parts/material database for a product. This product can roughly be divided into three layers from the viewpoint of function and composition. The three layers will be referred to as disassembly levels here. The disassembly levels correspond to the levels of the hierarchical structure of parts, which are used to divisionally manage basic parts that are assembled to manufacture the product, first units (merchandise modules) each formed by assembling several basic parts, second units each formed by assembling several first parts, Examples of basic parts are electric and electronic parts such as ICs and wiring boards. The basic parts are assembled to make, e.g., packages as first units. Some of the first units are assembled to make second units. Some of the second units are assembled to complete a product as a finished product.

The composition information contained in the CAD data of the product contains the information of the hierarchical structure of parts including, e.g., basic parts first units, and second units, as described above. Hence, in step S505 of FIG. 6, the parts/material database as shown in FIGS. 7A and 7B is generated on the basis of the composition information while totalizing the parts/material data of each part in accordance with the hierarchical structure of the parts.

Referring to FIGS. 7A and 7B, parts (1), (2), and (3) correspond to the second unit. These parts will be called first disassembled parts here. Part (1) is constituted by parts (1-1), (1-2), and (1-3). These parts corresponds to the first unit and will be called second disassembled parts here. Part (1-3) is comprised of parts (1-3-1) and (1-3-2). These parts corresponds to the basic parts and will be called third disassembled parts here.

If a first or second disassembled part cannot be disassembled anymore, no parts of lower layer are present, as a matter of course. That is, even a first or second disassembled part can be an end part in the hierarchical structure.

In step S504 of FIG. 6, parts/material data is generated for each part that cannot be disassembled anymore (each part as the end part in the hierarchical structure).

Referring to FIGS. 7A and 7B, on the basis of the parts/material data of each part located in the lowest layer of the hierarchical structure of the parts, which is generated in step S504, the masses of materials in each part, which are computed for the respective kinds of materials, are added to compute the mass (weight in FIG. 7A) of each part. The mass (weight) of a part in each layer is represented as the sum of masses (weights) of parts in the lower layer.

The kinds of materials composing each part product are classed in a main class and a minor class. For example, metal class, plastic class, and other class shown in FIGS. 7A and 7B are "materials" as the main class. In metal, metal 1 and metal 2 are "materials" as the minor class.

In this way, when parts/material data are obtained for all parts in the CAD data of a product, which is input in step S501, the parts/material database as shown in FIGS. 7A and 7B is generated in the storage unit 16 in correspondence with the product.

In the parts/material database shown in FIGS. 7A and 7B, part names are listed in a vertical column, and material names are listed in a horizontal row. The total mass of materials contained in each part is input to the table. In FIGS. 7A and 7B, materials used for the product are classified into three disassembly units (disassembly levels).

More specifically, each product (each part) has information of "disassembly level" and "material classification". The "disassembly level" can further be divided into three levels: "first disassembled part", "second disassembled part", and "third disassembled part." The "third disassembled part" indicates a basic level part such as a screw, a spring, a keytop, a decorative panel, or a wiring board that is obtained by disassembling a product (or a part) and cannot be disassembled anymore. The "second disassembled part" indicates a part module formed by assembling several basic parts. The "first disassembled part" indicates a unit formed by assembling part modules. A finished product is obtained by assembling a plurality of necessary part units. Hence, the disassembly levels of a product are managed on the basis of the "first disassembled parts" obtained by disassembling a product into part units, the "second disassembled parts" obtained by disassembling each part unit into part modules, and the "third disassembled parts" obtained by disassembling each part module into individual basic parts.

For a part at each disassembly level, the "part name" and "mass" of the part are registered. In addition, the mass of material of each kind is registered and managed in correspondence with each part located in the lowest layer of the hierarchical structure of the parts.

When parts that construct a product are classified into a number of levels and registered in the parts/material database, important information for examining the recyclable mass or recyclability ratio from the viewpoint of disassembly levels can be obtained. In addition, when the total mass of the product or part is computed, information of reduction of material used for the product can also be provided.

At the stage of recyclability evaluation, the process is performed on the basis of the contents of the parts/material database shown in FIGS. 7A and 7B. The term "part" used in the explanation of this process denotes, e.g., a part belonging to any one of the first, second, and third disassembled parts. The contents of data held in the parts/material database can be displayed on, e.g., the display window as shown in FIG. 4 or corrected by the user on the basis of the displayed contents (step S506).

FIG. 2 will be described again. Referring back to FIG. 2, the input/output program 101 is one of the programs stored in the memory 100. The input/output program 101 comprises a functional program which executes reception of input codes by keyboard operation, display information output to the display, data input/output control for the input/output interface, print output control to the printer, and the like.

The database management program 102 is also one of the programs stored in the memory 100 and comprises a functional program that manages the databases built in the storage unit 16. The recyclability evaluation program 103 is also one of the programs stored in the memory 100. The recyclability evaluation program 103 is used to execute the recyclability evaluation process on the basis of information supplied through the programs 101 and 102.

The evaluation result output program 104 is also one of the programs stored in the memory 100. The evaluation result output program 104 is used to arrange the display format to output an evaluation result by the recyclability evaluation program 103, or the like.

The storage unit 16 is used to save various data files and the like. The storage unit 16 stores various databases including a recyclability evaluation information database (DB) 160 to be used in the apparatus of the present invention. The recyclability evaluation information database 160 includes individual databases of, e.g., "composite admissibility" for each material such as metal composite admissibility information representing the utilization ability of metal composites and plastic composite admissibility information representing the utilization ability of plastic composites, "process classification", "basic unit", "impurity content" (combination and compounding ratio) for each composite material, "removal admissibility" for composite materials, "compatibility" for each composite material, "marketability", and the like. The recyclability evaluation information database 160 has flexibility so that information can be added, changed, or deleted in it.

The environmental load basic unit database stores the environmental load basic units of raw materials, which are generated on the basis of, e.g., an input-output table or obtained from references. If the recyclability information database has no sufficient recycling process basic unit information, the recycling process basic unit is generated by inputting the amount of each raw material such as energy supplied to the recycling process and multiplying the raw material amount by the basic unit of the raw material stored in the environmental load basic unit database.

The recyclability evaluation program 103 comprises an instruction of generating parts/material data from CAD data, an instruction of causing a user to set and input evaluation conditions, an instruction of evaluating the recyclability using the above information and information in the recyclability information DB 160, and an instruction of switching to a process for displaying the evaluation result.

<Recyclability Evaluation Procedure>

The recyclability evaluation unit according to this embodiment supports selection of part/materials for production aiming at increasing the recyclability of a product. To do this, the recyclability evaluation unit generates a database (recyclability information DB 160) which stores the composite admissibility of each material and evaluates the recyclability from input material composite information about a product or part to be evaluated while referring to the information in the recyclability information DB for a composite admissible for recycle. This evaluation is executed in accordance with the procedure shown in FIG. 8. The entire flow of recyclability evaluation in this embodiment will be described with reference to the recyclability evaluation flow as the basic procedure shown in FIG. 8.

[Process Step S1] (Generation of Parts/Material Database)

First, the processor 10 executes the recyclability evaluation program 103. As described above (FIG. 6), the recyclability evaluation program 103 executes a process for generating parts/material data from CAD data and generates, e.g., the parts/material database as shown in FIGS. 7A and 7B.

[Process Step S2] (Setting (Input) of Evaluation Conditions)

When the parts/material data generation process is ended, the process of the recyclability evaluation program 103 shifts to an evaluation condition setting/input request. In accordance with the request, the user sets evaluation conditions. The evaluation conditions are input by, e.g., causing the user to operate the input unit 15. The input information is received by the input/output process program 101.

The set contents of evaluation conditions include, e.g., the range of recycle, i.e., the recycle level representing "whether heat recovery of plastics should be included" or the "composite admissibility level in composite admissibility determination". When this setting is ended, the processor 10 executes composite admissibility determination.

[Process Step S3 (Process S31)] (Determination of Composite Admissibility)

When evaluation condition setting is ended, the process of the recyclability evaluation program 103 shifts to the process of composite admissibility determination. The composite admissibility determination process is a process in process step S3. In this process, the composite admissibility of material contained in each part unit to be evaluated is determined by referring to the metal composite admissibility database and plastic composite admissibility database in the recyclability information DB 160 (process S31).

[Process Step S3 (Process S32)] (Determination of Process Contents)

Figure 10:
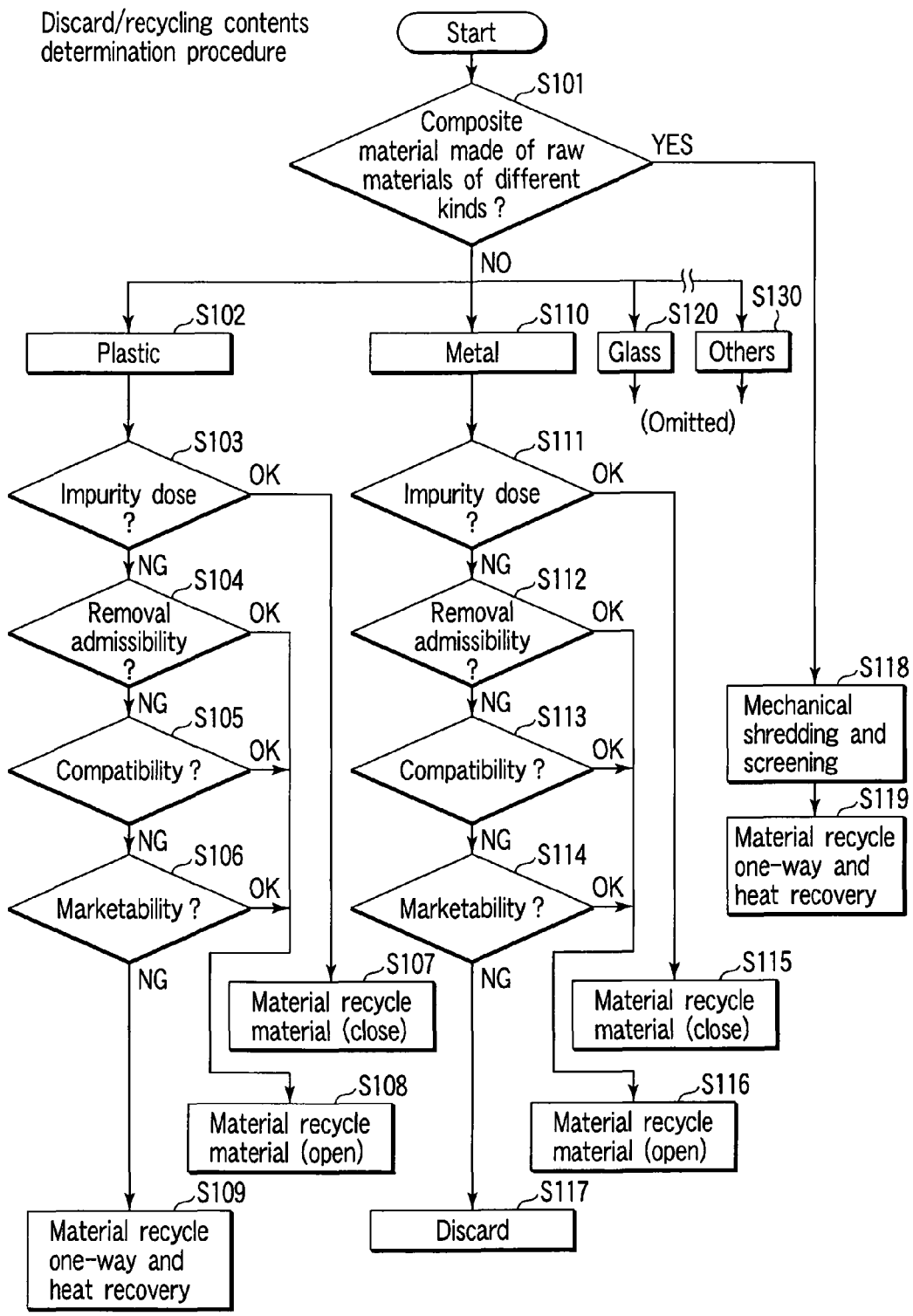
FIG. 10 is a flow chart showing a discard/recycling contents (discard/recycling process method) determination procedure.

When the composite admissibility determination is ended, the process of the recyclability evaluation program 103 shifts to the process of process content determination. This process is process in S32 in process step S3. In this process, determination is done to select one of a plurality of kinds of modeled discard/recycling contents (a plurality of kinds of modeled discard/recycling process methods) as a process to be applied to each part unit to be evaluated (FIG. 10).

[Process Step S3 (Process S33)] (Computation of Recyclable Mass and Recyclability Ratio)

When the discard/recycling content to be applied (the discard/recycling content process method to be applied) is selected, the process of the recyclability evaluation program 103 shifts to the process for calculating the amount (recyclable mass) that can be subjected to the process for the selected discard/recycling content (selected discard/recycling process method) and its ratio (recyclability ratio). This process is a process in process step S3 (process S33). In this process, for each part/material to be evaluated, the collection yield and the like are extracted from the discard/recycling process classification/base unit database in the recyclability information DB 160 and totalized for each applied discard/recycling method and for each part, thereby calculating the recyclable mass and recyclability ratio. In addition, the recyclable mass for each part is totalized to compute the recyclable mass and recyclability ratio of the entire product.

[Process Step S4] (Output/Display of Evaluation Result)

When the computation process is ended, the process of the recyclability evaluation program 103 shifts to the display process. The result of evaluation and the like by the recyclability evaluation program 103 are arranged into a display format to be output in accordance with the evaluation result output process program 104. More specifically, the format of the process method, recyclable mass, and recyclability ratio, which are selected or computed in accordance with the recyclability evaluation program 103, is arranged in accordance with the evaluation result output process program 104. The evaluation result arranged into the format is processed in accordance with the input/output process program 101 such that the result is displayed on the display serving as the output unit 14. As a consequence, information containing the process method for each collected article to be evaluated and the computed recyclable mass and recyclability ratio which can be applied to the process method is displayed as the evaluation result on the display on the basis of the input conditions. Accordingly, the user can know the process method, recyclable mass, and recyclability ratio for a composite article (collected article) to be evaluated. Not the total evaluation result but only part of the evaluation result may be displayed, as needed.

As described above, when each configuration part of a product is constructed by smaller subparts, the subparts are divided for each part, and the parts/material database stores, for each part, the kind of material in each subpart and the total mass of the material in the part.

Since the parts/material data is stored in the parts/material database while classifying the configuration parts into a number of levels, important information for examining the recyclable mass or recyclability ratio from the viewpoint of disassembly levels can be obtained. As a result, part/materials that allow production aiming at increasing the recyclability of a product can be selected.

In setting and inputting the evaluation conditions (process step S2), a disassembly level may be set to assume the disassembly level up to which the configuration parts should be dismantled (disassembled), or an output level may be set to define items to be displayed on the output window. The disassembly levels (disassembly depths) may be set in correspondence with, e.g., the hierarchical structure of part composition, as described above with reference to FIGS. 7A and 7B. When the disassembly levels are set, the weights can be totaled for each material of subparts that are integrated in correspondence with a disassembly level, and the recyclability can be evaluated for each disassembled part. At this time, the material list in the parts/material database as shown in FIGS. 7A and 7B may be rearranged for each disassembled part and in order of disassembly order. Accordingly, the information of the kinds and numbers of materials contained in a disassembled part and the disassembly depth level can be added to the recyclability evaluation and output.

In recyclability ratio computation (process S34 in process step S3), evaluation done for each determination element in process S31 in process step S3 can be converted into points and totalized so that the totalization result can be displayed by points as a recyclability index.

In output display (process step S4), improvement points may be proposed and displayed as additional information in recyclability evaluation. For example, parts or materials with low recycling ratios, part/materials that cannot be mixed, and reasons therefor can be displayed. In addition, the information of the kinds and numbers of materials contained in subparts (disassembled parts) that are integrated in correspondence with a disassembly level and the disassembly depth level can be output and displayed.

An apparatus that performs the recyclability evaluation process according to the basic procedure capable of evaluating the final process (discard and various kinds of recycling processes) of a collected article such as a product or material and its processible amount and ratio has been described above. An example will be described next, in which the above apparatus is further improved to implement an evaluation apparatus capable of evaluating a change in applicable process method upon changing the disassembly level, a specific process method (discard and various kinds of recycling processes) and its processible amount and ratio of a collected article, i.e., an evaluation apparatus which can be used to support design in consideration of dismantlement property.

<Another Example of Recyclability Evaluation Procedure>

Figure 8:
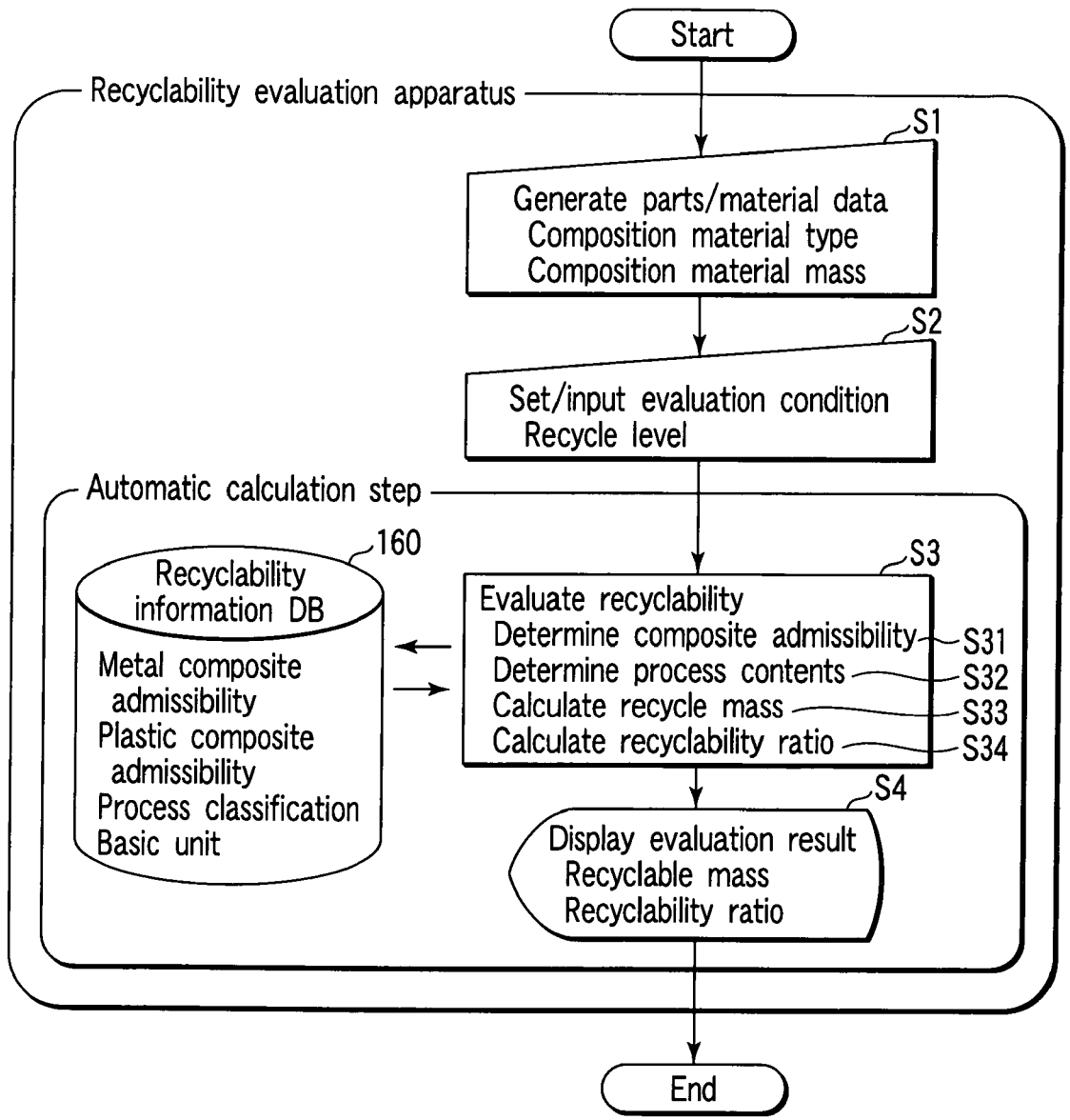
FIG. 8 is a flow chart showing the basic procedure of recyclability evaluation.
Figure 9:
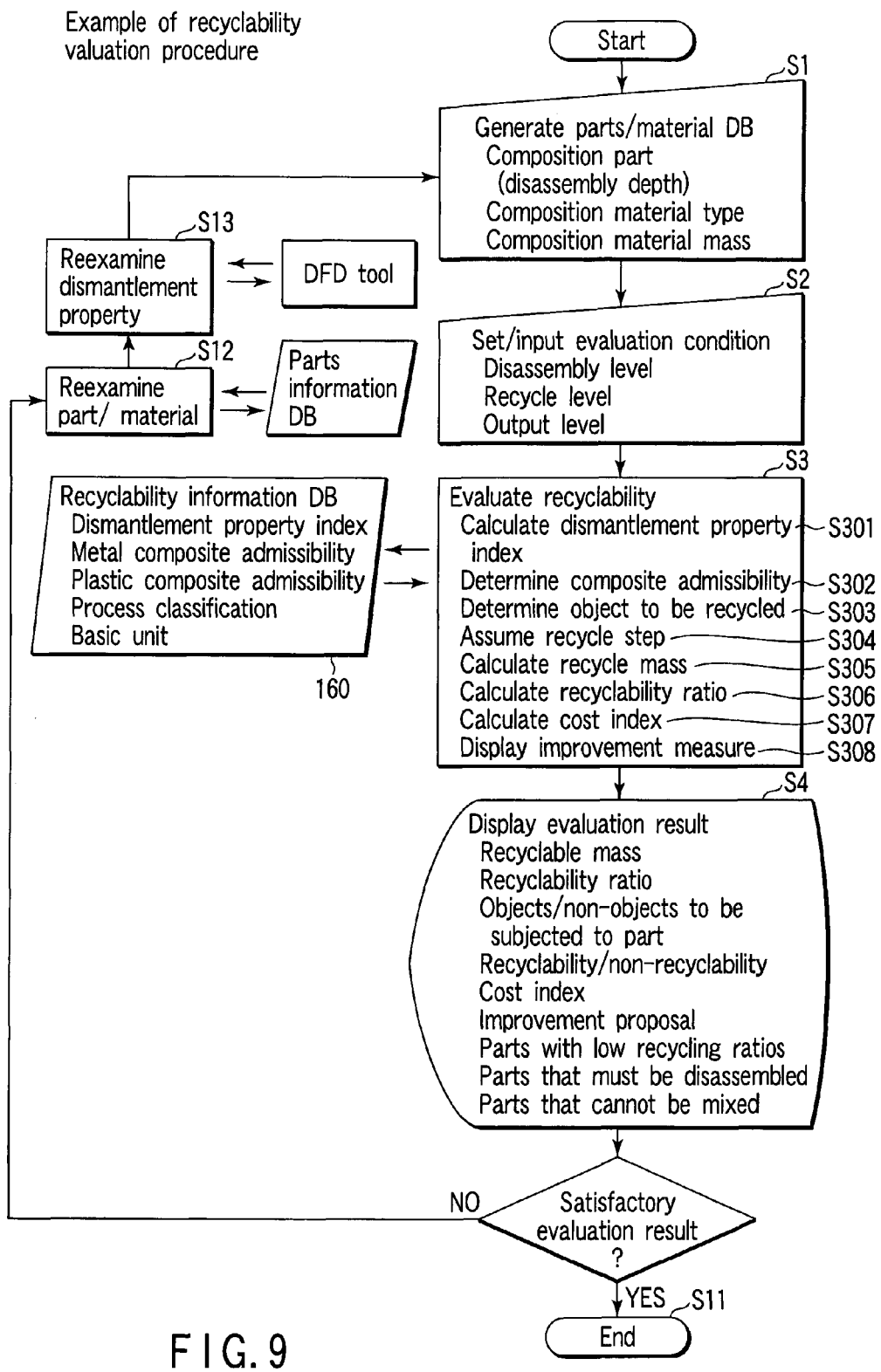
FIG. 9 is a flow chart showing an example of the recyclability evaluation procedure.

FIG. 9 shows an example of the recyclability evaluation procedure that includes disassembly level information and improvement point information in addition to the basic procedure shown in FIG. 8.

[Process Step S1] (Generation of Parts/Material Database)

First, as in FIG. 8, the processor 10 executes the recyclability evaluation program 103. As described above (FIG. 6), the process for generating parts/material data from CAD data of the recyclability evaluation program 103 is executed.

[Process Step S2]

(Setting (Input) of Evaluation Conditions)

The process of the recyclability evaluation program 103 shifts to an evaluation condition setting/input request. In accordance with the request, the user sets evaluation conditions. The evaluation conditions are input by, e.g., causing the evaluator to operate the input unit 15. The input information is processed in accordance with the input/output process program 101.

The set contents of evaluation conditions include the disassembly level, recycle level, and output level. The recycle level indicates, e.g., the range of recycle, i.e., the recycle level representing "whether heat recovery of plastics should be included" or the "composite admissibility level in composite admissibility determination". When this setting is ended, the processor 10 executes the recyclability evaluation process.

[Process Step S3 (Process S301)]

(Computation of Dismantlement Index)

When setting of evaluation conditions is ended, the process of the recyclability evaluation program 103 shifts to the process for calculating the dismantlement index. The dismantlement index computation process is process S301 in process step S3. In this process, the dismantlement index is computed using the recyclability information DB. When this process is ended, composite admissibility determination is executed.

[Process Step S3 (Process S302)] (Determination of Composite Admissibility)

The composite admissibility determination process is process S301 in process step S3. The composite admissibility of material contained in each part unit to be evaluated is determined using the metal composite admissibility database and plastic composite admissibility database. When this process is ended, recycle object determination is executed.

[Process Step S3 (Process S303)] (Determination of Recycle Object)

The recycle object determination process is process S303 in process step S3. What is the recycle object, whether impurity removal is easy, and what are the compatibility and marketability are determined by referring to the information in the recyclability information database. When this process is ended, the process shifts to assumption of the recycle step.

[Process Step S3 (Process S304)] (Assumption of Recycle Step)

The recycle step assumption is process S304 in process step S3, in which the process step of processing the recycle object is assumed. In this process, determination is done to select one of a plurality of kinds of modeled discard/recycling contents (a plurality of kinds of modeled discard/recycling process methods) as a process to be applied. More specifically, a process method to be applied to each part to be evaluated is selected. When this process is ended, the recycle mass is computed next.

[Process Step S3 (Processes S305 and S306)] (Computation of Recycle Mass and Recyclability Ratio)

When the discard/recycling content to be applied (the discard/recycling content process method to be applied) is selected, the process of the recyclability evaluation program 103 shifts to the process for calculating the recyclable mass and recyclability ratio. The recycle mass computation process is process S305 in process step S3, and recyclability ratio computation is process S306. In these processes, for each part/material to be evaluated, the collection yield and the like are extracted from the discard/recycling process classification/base unit database. The extracted collection yield and the like are totalized for each applied discard/recycling method and for each part, thereby calculating the recyclable mass and recyclability ratio. In addition, the recyclable mass for each part is totalized to compute the recyclable mass and recyclability ratio of the entire product. When these processes are ended, the process shifts to the process for calculating the index of cost of recycle.

[Process Step S3 (Process S307)] (Computation of Cost Index)

Cost index computation is process S307 in process step S3, in which the index of recycle cost of the recycle object is obtained. To compute the cost index, for each process method, the process unit price, process collected article unit price, and the like are extracted from the discard/recycling process classification/base unit database. The extracted unit prices are totalized for each applied discard/recycling method and for each part, thereby calculating the cost index. When this process is ended, the process shifts to the process for displaying an improvement proposal.

[process step S3 (process S308)] (Display of Improvement Plan)

An obstruction factor of recyclability of a product is analyzed based on an evaluation result of the recyclability. A improvement plan (remedy) corresponding to the obstruction factor is created and displayed. The evaluation condition and parts/material data that are used in the recyclability evaluation are changed provisionally based on the displayed improvement plan. The recyclability is evaluated again based on the changed evaluation condition and parts/material data to do a trail computation for an improvement effect.

[Process Step S4]

In this process, the result of evaluation and the like by the recyclability evaluation program 103 is arranged into a display format to be output in accordance with the evaluation result output process program 104. More specifically, in accordance with the evaluation result output process program 104, the format of information such as the process method, recyclable mass, recyclability ratio, to-be-disassembled object/to-be-non-disassembled object, recyclability/non-recyclability, cost index, and improvement proposal (parts with low recycling ratios (which parts have low recycling ratios), parts that must be disassembled (which parts require disassembly), and parts that cannot be mixed (which parts cannot be mixed)), which are selected or computed in accordance with the recyclability evaluation program 103, is arranged. The information arranged into the format is displayed on the display serving as the output unit 14 in accordance with the input/output process program 101.

As a result, information of various analysis results, including the process method selected for each recycle object and the computed recyclable mass and recyclability ratio to which the process method should be applied, is arranged into a format and output and displayed as an evaluation result on the display. Accordingly, the user can know the recycle evaluation result about each recycle object. Especially, in this example, since the disassembly levels for the evaluation can be changed, the user can know a change in evaluation contents due to the change in disassembly level. Therefore, this apparatus exhibits an effect in supporting optimum designing mainly aiming at recycle in product development. As a result, the user can make an improvement to increase the recyclability of a product by increasing the disassembly property using the dismantlement property evaluation tool on the basis of the recyclability evaluation result by the present invention or by using part/material information from the parts information database or the like. That is, if the user examines the displayed evaluation result and determines that the result is appropriate to the target, he/she employs the evaluation result to the recycle plan and ends the evaluation/analysis (step S11 in FIG. 9).

If the evaluation result is inappropriate to the target, the user reexamines the part/materials to be used for production in consideration of recycle (step S12 in FIG. 9) and also reexamines the dismantlement property (step S13 in FIG. 9). A process for updating the parts/material database on the basis of parts determined upon reexamination or materials in the parts is repeated. Accordingly, the parts and materials for production aiming at making an improvement to increase the recyclability of the product can be selected.

The apparatus according to this embodiment executes processes necessary in recycling a collected article to be evaluated, i.e., determines the value of each used material (determines composite admissibility of each material) and recycling process contents or evaluates the final possible treatment (discard or various recycling processes) of a collected article such as a product or material. A detailed example of this evaluation process will be described hereinafter.

[Details of Composite Admissibility Determination S302 and Recycling Process Content Determination in Process Step S3]

FIG. 10 shows a flow of composite admissibility determination (S302) in the recyclability evaluation process step shown in FIG. 9. In composite admissibility determination S302, the admissibility is determined, including the use value of each composite material. In the example shown in FIG. 10, the final recycling process contents can also be determined. More specifically, the contents of discard/recycle are determined on the basis of composite information (information about each component of a composite material made of materials of different kinds) of materials that comprise a collected article (product or part) to be evaluated.

When a product or part that is formed using materials of different kinds such as a metal, plastic, glass, and the like is collected, and the collected article is directly subjected to the discard/recycling process without separation by dismantlement, the collected article is not processed in its original form. The collected article is normally subjected to mechanical shredding and screening in which the article is temporarily shredded and separated and then sent to material recycle or heat recovery. That is, the collected article is separated into screenable materials and residues by mechanical shredding and screening. Data of a collected article purity and the like can be added to the recycle ratio on the basis of a value obtained in consideration of the screening yield and the basic unit database as shown in FIG. 17.

When the collected article contains no materials of different kinds, or the collected article is to be processed after materials of different kinds are separated by dismantlement, the composite admissibility of materials of the same kind is evaluated on the basis of an arbitrary material classification such as "plastics", "metals", "glass materials", "pottery/ceramics", "chemicals", "wood materials", "animal and plant materials/liquid materials", or the like.

This process will be described in accordance with the flow shown in FIG. 10. A product or part which uses materials of different kinds such as metal, plastic, and glass materials is subjected to the discard/recycling process except when the part should directly be reused. In this case, the collected article is processed by a mechanical shredding process. The collected article is therefore returned to materials by the grinding process. The materials of the collected article can be a composite material made of materials of the same kind or a composite material made of materials of different kinds. This apparatus evaluates the recyclability of a composite material.

More specifically, it is determined on the basis of the parts/material data of each part, which is stored in the parts/material database, whether the part/material to be recycled is a composite material made of materials of different kinds (step S101). If YES in step S101, the part/material is separated by mechanical shredding and screening (step S118), and the material recycle and heat recovery process is selected (step S119). That is, after the mechanical shredding and screening process, each of single component materials separated by screening is reused by material recycle. It is determined that residues should be incinerated for heat recovery.

If NO in step S101, the process advances in the following way depending on the material to be processed, e.g., a plastic, metal, or glass material.

When the material to be processed is a plastic, the flow advances to step S102. More specifically, the impurity dose of the composite material is determined (determined by referring to information in the impurity dose database) to determine whether the required standard is satisfied (OK/NG) (step S103). If OK in step S103, it is determined that the material should be used as a material recycle material (close) (step S107). That is, it is determined that closed material recycle is possible so that the material can be used as a raw material for the same application purpose only by remolding in the manufacturer without any process such as purification by an external disposal agent.

On the other hand, if the impurity dose of the composite material does not satisfy the required standard (NG in step S103), removal admissibility is determined by referring to the information in the removal admissibility database prepared in advance (OK/NG) (step S104). If the removal admissibility is high (OK in step S104), it is determined that the material should be used as a material recycle material (open) (step S108). That is, it is determined that open material recycle which needs purification by an external disposal agent is possible. In this case, the collected article can be used for either the same application purpose (horizontal) or another application purpose (cascade).

If it is determined by removal admissibility determination in step S104 that the removal admissibility is poor (NG in step S104), the compatibility is determined by referring to the information in the compatibility database prepared in advance (step S105). If the compatibility is high (OK in step S105), it is determined that the material should be used as a material recycle material (open) (step S108). In this case, since the composition changes from that of the material used of the product, open material recycle via an external agent is executed so that the material is used for another application purpose (cascade). If it is determined by compatibility determination in step S105 that the compatibility is poor (NG in step S105), the marketability is determined (step S106). If the blended polymer has a marketability (OK in step S106), it is determined that the material should be used as a material recycle material (open) (step S108). In this case as well, since the composition changes from that of the material used of the product, open material recycle via an external agent is executed so that the material is used for another application purpose (cascade). If it is determined by marketability determination in step S106 that the material has no marketability (NG in step S106), it is determined that the material is disposable (material recycle one-way) so that it should be incinerated for heat recovery (step S109).

When it is determined in step S101 that the material to be processed is a metal, the flow advances to step S110. More specifically, the impurity dose of the composite material is determined to determine whether the required standard is satisfied (OK/NG) (step S111). If OK in step S111, it is determined that the material should be used as a material recycle material (close) (step S107). That is, it is determined that closed material recycle is possible so that the material can be used as a raw material for the same application purpose only by remolding in the manufacturer without any process such as refining by an external disposal agent.

If the impurity dose of the composite material does not satisfy the required standard (NG in step S111), removal admissibility is determined by referring to the information in the removal admissibility database prepared in advance (OK/NG) (step S112). If the removal admissibility is high (OK in step S112), it is determined that the material should be used as a material recycle material (open) (step S116). That is, it is determined that open material recycle which needs refining by an external disposal agent is possible. In this case, the collected article can be used for either the same application purpose (horizontal) or another application purpose (cascade).

If it is determined by removal admissibility determination in step S112 that the removal admissibility is poor (NG in step S112), the compatibility is determined by referring to the information in the compatibility database prepared in advance (step S113). If the compatibility is high (OK in step S113), it is determined that the material should be used as a material recycle material (open) (step S116). In this case, since the composition changes from that of the material used of the product, open material recycle via an external agent is executed so that the material is used for another application purpose (cascade).

If it is determined by compatibility determination in step S113 that the compatibility is poor (NG in step S113), the marketability is determined by referring to the information in the marketability database prepared in advance (step S114). In the marketability database, a criterion on which the demands and value information of, e.g., alloys are set. If the alloy has a marketability (OK in step S114), it is determined that the material should be used as a material recycle material (open) (step S116). In this case as well, since the composition changes from that of the material used of the product, open material recycle via an external agent is executed so that the material is used for another application purpose (cascade). If it is determined by marketability determination in step S114 that the material has no marketability (NG in step S114), it is determined that the material should be discarded (for landfill) (step S117).

Even when the composite material is glass or the like, the impurity dose, removal admissibility, compatibility, and marketability are determined. It is determined whether the material can be used as an open or closed material recycle material or should be discarded for heat recovery, thereby determining the final use form. Accordingly, the process method for the composite material to be processed can be determined to know the recycle form of the material or whether the material should be discarded.

The individual determination elements such as the impurity permissible dose, removal admissibility, compatibility, and marketability indicated in the flow shown in FIG. 10 are determined using individual databases shown in FIGS. 11 to 14 in correspondence with the determination elements or a composite admissibility database for each material, as shown in FIG. 15 or 16, which integrates the individual determination elements.

The determination elements are not limited to those shown in FIG. 10, and various kinds of determination elements can be used. In addition, the order of determination is not limited to the example shown in FIG. 10. The determination operations can be done in an arbitrary order. The determination result is not limited to that shown in FIG. 10 and should be updated as needed in correspondence with a change over time such as a change in technology or market. With this flow, the materials to be recycled and the discard/recycling contents on which the composite state of the product or part to be evaluated are determined. On the basis of the determination, the recyclability ratio, recycle index, recycle cost, and the like can be assumed in the basic unit database shown in FIG. 17.

As described above, in the above apparatus, various databases each of which comprises one element of the recyclability evaluation database are prepared, and the recyclability of each material to be evaluated is evaluated on the basis of information provided by the databases. The individual databases to be used will briefly be described.

[Individual Databases]

FIGS. 11 to 14 show detailed examples of the databases along the flow shown in FIG. 10. FIG. 11 shows the plastic impurity dose database. FIG. 12 shows the plastic removal admissibility database. FIG. 13 shows the plastic compatibility database. FIG. 14 shows the plastic marketability database.

As shown in FIG. 11, the plastic impurity dose database holds the information of combinations and compounding ratios (weight ratios) of resins as the database. As shown in FIG. 12, the plastic removal admissibility database is a discrimination/separation technique database. "This database holds, for each combination of resins, information representing whether an "automatic screening technique (○)" or "automatic discrimination technique (Δ)" is available for the resin combination, or "screening is difficult (X)."

As shown in FIG. 13, the plastic compatibility database holds, for each combination of resins, information representing whether the combination "is a compatible polymer blend (s)", "can be converted into a polymer alloy using a compatibiliser (c)", or "has no compatibility information (n)."

As shown in FIG. 14, the database which stores the marketability of composite plastic materials holds, for each combination of resins, information representing whether "a material having the same blend composition is commercially available (○)", or "the combination can expect a marketability (Δ)", or "the combination has a poor marketability (X)."

FIGS. 11 to 14 show examples when the materials to be processed are plastics. Databases are also prepared for other material classifications such as metals and glass materials.

As determination elements to be used to determine the composite admissibility of a material, elements other than those indicated in the flow shown in FIG. 10 may be added. In this case, a database is prepared in correspondence with each element. All the determination elements in FIG. 10 need not always be used. Determination may be executed for one or a plurality of elements selected from the determination elements on the basis of the detailed databases. The plurality of determination elements may be integrated and used as the composite admissibility database.

FIGS. 15 and 16 show examples of such integrated composite admissibility databases for plastics and metals.

As shown in FIG. 15, the database which stores plastic composite admissibility for material recycle holds, for each combination of resins, information representing whether the combination "has a potential demand as a recycled material (A)", "can have a composite admissibility if a new application purpose for the recycled material is found (B)", or "can have a composite admissibility upon technology development in the future (C)", or "separating is recommended, and the dismantlement property needs to be further increased (D)."

As shown in FIG. 16, the database which stores metal composite admissibility for material recycle holds, for each combination of metals, information representing whether the combination "has a potential demand as a recycled material (A)", "can have a composite admissibility if a new application purpose for the recycled material is found (B)", or "can have a composite admissibility upon technology development in the future (C)", or "separating is recommended, and the dismantlement property needs to be further increased (D)."

In the examples of databases shown in FIGS. 11 to 14, the type names of plastics as first components are listed in a vertical column, and the type names of plastics as second components are listed in a horizontal row. The order in the lists is not particularly limited. In addition, the types of plastics in the list of the first components need not always coincide with those in the list of the second components. In the examples shown in FIGS. 11 to 14, the same types of plastics are exemplified as the first and second components and listed in the same order to help understanding. In this table, each cell corresponding to the intersection between the column of a first component plastic and the row of a second component plastic stores a composite admissibility evaluation level for each determination element such as the impurity permissible dose, removal admissibility, compatibility, or marketability.

Referring to FIG. 11, each first component plastic is handled as a single component. Hence, the impurity density permissible when a second component is mixed as an impurity is expressed as weight percent with respect to the first component. When the impurity density is equal to or less than the permissible dose, it is determined that "composite is admissible".

FIG. 12 shows an example in which plastic composites are classified into a total of three levels, i.e., "an automatic screening technique is available", "an automatic discrimination technique is available, though screening is possible or impossible depending on a condition such as a shape or the like", and "screening is difficult." In accordance with setting by the evaluator, the highest level of the three levels or levels up to the second highest are determined as "composite is admissible."

Referring to FIG. 13, any arbitrary number of levels can be used for compatibility determination, as needed, as long as two levels, i.e., "the compatibility evaluation level is compatible" and "the compatibility evaluation level is incompatible" are included. FIG. 13 shows an example in which plastic composites are classified into three levels, i.e., "a compatible polymer blend", "an incompatible polymer blend that can be converted into a polymer alloy upon adding a compatibiliser", and "a composite that has never been converted into a compatible polymer." In accordance with setting by the evaluator, the highest level of the three levels or levels up to the second highest are determined as "composite is admissible".

FIG. 14 shows an example in which plastic composites are classified into three levels, i.e., "a commercially available polymer blend", "a combination having a marketability", and "a combination currently having a poor marketability." In accordance with setting by the evaluator, the highest level of the three levels or levels up to the second highest are determined as "composite is admissible".

In generating a database, plastics can be classified into various thermoplastic resins and thermosetting resins. Examples of such resins are polyethylene (PE), polypropylene (PP), polystyrene (PS), polyethylene terephthalate (PET), polybuthylene terephthalate (PBT), polycarbonate (PC), acrylonitrile-butadien-styrene copolymer (ABS), acrylonitrile-styrene copolymer (AS), polyamide (PA), polyvinyl chloride (PVC), polyvinylidene fluoride (PVDF), polymethyl methacrylate (PMMA), polyvinyl alcohol (PVA), polyacetal, petroleum resin, polyphenylene ether (PPE), urethane elastomer, urethane foam, epoxy resin, urea resin, phenol resin, unsaturated polyester, silicone resin, alkyd resin, melamine resin, synthetic rubber, natural rubber, general thermoplastic resins, and general thermosetting resins.

It is also effective in material recycle to classify resin products on the basis of their brand names and grades of resin products or the contents, types, and grades of additives that are integrated with molded resins, including bromine-, phosphorus-, and inorganic-based fire retardant additives, plasticizers such as dioctyl phthalate (DOP) and diethylhexyl phthalate (DEHP), colourants, inorganic fillers such as bulk mold compounds (BMC) and sheet mold compounds (SMC), organic fillers such as wood chips, and reinforcing fibers such as fiber reinforced plastics (FRP), printed boards, and halogen-free boards.

Metals can be classified as metal elements such as iron, copper, aluminum, nickel, chromium, zinc, lead, tin, cobalt, manganese, molybdenum, titanium, silicon, magnesium, arsenic, bismuth, cadmium, antimony, and lithium. It is also effective to classify metals as alloys as material products or materials with adjusted compositions. Examples of them are carbon tool steel, chromium-molybdenum steel, SUS304, SUS316, galvanized sheet, plated steel plate, painted steel plate, H2 steel plate, brass, bronze, beryllium copper, magnesium alloy, titanium alloy, tin-lead solder, tin-silver-based solder, and tin-zinc-based solder. These materials can further be classified depending on the composition ratio. The materials can also be classified by the shape such as a plate, foil, or die-cast or a process.

Even for other materials such as glass materials, the composite admissibility is evaluated by classification based on colors such as achromatism, green, or brown or classification based on components such as lead glass and heat-resistant glass. For paper and fiber materials, the composite admissibility is evaluated by pulp, plywood, wood chips, corrugated fiberboard, general machine-made paper/Japanese paper, surface-coated paper, and the like.

To generate the plastic composite admissibility database shown in FIG. 15, the evaluation tool designer or user sets, in accordance with the contents to be evaluated, the composite admissibility levels from the plurality of databases having two or more evaluation levels as shown in FIGS. 11 to 14, thereby generating the composite admissibility database. For example, a composite admissibility database can be generated by integrating the detailed database prepared on the basis of the plastic compatibility shown in FIG. 13 and the detailed database prepared on the basis of the marketability of polymer blend shown in FIG. 14.

The database has at least two composite admissibility evaluation levels, i.e., "admissible" and "inadmissible." Three or more levels may be set as needed. When a product or part to be subjected to recyclability evaluation contains two or more kinds of plastics, classifications regarded as admissible composites are selected from the two or more levels in the database in accordance with the user definition for contents to be evaluated. For example, the composite admissibility is ranked to five levels, and the upper two levels are output as admissible composites.

In this example, combinations of compatible polymer blends or already commercially available polymer blends having high marketability are determined as admissible composites from the composite admissibility databases prepared from the viewpoint of compatibility and marketability shown in FIGS. 13 and 14. Classifications which are not selected as admissible composites are determined as inadmissible composites.

FIG. 16 shows an example of a database prepared on the basis of composite admissibility of metals. In this metal composite admissibility database, metal types are listed in the column and row, and a composite admissibility evaluation level is stored in each cell corresponding to an intersection, like the plastic composite admissibility database. In this example of the database, the metal materials are classified from the viewpoint of removal admissibility by setting a total of three levels, i.e., "a combination containing metal materials that can be separated and removed by refining", "a combination containing metal materials that are difficult to separate but have low degrees of accumulation as impurities and require no urgent measures", and "a combination containing metal materials that are difficult to separate, have high degrees of accumulation as impurities, and require urgent measures".

Alternatively, a composite admissibility database can be generated on the basis of a detailed database of metal compatibility, a detailed database of marketability including compositions as commercially available alloys, or a detailed database of separability by a screening machine other than refining.

When the process according to the flow shown in FIG. 8 is executed using these databases, the resultant recycle contents and the computed values of recyclability ratios can be used to evaluate the environmental load of the product. More specifically, to give the "amount and contents of the recycling process" in used products and "basic units corresponding to these values", which are necessary in evaluating the environmental load of products in the product life cycle, the recyclability ratio and process contents derived on the basis of the composite information of materials contained in the product or part according to the present invention can be used.

FIG. 17 shows an example of a basic unit database for each presumed discard/recycling process classification.

Necessary basic unit data is extracted in accordance with the process classification presumed by the content determination flow of the discard/recycle shown in FIG. 10. As shown in FIG. 17, the basic unit items for, e.g., recyclability evaluation include waste basic units such as "collection yield", "process reduction ratio", "recycle ratio", "recycle index", "discard or recycling process running cost", "discard or recycle facility cost", and "processed article sales or transfer price." For environmental load evaluation, the basic unit items include waste basic units such as "energy", "CO2" (carbon dioxide), "NOx" (nitrogen oxides), "SOx" (sulfur oxides), "COD" (Chemical Oxygen Demand), and "BOD" (Biochemical Oxygen Demand). The basic unit items are used as original data for computation of the waste basic units. The original basic units may be supply amounts of power, fuel, chemicals, and the like supplied in each process. When necessary basic units are extracted from the basic unit database, recyclability evaluation and environmental load evaluation can be done.

[Determination of Discard Process Method]

Discard will be described next.

This apparatus can determine a discard process method to be used to evaluate the environmental load in the life cycle of a product or the like. For this determination, the user arbitrarily selects a classification appropriate for the object to be evaluated from a database having a plurality of discard process classification models and distribution ratios set for the respective classification models.

Figure 19:
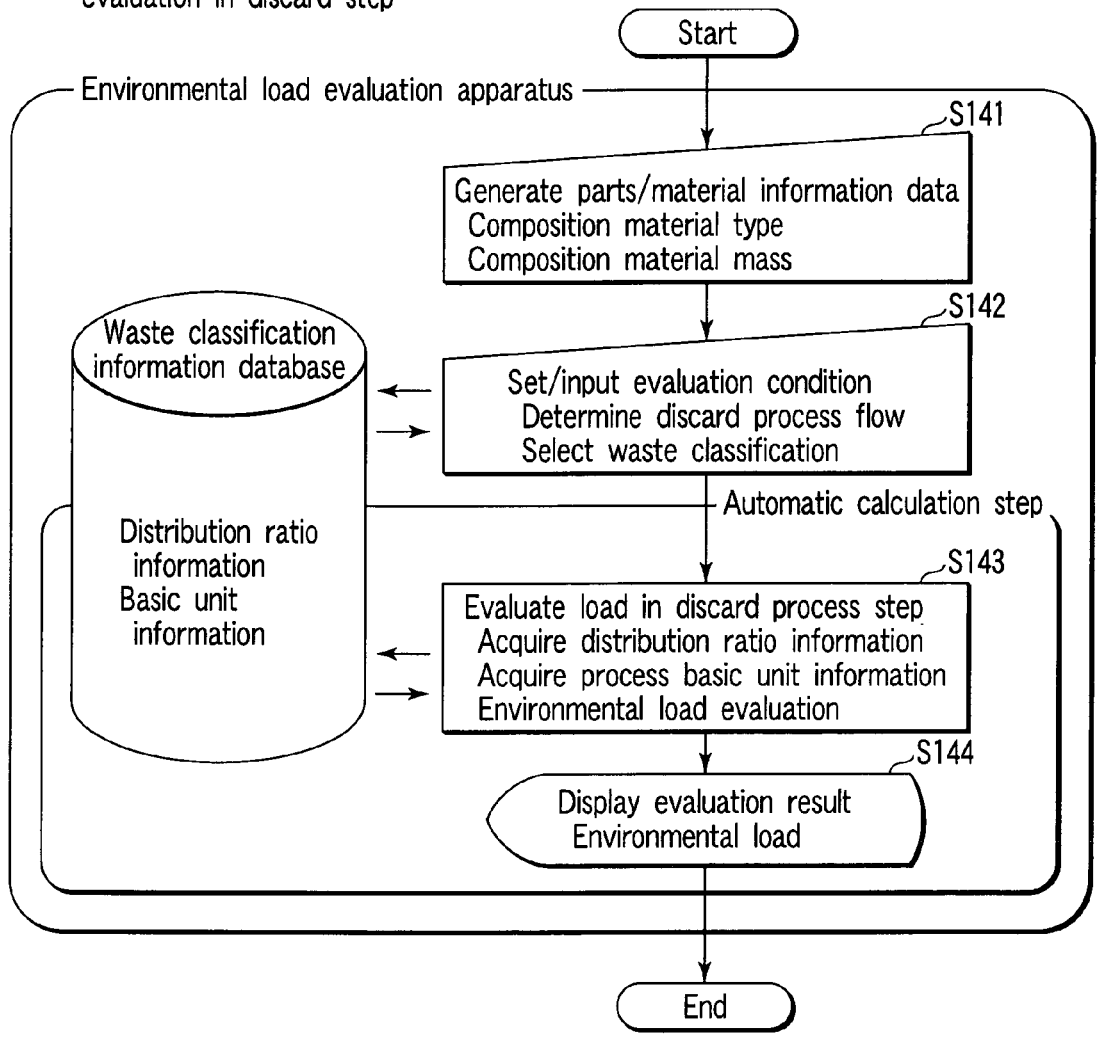
FIG. 19 is a flow chart showing the basic procedure of environmental load evaluation in the discard step.

FIG. 19 shows the environmental load evaluation procedure in the discard step. Environmental load evaluation in the discard step is executed in accordance with the following procedure.

[Step S141] (Generation of Parts/Material Database)

First, the processor 10 executes the recyclability evaluation program 103. The processor 10 executes the process for generating parts/material data from CAD data in accordance with the recyclability evaluation program 103, as described above (FIG. 6), thereby generating, e.g., a parts/material database for a product (corresponding to a used product to be evaluated in this example), as shown in FIGS. 7A and 7B.

[step S142] (Setting (Input) of Evaluation Conditions)

Evaluation conditions are set next. The discard process flow is based on a flow modeled for a general purpose and set again only when the flow particularly requires a change. For example, a modeled discard/recycling step process flow as disclosed in Jpn. Pat. Appln. KOKAI Publication No. 10-57936. The user selects a waste classification from the waste classification information database in consideration of the material composition of a used product or a used product after removal of recycle materials. This selection is done on the basis of, e.g., a classification by the distribution ratio database having contents as shown in FIGS. 18A and 18B.

[Step S143] (Waste Process Step Load Evaluation)

Distribution ratio information and process basic unit information are acquired from the waste classification information database. In addition, the waste product mass is multiplied by the process basic unit in accordance with the distribution ratio to compute the value of the environmental load. It is computed on the basis of, e.g., the distribution ratio information by the distribution ratio database shown in FIGS. 18A and 18B and process basic unit information by the basic unit database shown in FIG. 17.

[Step S144] (Output/Display of Evaluation Result)

The value of the computed environmental load is output and displayed. In the evaluation unit, steps S141 and S142 described above are executed by input from the input unit 15, and process S144 is executed for the output unit 14. In addition, the process in step S143 is executed in the evaluation unit (a process in the environmental load evaluation program 107 executed by the processor 10 that comprises the evaluation unit).

FIGS. 18A and 18B show an example of a distribution ratio database used to determine the distribution ratio in the process flow of the modeled discard/recycle step. Referring to FIGS. 18A and 18B, the first column corresponds to "classification rank 1" including the all wastes in Japan, the second column corresponds to "classification rank 2" including industrial wastes and municipal wastes defined by classifying the wastes in Japan, the third column corresponds to "classification rank 3" including a classification mainly for a dehydration process, a classification mainly for an incineration process, and a classification mainly for a shredding process, which are classified on the basis of the contents of intermediate processes mainly for industrial wastes, and urban garbage and business garbage defined by classifying municipal wastes on the basis of their waste sources, and the fourth column corresponds to "classification rank 4." In each column, waste classifications of industrial and municipal wastes classified in correspondence with classifications by main intermediate processes are listed as items.

In the first row of this database, distribution ratio items for steps of determining the distribution ratio in accordance with the process flow of the modeled discard/recycle step are listed. The contents include, e.g., the "distribution ratio in the step of recycle by the intermediate process" of a used product, the "distribution ratio of an amount to be incinerated to an amount subjected for landfill in the remaining amount that are not recycled", and the "distribution ratio of an amount to be subjected for landfill as an incineration residue in the incineration amount." Each row stores the value of distribution ratio for each step as a representative value in the classification item of each classification rank.

As a characteristic feature of the present invention, particularly, there is "classification 3" in which waste classifications of several types are classified and integrated in accordance with the viewpoint of intermediate process contents. To easily evaluate the environmental load by generalizing the process contents of a product on the basis of a specific representative flow and execute evaluation using the values of basic units and distribution ratios based on statistical data prepared in advance, how to arrange and use the statistical data is important. More specifically, this unit executes evaluation in accordance with the modeled process flow. Information necessary for evaluation is obtained from statistical data which are totalized in accordance with a process flow that does not completely coincide with the modeled process flow.

For example, waste classification is statistically done on the basis of a recycle amount, waste weight reducing amount, and landfill amount. At this time, the detailed contents of the weight reducing process are unknown. On the other hand, this unit executes environmental evaluation. The basic unit to be used for computation changes depending on the process contents of the weight reducing process, i.e., whether the process is incineration or dehydration. If the process contents are not taken into consideration and are uniformly regarded as incineration, a large error is generated in the evaluation result.

When a representative intermediate process is defined for each waste classification from the viewpoint of waste classification, the evaluation contents are largely improved. In classification from the viewpoint of the intermediate process, the magnitude of an environmental load such as an energy supply amount or $CO_2$ emission amount must be accurately taken into consideration.

In classification rank 3 shown in FIGS. 18A and 18B, the main intermediate processes are classified and modeled into "dehydration", "incineration", and "shredding etc". The contents and number of classifications are not limited to those in FIGS. 18A and 18B. The intermediate processes can be classified in accordance with arbitrary contents. For example, the intermediate processes may be classified into "drying", "cleaning", "compression", "screening", "deharming", "neutralization", "chemical process", "composting", "fuel generation", and the like. Not the intermediate processes but process handling routes may be used for classification. Municipal waste can also be classified in accordance with details of intermediate processes.

In FIGS. 18A and 18B, classification rank 3 is based on the waste sources. Municipal waste can also be classified in accordance with intermediate processes such as "incineration", "shredding", "composting", "other processes", and the like. In this case, examples of classification rank 4 are kitchen garbage, paper, plastics for incineration, glass bottles, cans, electrical appliances, and furniture for shredding, plants for composting, and batteries and fluorescent lamps for other processes.

As process handling routes, municipality's collection classifications such as "combustible waste", "incombustible waste", and "large-sized waste" can be used for detailed classification. The user who is going to execute evaluation can arbitrarily extract and use, from the table, distribution ratio data necessary for determining the distribution ratio in the modeled process flow. An item is selected from those of a classification rank that is determined to be most appropriate for the object to be evaluated, and necessary distribution ratio data is extracted from the row of the item and used.

The user who is going to execute evaluation can determine the distribution ratio in the process flow to be used for environmental load evaluation only by selecting the most appropriate classification from the database which is prepared in advance by comprehensive classification and arrangement based on the waste statistics shown in FIGS. 18A and 18B. For this reason, easy and accurate environmental load evaluation can be done in a short time.

This unit can evaluate the environmental load of a simple modeled object to be evaluated. In reality, actual values should be accumulated. However, in the present invention, statistical data and modeled flow are used such that the designer (evaluator) can easily compute the environmental load. Accordingly, approximate values of distribution ratios [%] for landfill, recycle, and incineration of one discard/recycle article can be grasped.

Detailed examples of actual evaluation results in this unit will be described next.

EVALUATION EXAMPLE 1

The recyclability of a product A containing metal-based composite materials was evaluated. The main composition of the product A was iron-based parts (50 [%]), copper-based parts (40 [%]), and iron-zinc-based parts (10 [%]). Recyclability evaluation was done for the entire product that was not disassembled. Composite admissibility data for iron and copper was extracted from a metal composite admissibility database having an arrangement as shown in FIG. 16. Assume that the evaluation is "C" ((detail): separation is recommended and dismantlement property needs to be improved, (classification): refining separation is difficult and the degree of accumulation (degree of necessity of urgent measures) is high). In this case, the evaluation result reveals that when the product A is disassembled, removal by refinement is difficult.

A composite of iron and copper has no marketability. Hence, in the process according to the recycle content determination flow shown in FIG. 10, the process contents for the product A are determined as a metal and "discard", the impurity dose is NG (S110 and S111), the removal admissibility and compatibility are NG (S112 and S113), and the marketability is not present. As a result, the recyclability of an iron-copper composite part which is valueless in the scrap market is determined as low, and the recyclability ratio is computed as 0 [%]. Actually, iron-copper composite parts in the scrap market is hardly valuable, and most of them are subjected to landfill. Hence, the actual recyclability ratio computation accuracy is high. In this way, an evaluation result that the product A that is not disassembled is inappropriate for recycle is obtained. To make use of the product A for recycle as much as possible, evaluation is done assuming that the product A is disassembled.

The product A is a structure by a combination of copper-based parts, iron-based parts, and iron-zinc-based parts. In this case, the recyclability of the product A is evaluated assuming a design that allows to raise the dismantlement level of the product A and separate the copper-based parts, i.e., dismantle and separate the product A into two kinds of parts: copper-based parts and the iron- and iron-zinc-based parts.

To check the product A under this condition, composite admissibility data for a composite of iron and zinc is extracted from the metal composite admissibility database shown in FIG. 16. Assume that the evaluation result is "A" ((detail): potential demand for recycled article is present, (classification): refining separation is possible or application purpose for alloy is present). Hence, when the product A has a structure which can be dismantled/separated two kinds of parts: copper-based parts and the iron- and iron-zinc-based parts such that the copper-based parts can be dismantled/separated, and the product A is dismantled to this level, separated, and collected, zinc can be removed and separated by refinement.

In the recycle content determination flow shown in FIG. 10, it is determined as the process content for the copper-based parts as a single component that material recycle as a part material of the same level can be expected at a high possibility without executing any process such as refinement. It is determined that closed material recycle is possible which allows reuse of parts to the same application purpose only by remolding in the manufacturer without any process such as refinement by an external disposal agent. Hence, the recyclability ratio of the copper-based parts is output as 100 [%].

For the iron- and iron-zinc-based parts, removal separation technique is available, although they do not contain a single component. Hence, these parts can be subjected to material recycle by refinement such as oxidation-reduction. Hence, it is determined that the iron- and iron-zinc-based parts can be subjected to open material recycle (material recycle which requires refinement by an external disposal agent). In evaluation, the recycle yield by refinement is taken into consideration. The recyclability ratio of the iron- and iron-zinc-based parts is output as, e.g., 90 [%]. As a result, the product A which is determined to have a recyclability ratio of 0 [%] in the disassembled state can be recycled by changing its design to separate parts containing an inadmissible composite material by dismantlement. This analysis indicates that a recyclability ratio of 95 [%] can be ensured for the entire product containing copper-based parts (50 [%]) and iron- and iron-zinc-based parts 45 [%])

When the discard/recycle cost per unit weight for each process method and the sales price of collected articles, which are extracted from the waste/recycling process classification/basic unit database shown in FIG. 17, are totalized using a process method and part weight determined by the above-described recyclability evaluation, the discard/recycle cost under the evaluation condition of this evaluation example can be computed. When the product is not disassembled, it is determined that the product should be entirely discarded. Hence, the landfill discard cost per product is computed as 40 yen. When the product is disassembled, the dismantlement cost, the mechanical shredding and screening cost of iron-based parts, and the collected article sales price are totalized. The cost is –50 yen. That is, a profit of 50 yen is obtained by recycle.

FIG. 20 shows an example of a recyclability evaluation result display window. In the example shown in FIG. 20, output conditions that the recycle range should be discriminated depending on the process method range or whether there is a charge for receiving a collected article are set and displayed. In addition, the product profile such as a product name, the recyclable mass, discard mass, recyclability ratio, discard/recycle cost, and the like are displayed. Furthermore, comparison data by trial calculations at different dismantlement levels for different products or same product can be displayed. Detailed information containing the evaluation contents arranged for each part or process method can be displayed on another window that can be invoked from this window. In FIG. 20, the recycle range is limited to reuse, material recycle to the same application purpose, and material recycle for cascade use, and the recyclable mass is totalized only when the collected article is received for a charge. As the product recyclability evaluation result, an evaluation result when the product A of this evaluation example is disassembled into iron-based parts and copper-based parts is displayed. As comparison data, a result obtained when the recyclability was evaluated for the product A which is not disassembled in the evaluation example is transferred and displayed.

As described above, when the recyclability is evaluated while reflecting the material composite state, the evaluation accuracy becomes high, and the recyclability improvement effect by dismantlement is explicitly indicated. In addition, a detailed numerical value of the recyclability ratio that can be ensured at a certain dismantlement level can also be known.

Environmental load evaluation was done using the recycle contents and recyclability value derived in the above-described manner. In product design, when examination contents such as selection of metal materials which were combined in one product and the dismantlement level of parts that could easily be dismantled were reflected, the environmental load evaluation result varied. Hence, an environment-friendly product could be more specifically designed.

EVALUATION COMPARATIVE EXAMPLE 1

Evaluation Comparative Example 1 is an evaluation example by the prior art in which evaluation for the product A of Example 1 is done. Iron and copper are recyclable. These materials are processed as recyclable materials only on the basis of their material names. Hence, the recyclability ratio of each of iron and copper is totalized as 100 [%] Even when iron parts and copper parts are mixed, the recyclability ratio of these parts is computed as 100 [%]. The resultant evaluation result output is largely different from the evaluation of value in the actual scrap market. Even evaluation is done assuming that the copper-based parts and the iron- and iron-zinc-based parts are dismantled in advance, the totalized recyclability ratio of these parts is computed as 100 [%]. For this reason, in the conventional method, the recyclability improvement effect is unknown at all, and it is impossible to determine the necessity of dismantlement.

EVALUATION EXAMPLE 2

The recyclability of a product B containing plastic-based composite materials was evaluated by the apparatus of the present invention. The main composition of the product B is polyethylene (to be referred to as PE hereinafter)—based parts (30 [%]), polyvinyl-chloride (to be referred to as PVC hereinafter)—based parts (20 [%]), polystyrene (to be referred to as PS hereinafter)—based parts (40 [%]), and polymethyl-methacrylate (to be referred to as PMMA hereinafter)—based parts (10 [%]). Recyclability evaluation was done for the entire product that was not disassembled. Composite admissibility data for the four contained materials is extracted from the plastic composite admissibility database shown in FIG. 15. As is apparent, the composite admissibility for the combination of PE and PMMA is low because of the compatibility or development case of compatibiliser and marketability. By the recycle content determination flow shown in FIG. 10, it is determined as process contents that one-way material recycle such as blast furnace reducing material generation or solid fuel generation or heat recovery after a liquefaction process is appropriate. As a result, it is determined that the waste plastics of the product B can be subjected to only cascade recycle as low-level articles.

When the recycle range is limited to material recycle as a material, the recyclability ratio is computed as 0 [%]. The value of a plastic composite as a material is low in the actual waste plastic market. Hence, the accuracy of the recyclability ratio is high. The recyclability of the product B is evaluated assuming a design that allows to raise the dismantlement level of the product B and separate the product B into two kinds of parts: PE- and PVC-based parts and the PS- and PMMA-based parts. Under this condition, composite admissibility data when PE- and PVC-based parts are mixed is extracted from the plastic composite admissibility database shown in FIG. 15. As can be seen, polymer alloying using a compatibiliser is possible, and some marketability can also be expected in terms of characteristics because a commercially available PE-PVC polymer blend is present.

By the recycle content determination flow shown in FIG. 10, it is determined as process contents that since the material contains no single component and is difficult to completely separate and remove, it cannot be subjected to closed material recycle for the same application purpose, though open material recycle for another application purpose through an external disposal agent is possible. The recycle yield is taken into consideration, and the recyclability ratio of the PE- and PVC-based parts is output as 80 [%] On the other hand, composite admissibility data when PS and PMMA are mixed is extracted. Although a polymer alloying case using a compatibiliser is present, no commercially available PS-PMMA polymer blend is present. Hence, no so high marketability as a material can be expected presently from the viewpoint of characteristics and usefulness.

By the recycle content determination flow shown in FIG. 10, it is determined as process contents that one-way material recycle such as blast furnace reducing material generation or solid fuel generation or heat recovery after a liquefaction process is appropriate. As a result, it is determined that the PS- and PMMA-based composite parts can be subjected to only cascade recycle as low-level articles. When the recycle range is limited to material recycle as a material, the recyclability ratio is computed as 0 [%].

As a result, when the design of the product which is determined to have a recyclability ratio of 0 [%] upon disassembly is changed to separate parts containing an inadmissible composite material by dismantlement, the recyclability ratio of 40 [%] of the PE- and PVC-based parts and that of 0 [%] of the PS- and PMMA-based parts are totalized so that the recyclability ratio of the entire product can be increased to 40 [%]. When the recyclability is evaluated while reflecting the material composite state, the evaluation accuracy becomes high, and the recyclability improvement effect by dismantlement is explicitly indicated.

Environmental load evaluation was done using the recycle contents and recyclability value derived in the above-described manner. In product design, when examination contents such as selection of plastic materials which were combined in one product and the dismantlement level of parts that could easily be dismantled were reflected, the environmental load evaluation result varied. Hence, an environment-friendly product could be more specifically designed.

Figure 21:
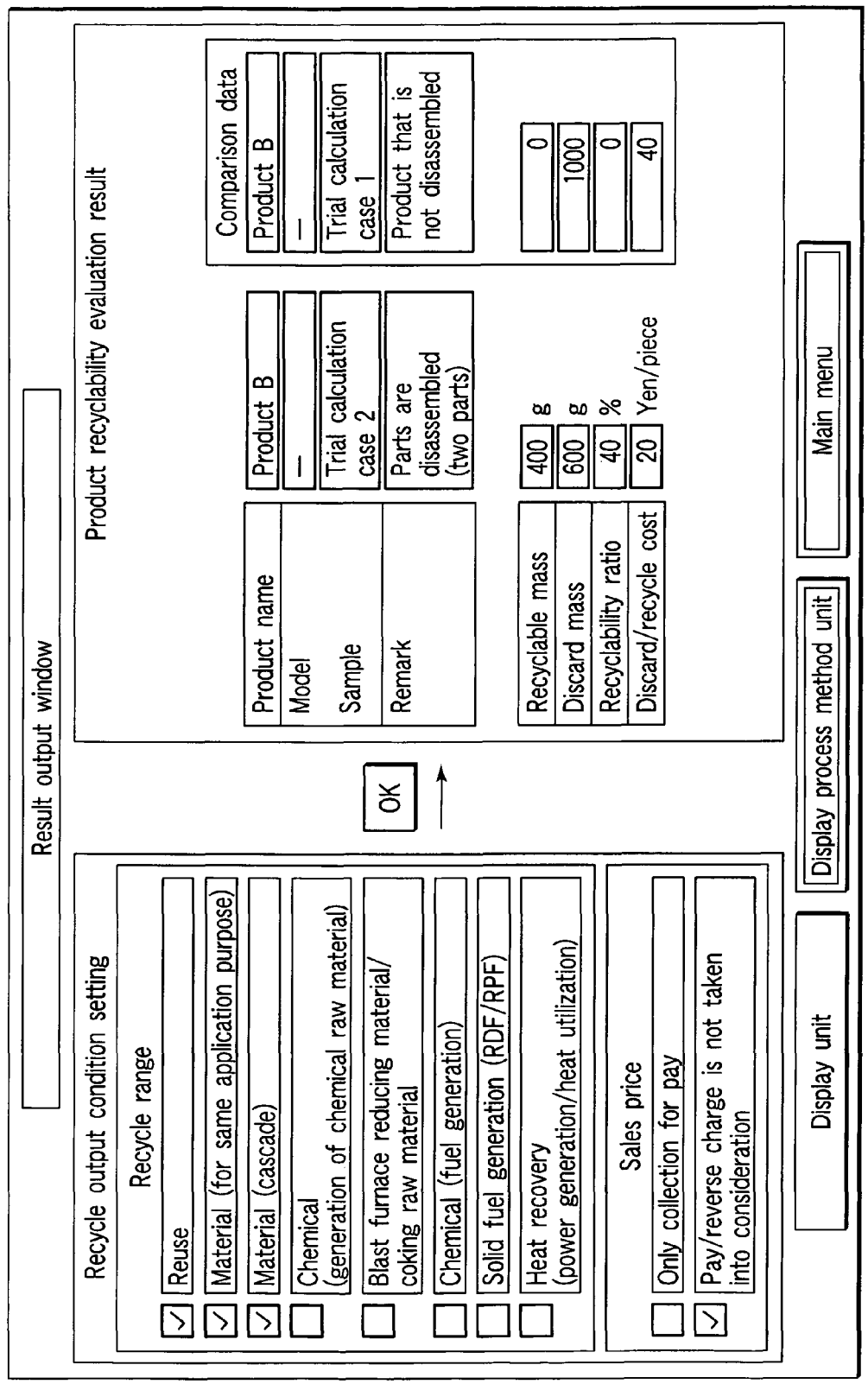
FIG. 21 is a view showing another example of the evaluation result output window.

For reference, an example of the output window of the evaluation result in this case is shown in FIG. 21.

EVALUATION COMPARATIVE EXAMPLE 2

An evaluation comparative example by the prior art will be described as a comparative example to Example 2. When PE, PVC, PS, and PMMA are assumed to be single components, they can be melted and remolded. The recyclability ratio of each material is totalized as 100 [%]. Even for a part containing a plurality of plastic materials, the recyclability ratio is computed as 100 [%]. The resultant evaluation result output was largely different from the evaluation of value in the actual scrap market. Even evaluation is done assuming that the material recycle and the PS- and PMMA-based parts are dismantled in advance, the totalized recyclability ratio is computed as 100 [%]. For this reason, in the conventional method, the recyclability improvement effect is unknown at all, and it is impossible to determine the necessity of dismantlement.

EVALUATION EXAMPLE 3

The recyclability of a product C containing plastic-based composite materials, glass material, and metal-based composite materials was evaluated by the apparatus of the present invention. This corresponds to, e.g., evaluation of a desktop personal computer. In this case, a distribution ratio in the modeled flow in the discard/recycling process step for evaluating the recyclability and environmental load is determined.

As general information that is available in advance, about 60% of desktop personal computers are sold and used for industrial use over the nation, and about 40% for home use. In a general process route, used products from offices are taken back as industrial wastes, undergo the intermediate process and waste generation reducing process by disposal agents, and are finally subjected to landfill. Used products from general homes are collected as large-sized wastes as municipal wastes or collected by retailers or used product shops. They also undergo the intermediate process and waste generation reducing process by disposal agents and are finally subjected to landfill. More detailed process contents and amounts can be acquired only by field work. To suppress the cost and work load and easily execute evaluation in a short time, a classification appropriate for the object to be evaluated is selected from the classifications based on waste classification statistic shown in FIGS. 18A and 18B and used for evaluation.

The iron parts of the cabinet and the glass member of the display of a desktop personal computer are excluded as recycle articles. It is most appropriate to classify the remaining parts to waste plastics. Hence, the classification of waste plastics is selected. The distribution ratio of parts for landfill to those for incineration, and the value of ratio of residue that is incinerated and then subjected to landfill are extracted from FIGS. 18A and 18B. Using these distribution ratios in the process flow, environmental load evaluation was done. As a result, environmental load evaluation using standard values of waste disposal in Japan could easily be done in a short time.

EVALUATION COMPARATIVE EXAMPLE 3

As a comparative example to Evaluation Example 3, an evaluation comparative example by the prior art will be described. Evaluation for a product with the same conditions as those of Evaluation Example 3 can be done in the following way. First, data for distribution ratios in a predicted process flow is collected by field work and determined. The distribution ratios are determined on the basis of a result obtained by tracing five cases of process of used products, and environmental load evaluation is done.

In this case, when actual field work was done, it took about two months until the evaluation was ended. In addition, the cost and work load for field work were high. In addition, although the obtained distribution ratios were based on field work, they could not be regarded as average values in Japan because the number of samples was limited, and the survey was insufficient. For this reason, it was also difficult to regard the environmental load evaluation result computed using the distribution ratios as a standard evaluation result of the product to be evaluated.

As described above, according to the embodiment, a new database is formed by putting together a mixture admissibility of materials according to various materials such as metallic material and polymer system materials.

An input product or part to be evaluated is evaluated about mixture composition permitted for recycling to determine recycling of components of the product. Therefore, the evaluation of recyclability and environment load about a plurality of materials mixture products can be realized simply and accurately, while changing various kinds of conditions on the desk. For this reason, there is realized the effective evaluation support that a designer can make product design in consideration of recyclability to recycle the life-expired products as resources.

<Operation of Recyclability Evaluation Unit>

Figure 22:
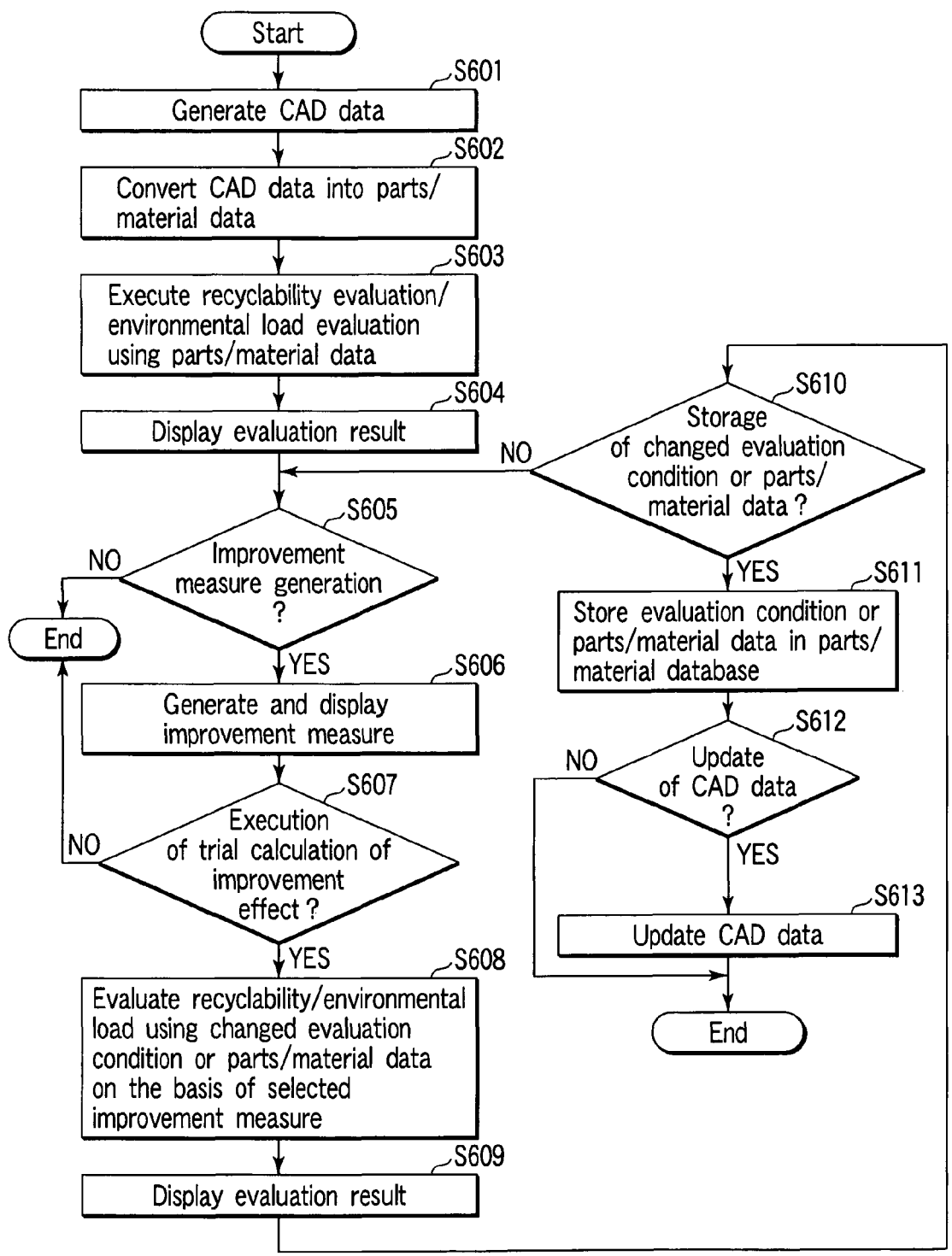
FIG. 22 is a flow chart for explaining the operation of the entire recyclability evaluation unit shown in FIG. 1 or 2.

The operation of the entire recyclability evaluation unit shown in FIG. 1 or 2 will be described next with reference to the flow chart shown in FIG. 22. The operation will be described on the basis of the recyclability evaluation unit having the arrangement shown in FIG. 2.

The processor 10 mainly executes the CAD program 105 in the memory 100 to generate CAD data (step S601). When the processor 10 executes the parts/material data generation program 106 in the memory 100, the CAD data is converted into parts/material data. The parts/material data is stored in the parts/material database, as shown in FIGS. 7A and 7B (step S602).

In step S603, on the basis of the parts/material data of each product, which is stored in the parts/material database, the recyclability and environmental load of the product are evaluated. More specifically, the processor 10 executes the recyclability evaluation program 103 in the memory 100 to perform recyclability evaluation as described above on the basis of the parts/material data shown in FIGS. 7A and 7B. In addition, the processor 10 executes the environmental load evaluation program 107 in the memory 100 to perform environmental load evaluation as described above on the basis of the parts/material data as shown in FIGS. 7A and 7B. The recyclability and environmental load evaluation results are displayed on a predetermine display serving as the output unit 14 (step S604).

Figure 23:
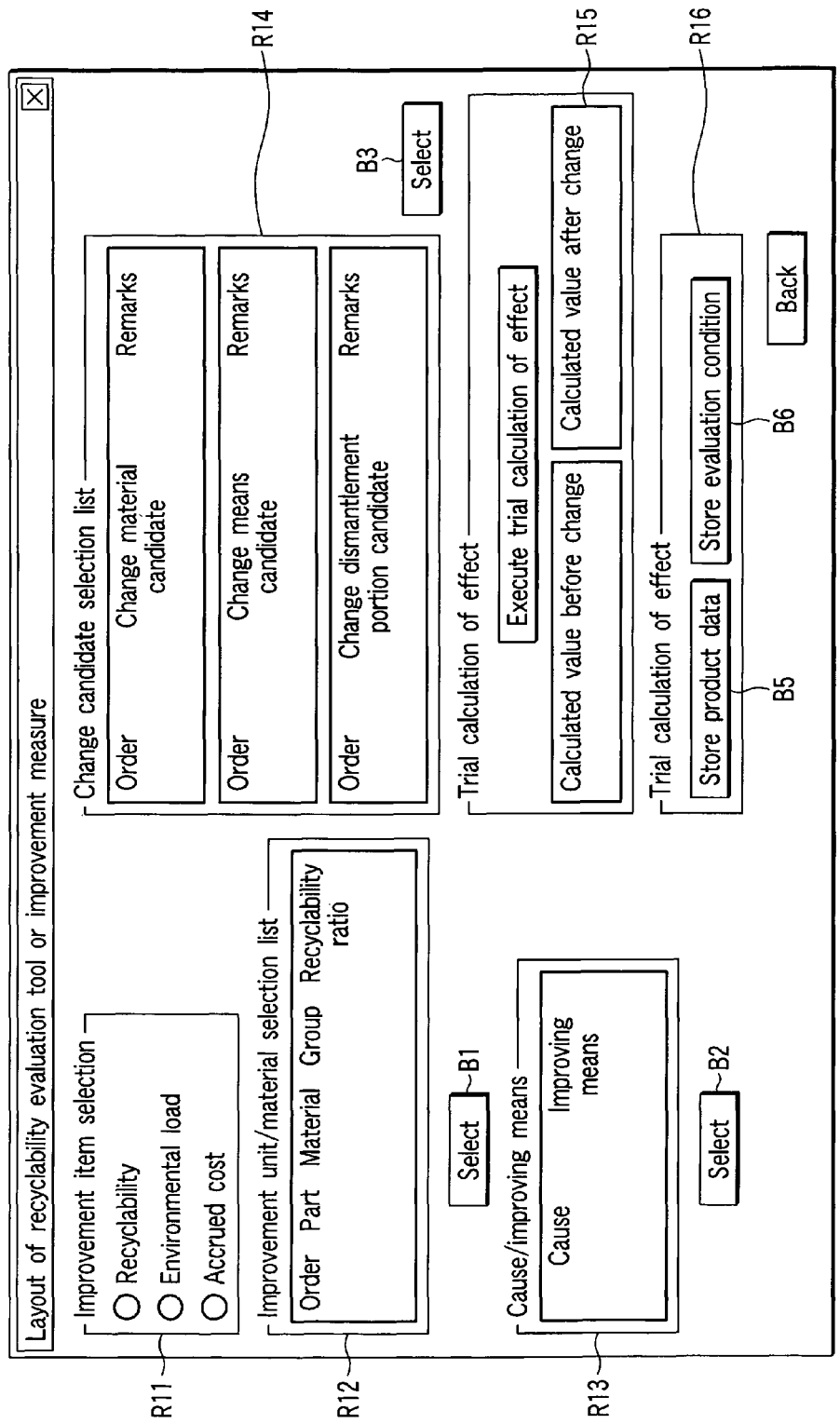
FIG. 23 is a view showing a display example of a window which is displayed on the display serving as the output device when the processor starts executing an improvement proposal generation process program in the memory.

When the user performs predetermined operation, the processor 10 starts executing an improvement proposal generation process program 108 in the memory 100, and a window as shown in FIG. 23 is displayed on the display serving as the output unit 14. In a region R11 on this window, one of the recyclability, environmental load, and accrued cost can be selected as an improvement item. The user selects a desired one of the three items. When, e.g., the recyclability is selected as an improvement item on the basis of the above-described recyclability and environmental load evaluation results, the part/materials of the product are listed in a region R12 in descending order of, e.g., unrecyclable mass. When the environmental load or accrued cost is selected as an improvement item, the part/materials are listed in descending order of, e.g., environmental load or accrued cost. Furthermore, for each part/material displayed in the region R12, causes (recyclability impeding factors) that deteriorate the recyclability or causes (environmental load or cost increasing factors) that increase the environmental load or accrued cost are analyzed. The recyclability impeding factors/environmental load or cost increasing factors obtained as an analysis result, and improvement measures corresponding to these factors are displayed in a region R13 (steps S605 and S606).

As an improvement measure, the evaluation condition used to evaluate the recyclability or environmental load (including the cost) is changed, or the parts/material data is improved.

As the recyclability impeding factors/environmental load or cost increasing factors displayed in the region R13 and a more detailed improvement measure for improvement measures for the impeding factors/increasing factors (when a plurality of improvement measures are displayed, one improvement measure selected by the user), for example, a list of alternative part/materials, a list of alternative recycling methods, or a part/material dismantlable portion is displayed in a region R14 on the window shown in FIG. 23.

When a desired one of the alternative part/materials, alternative recycling methods, and part/material dismantlable portions displayed in the region R14 on the window shown in FIG. 23 is selected (selection operation such as click is performed with a pointing unit such as a mouse), of parts/material data stored in the parts/material database, data corresponding to the selected part/material is temporarily changed, or the evaluation condition is changed. Then, the improvement effect of the recyclability or environmental load (including the cost) is computed as a trial (steps S607 and S608).

The change of the parts/material data or evaluation condition is only temporary. The parts/material data held in the parts/material database used in step S603 or the evaluation condition held (stored) to evaluate the recyclability or environmental load (including the cost) is not updated.

The trial computation of the improvement effect can be implemented by causing the processor 10 to execute the recyclability evaluation program 103 or environmental load evaluation program 107 in the memory 100 on the basis of the changed parts/material data or evaluation condition. Execution of the trial computation of the improvement effect is started by selecting an "execute effect trial computation" button in a region R15 shown in FIG. 23 with a mouse or the like. The improvement effect evaluation result is displayed in the region R15 on the window shown in FIG. 23 (step S609).

The user reviews the evaluation result. To update the parts/material data in the parts/material database or the stored evaluation condition on the basis of the changed parts/material data or evaluation condition, a "store product data" button B5 or "store evaluation condition# button B6 arranged in a region R16 on the window shown in FIG. 23 is selected with the mouse or the like. Accordingly, the parts/material data in the parts/material database or the stored evaluation condition itself is updated to the changed contents. That is, the parts/material database or evaluation condition in the storage unit 16 is replaced with the parts/material data or evaluation condition used for trial computation of the improvement effect (steps S610 and S611).

When the user performs predetermined operation after updating the parts/material data in the parts/material database, the parts/material data is converted into CAD data containing at least the names, amounts, and number of parts that constitute the product (steps S612 and S613).

To generate an improvement proposal for the recyclability, environmental load, or cost, the storage unit 16 stores an improvement proposal basic information database. This database may hold information tables as shown in FIGS. 31 to 35.

In the first table shown in FIG. 31, pieces of information representing the recyclability of each part/material, a recycling method that can be applied to the part/material if it is recyclable, and the values of environmental load and cost corresponding to each recycling method are registered in advance. The first table stores information representing whether each part/material is formed by connecting (jointing) a plurality of part/materials, and the address of link destination on the second table shown in FIG. 32 if the part/material is formed by connecting (jointing) a plurality of part/materials. The first table also stores information representing whether each part/material has a specially designated type of transport machine, and the address of link destination on the third table shown in FIG. 33 if the part/material has a specially designated type of transport machine.

In the second table shown in FIG. 32, for each part/material which is constituted by connecting (jointing) a plurality of part/materials, pieces of information representing the connection (joint) portion, whether the part/material dismantles at the connection portion, and if the part/material dismantles, the connection method (for example, a type of connection method such as connection (joint) by soldering or connection (joint) by a screw) of that portion and a type of dismantling method (for example, detaching a screw manually or using a drill, melting the solder, cutting, or peeling) corresponding to the type of connection method, and values of environmental load and cost corresponding to each type of dismantling method are registered in advance.

In the third table shown in FIG. 33, for each part/material having a designated type of transport machine, the type of transport machine designated for the part/material and the values of environmental load and cost corresponding to each type of transport machine are registered in advance.

In the fourth table shown in FIG. 34, part/materials having the same function are classified for all part/materials.

In the fifth table shown in FIG. 35, for a part/material that is actually formed of a plurality of part/materials but normally handled as one part/material, the kinds of materials of the part/material and the standard values of the mass and density are registered. In addition to the information shown in FIG. 35, information as shown in FIGS. 31 to 33 may also be registered.

Of the tables registered in the improvement proposal basic information database shown in FIGS. 31 to 35, especially the first and second tables shown in FIGS. 31 and 32 can be generated on the basis of the information held in various databases already stored in the storage unit 16. Hence, when the information in the base database is updated, the registered contents of the first and second tables in the improvement proposal basic information database are also updated. In the following description, "register" means not registering data in a table in the improvement proposal basic information database but registering data in the base database used to generate the table unless otherwise specified.

The process operation in steps S605 and S606 in FIG. 22 when the user selects "recyclability" as an improvement item from the region R11 on the window shown in FIG. 23 will be described with reference to FIGS. 25 and 26 in accordance with the flow chart shown in FIG. 24.

FIGS. 25 and 26 show the correlation between a recyclability impeding factor analysis method, recyclability impeding factors (causes) obtained upon analysis, and evaluation conditions and parts/material data improvement measures corresponding to the impeding factors.

As described above, in step S33 of FIG. 8, the recyclable mass of each part/material is computed. Simultaneously, a mass (unrecyclable mass) that cannot be recycled may be computed for each part/material. For example, a value obtained by subtracting the recyclable mass of a part/material from its mass may be obtained as an unrecyclable mass.

On the basis of the unrecyclable mass computed for each part/material, the part/materials are displayed in the region R12 on the window as shown in FIG. 23, which is displayed on the display serving as the output unit 14, in descending order of unrecyclable mass (step S621). For each of the displayed part/materials, the recyclability impeding factor (cause) is analyzed (step S622).

First, for a part/material (part/material of interest) having a large unrecyclable mass, the following items are checked with reference to parts/material data in the parts/material database as shown in FIGS. 7A and 7B (A1 to A4 correspond to "cause check item" sections in FIGS. 25 and 26).

(A1) Is the part/material itself unrecyclable?

(A2) Is the raw material classification of the part/material "others"?

(A3) Does the part/material contain a plurality of raw materials?

(A4) Does the part/material contain a plurality of materials?

To check whether the part/material corresponds to (A1), the first table as shown in FIG. 31 is referred to, thereby checking the recyclability of the part/material registered in the first table. If the part/material is registered as "unrecyclable", it can be determined that the fact that the part/material is not recyclable is the recyclability impeding factor (step S622). In this case, the impeding factor "the part/material is not recyclable" is displayed in the region R13 on the window shown in FIG. 23 (step S623). As is apparent from FIG. 25, an example of the evaluation condition changing method as an improvement measure for the impeding factor is a method of registering the part/material as a recyclable part/material (e.g., "unrecyclable" on the first table shown in FIG. 31 is rewritten to "recyclable"). An example of the parts/material data improving method is a method of changing the part/material to a recyclable part/material. These methods are displayed in the region R13 on the window shown in FIG. 23 as the recycle improving unit corresponding to the impeding factor together with the impeding factors (step S624).

For example, when the user selects the parts/material data improving method from the improving unit displayed in the region R13, as a more detailed improvement measure of the method, for example, other part/materials which have the same function as that of the part/material and are recyclable are displayed in the region R14 on the window shown in FIG. 23 as change candidates of the part/material (step S625).

First, other part/materials having the same function as that of the part/material are obtained by referring to the fourth table shown in FIG. 34. Then, of these part/materials, part/materials registered as "recyclable" are displayed in the region R14 shown in FIG. 23 by referring to the first table shown in FIG. 31.

To check whether the part/material corresponds to A2, it is checked by referring to the parts/material data shown in FIGS. 7A and 7B whether the raw materials that constitute the part/material are classified to "others." If the raw materials are classified into "others," it can be determined that the fact that whether the part/material can be recycled cannot be determined because the materials of the part/material are unknown, or no recycling method can be applied to the part/material whose raw material classification corresponds to "others" is the recyclability impeding factor (step S622). In this case, the impeding factors "recyclability is unknown because the material information is unknown" and "no recycling method can be applied to the part/material" are displayed in the region R13 on the window shown in FIG. 23 (step S623).

As is apparent from FIG. 25, an example of the evaluation condition changing method as an improvement measure corresponding to the former impeding factor is a method of registering more detailed parts/material data for the part/material. An example of the evaluation condition changing method for the latter impeding factor is a method of newly registering a recycling method which can be applied to the part/material. These methods are displayed in the region R13 on the window shown in FIG. 23 as the recyclability improving unit corresponding to the impeding factors together with the impeding factors (step S624).

As is apparent from FIG. 25, in the parts/material data improving method for the former impeding factor, parts/material data registered in advance as standard values for the part/material is read out from the fifth table shown in FIG. 35 and displayed in the region R14 on the window shown in FIG. 23 (step S625).

As is apparent from FIG. 25, in the parts/material data improving method for the later impeding factor, a recycling method that can be applied to the part/material is read out from the first table shown in FIG. 31 and displayed in the region R14 shown in FIG. 23 as a change candidate (step S625).

To check whether the part/material corresponds to A3, it is checked by referring to the parts/material data shown in FIGS. 7A and 7B whether the part/material is constituted by a plurality of raw materials. If the part/material is constituted by a plurality of raw materials (raw materials correspond to items of upper classification of materials in a case wherein the part/material is made of, e.g., a metal and a plastic), it can be determined that the fact that whether the collectable material and recyclability ratio are limited is the recyclability impeding factor (step S622). In this case, the impeding factor "when the part/material is made of a plurality of raw materials, the collectable material and recyclability ratio are limited" is displayed in the region R13 on the window shown in FIG. 23 (step S623).

As is apparent from FIG. 25, an example of the evaluation condition changing method as an improvement measure corresponding to the impeding factor is a method of making the raw materials of different kinds dismantlable and setting another part/material. An example of the parts/material data improving method is a method of changing the part/material to that constituted by a single raw material. These methods are displayed in the region R13 on the window shown in FIG. 23 as the recyclability improving unit corresponding to the impeding factor together with the impeding factor (step S624). For example, when the user selects the evaluation condition changing method from the improving unit displayed in the region R13, as a more detailed measure proposal of the method, for example, portions at which the part/material dismantles are displayed in the region R14 on the window shown in FIG. 23 as text data or image data (step S625).

First, the presence/absence of portions at which the part/material is dismantled is checked by referring to the first table shown in FIG. 31. If such portions are present, portions at which the part/material dismantles are obtained on the basis of the dismantlement portions and dismantlement possibility of the part/material by referring to the second table. The portions at which the part/material dismantles are displayed in, e.g., the image of the part/material in the region R14 shown in FIG. 23.

For example, when the user selects the parts/material data changing method from the improving unit displayed in the region R13, as a more detailed measure proposal of the method, for example, the raw material compositions in the part/material are displayed in the region R14 on the window shown in FIG. 23 in descending order of mass (step S625). The sum of masses of the raw materials of the part/material is computed from the parts/material data shown in FIGS. 7A and 7B, and the raw materials are displayed in the region R14 on the window shown in FIG. 23 in descending order of the sum.

To check whether the part/material corresponds to A4, it is checked by referring to the parts/material data shown in FIGS. 7A and 7B whether the part/material is constituted by a plurality of materials. If the part/material is constituted by a plurality of materials (materials correspond to items of sub-classification of materials in a case wherein the part/material is made of, e.g., metal 1 and metal 2 of the raw material "metal"), and the composite admissibility cannot be determined, the part/material is determined as "unrecyclable". It can be determined that this fact is the recyclability impeding factor (step S622). In this case, the impeding factor is displayed in the region R13 on the window shown in FIG. 23 (step S623).

As is apparent from FIG. 26, an example of the evaluation condition changing method as an improvement measure corresponding to the impeding factor is a method of making the part/material dismantlable in accordance with the kinds of the materials and using a plurality of part/materials. Examples of the parts/material data improving method are a method of changing the part/material to that constituted by a single material and a method of changing the material whose composite admissibility cannot be determined to a material with composite admissibility. These methods are displayed in the region R13 on the window shown in FIG. 23 as the recyclability improving unit corresponding to the impeding factor together with the impeding factor (step S624). For example, when the user selects the evaluation condition changing method from the improving unit displayed in the region R13, as a more detailed measure proposal of the method, for example, portions at which the part/material dismantles are displayed in the region R14 on the window shown in FIG. 23 as text data or image data, as described above (step S625).

When the user selects the former of the parts/material data improving methods from the improving unit displayed in the region R13, as a more detailed measure proposal of the method, for example, the material compositions in the part/material are displayed in the region R14 on the window shown in FIG. 23 in descending order of mass (step S625). The sum of masses of the materials of the part/material is computed from the parts/material data shown in FIGS. 7A and 7B, and the raw materials are displayed in the region R14 on the window shown in FIG. 23 in descending order of the sum.

When the user selects the latter of the parts/material data improving methods from the improving unit displayed in the region R13, as a more detailed measure proposal of the method, for example, part/materials having composite admissibility with other materials are displayed in the region R14 on the window shown in FIG. 23 as change candidates (step S625). Alternatively, other part/materials which have the same function as the part/material and are constituted by a single material or materials of different kinds which are recyclable may the displayed. For example, when "composite admissibility" of each material such as metal composite admissibility information as availability information of metal composites or plastic composite admissibility information as availability information of plastic composites, which is stored in the recyclability evaluation information database 160 is referred to, the above detailed proposal can be generated and displayed.

The process operation in steps S605 and S606 in FIG. 22 when the user selects "environmental load" or "accrued cost" as an improvement item from the region R11 on the window shown in FIG. 23 will be described with reference to FIGS. 28 to 30 in accordance with the flow chart shown in FIG. 27.

FIGS. 28 to 30 show the correlation between an environmental load/cost deteriorating factor analysis method, deteriorating factors (causes) obtained upon analysis, and evaluation conditions and parts/material data improvement measures corresponding to the deteriorating factors. In the following description, the unit computes the environmental load or cost in the step of collecting a product as a waste and dismantling and recycling the product. The environmental load or cost generated from each step may be computed for all steps from the product manufacturing step to the step of collection, dismantlement, and recycle.

The environmental load basic unit generated or cost accrued when a product is collected as a waste changes depending on the type of transport machine such as a truck which transports the product. The environmental load basic unit generated or cost accrued at the time of dismantlement also changes depending on, e.g., the type of dismantlement method (unit). In this apparatus, the environmental load basic unit database stores an environmental load basic unit for each type of transport machine or each type of dismantlement method (unit), which is generated on the basis of, e.g., input-output analysis or obtained from references and the like. The environmental load or cost at the time of collection or dismantlement is computed using data (this data is also stored in the storage unit 16) representing the type of transport machine, the transport distance, and the type of dismantlement method, which are input independently of the parts/material database, and the environmental load basic unit stored in the environmental load basic unit database.

In this way, the environmental load evaluation unit computes, for each part/material, the environmental load generated or cost accrued in each of the processes of product collection, dismantlement, and recycle and also in the entire life cycle of the product. An improvement measure generated here also aims at improving the environmental load generated or cost accrued from the entire life cycle of the product (at least the recycling process including product collection, dismantlement, and recycle).

A case wherein "environmental load" is selected as an improvement item will be described below. The process also applies to a case wherein "accrued cost" is selected. That is, "environmental load" in the following description is replaced with "accrued cost" or "cost." A description of the case wherein "accrued cost" is selected as an improvement item will be omitted.

On the basis of the environmental load computed for each part/material, the part/materials are displayed in the region R12 on the window as shown in FIG. 23, which is displayed on the display serving as the output unit 14, in descending order of environmental load (step S631). For each of the displayed part/materials, the environmental load increasing factor (cause) is analyzed (step S632).

First, for a part/material (part/material of interest) having a high environmental load, the values of environmental loads computed for the respective steps are compared to check the step with the highest environmental load in the recycling process step (corresponding to a cause check item B1 in FIG. 28), the transport step at the time of collection (corresponding to a cause check item B2 in FIG. 29), and the dismantlement step (corresponding to a cause check item B3 in FIG. 30) (B1 to B3 correspond to "cause check item" sections in FIGS. 28 to 30).

When the part/material corresponds to B1, it can be determined that the fact that the recycling process with a high environmental load is executed for the part/material is the environmental load increasing factor (step S632). In this case, the increasing factor is displayed in the region R13 on the window shown in FIG. 23 (step S633).

As is apparent from FIG. 28, an example of the evaluation condition changing method as an improvement measure for the increasing factor is a method of selecting a process with a low environmental load from recycling processes that can be applied to the part/material. As an example of the parts/material data improving method is a method of changing the part/material to a part/material to which a recycling process with a low environmental load can be applied. These methods are displayed in the region R13 on the window shown in FIG. 23 as the environmental load improving unit corresponding to the increasing factor together with the increasing factor (step S634). For example, when the user selects the evaluation condition changing method from the improving unit displayed in the region R13, as a more detailed improvement measure of the method, for example, recycling methods (recycling processes) which can be applied to the part/material are displayed in the region R14 on the window shown in FIG. 23 in ascending order of environmental load as change candidates (step S635). First, recycling methods which can be applied to the part/material are read out by referring to the first table shown in FIG. 31 and displayed in the region R14 shown in FIG. 23 in ascending order of environmental load.

For example, when the user selects the parts/material data improving method from the improving unit displayed in the region R13, as a more detailed improvement measure of the method, for example, part/materials having the same function as that of the part/material are displayed in the region R14 on the window shown in FIG. 23 as change candidates in ascending order of environmental load of the recycling methods that can be applied to the part/materials (step S635). First, other part/materials having the same function as that of the part/material are obtained by referring to the fourth table shown in FIG. 34. Recycling methods which can be applied to the part/materials and their environmental loads are read out by referring to the first table shown in FIG. 31, and the part/materials to which the recycling processes with low environmental loads are displayed in the region R14 shown in FIG. 23 in ascending order of environmental load. Alternatively, portions at which the part/material dismantles may be displayed in the region R14 on the window shown in FIG. 23 as text data or image data.

When the part/material corresponds to B2, it can be determined that the fact that transport with a high environmental load is executed for the part/material is the environmental load increasing factor (step S632). In this case, the increasing factor is displayed in the region R13 on the window shown in FIG. 23 (step S633).

As is apparent from FIG. 29, an example of the evaluation condition changing method as an improvement measure for the increasing factor is a method of selecting a unit with a low environmental load from transport machine that can be applied to the part/material. As an example of the parts/material data improving method is a method of changing the part/material to a part/material to which a transport machine with a low environmental load can be applied. These methods are displayed in the region R13 on the window shown in FIG. 23 as the environmental load improving unit corresponding to the increasing factor together with the increasing factor (step S634).

For example, when the user selects the evaluation condition changing method from the improving unit displayed in the region R13, as a more detailed improvement measure of the method, for example, transport machine which can be applied to the part/material are displayed in the region R14 on the window shown in FIG. 23 in ascending order of environmental load as change candidates (step S635). First, the presence/absence of designation of a transport machine for the part/material is checked by referring to the first table shown in FIG. 31. If there is a designation of the transport machine, an applicable transport machine are read out by referring to the third table shown in FIG. 33 and displayed in the region R14 shown in FIG. 23 in ascending order of environmental load. When the presence/absence of designation of transport machine for the part/material is checked, and there is no designation of transport machine, the types of transport machine may be displayed in the region R14 shown in FIG. 23 in ascending order of the value of environmental load basic unit of each type of transport machine registered in the environmental load basic unit database.

For example, when the user selects the parts/material data improving method from the improving unit displayed in the region R13, as a more detailed improvement measure of the method, for example, part/materials having the same function as that of the part/material are displayed in the region R14 on the window shown in FIG. 23 as change candidates in ascending order of environmental load of the transport machine that can be applied to the part/materials (step S635). First, other part/materials having the same function as that of the part/material are obtained by referring to the fourth table shown in FIG. 34. The presence/absence of designation of transport machine for the part/materials is checked by referring to the first table shown in FIG. 31. If there is a designation of transport machine, applicable transport machine are read out by referring to the third table shown in FIG. 33 and displayed in the region R14 shown in FIG. 23 in ascending order of environmental load. When the presence/absence of designation of transport machine for the part/materials is checked, and there is no designation of transport machine, the types of transport machine may be displayed in the region R14 shown in FIG. 23 in ascending order of the value of environmental load basic unit of each type of transport machine registered in the environmental load basic unit database. Alternatively, portions at which the part/material dismantles may be displayed in the region R14 on the window shown in FIG. 23 as text data or image data.

When the environmental load increasing factor is the transport step, as an improvement measure, the types of transport machine may be displayed in the region R14 shown in FIG. 23 in ascending order of the value of environmental load basic unit of each type of transport machine registered in the environmental load basic unit database.

When the part/material corresponds to B3, it can be determined that the fact that the part/material is dismantled with a high environmental load is the environmental load increasing factor (step S632). In this case, the increasing factor is displayed in the region R13 on the window shown in FIG. 23 (step S633). Examples of the evaluation condition changing method shown in FIG. 30 as an improvement measure for the increasing factor are a method of selecting a unit with a low environmental load from a dismantlement unit that can be applied to the part/material and a method of more specifically dividing the disassembly level. As an example of the parts/material data improving method is a method of changing the part/material to a part/material to which a dismantlement unit with a low environmental load can be applied. These methods are displayed in the region R13 on the window shown in FIG. 23 as the environmental load improving unit corresponding to the increasing factor together with the increasing factor (step S634). For example, when the user selects the former of the two evaluation condition changing methods as the improving unit displayed in the region R13, as a more detailed improvement measure of the method, for example, dismantlement unit which can be applied to the part/material are displayed in the region R14 on the window shown in FIG. 23 in ascending order of environmental load as change candidates (step S635). First, the presence/absence of a connection portion in the part/material is checked by referring to the first table shown in FIG. 31. If there is a connection portion, it is checked next by referring to the second table shown in FIG. 32 whether the part/material can be dismantled. If the part/material can be dismantled, a dismantlement method (dismantlement unit) which can be applied to the part/material and its environmental load are read out. When a plurality of dismantlement methods are available, they are displayed in the region R14 shown in FIG. 23 in ascending order of environmental load.

For example, when the user selects the latter of the two evaluation condition changing methods as the improving unit displayed in the region R13, as a more detailed improvement measure of the method, for example, portions at which the part/material dismantles are displayed in the region R14 on the window shown in FIG. 23 as change candidates in ascending order of environmental load of the dismantlement unit (dismantlement method) that can be applied to the portions (step S635). First, the presence/absence of a connection portion in the part/material is checked by referring to the first table shown in FIG. 31. If there is a connection portion, it is checked by referring to the second table shown in FIG. 32 whether the part/material can be dismantled. If the part/material can be dismantled, a dismantlement method (dismantlement unit) which can be applied to the part/material and its environmental load are read out. When a plurality of dismantlement methods are available, they are displayed in the region R14 shown in FIG. 23 in ascending order of environmental load.

For example, when the user selects the parts/material data improving method from the improving unit displayed in the region R13, as a more detailed improvement measure of the method, for example, part/materials having the same function as that of the part/material are displayed in the region R14 on the window shown in FIG. 23 as change candidates in ascending order of environmental load of the dismantlement method (dismantlement unit) that can be applied to the part/materials (step S635). First, other part/materials having the same function as that of the part/material are obtained by referring to the fourth table shown in FIG. 34.

The presence/absence of a connection portion in the part/materials is checked by referring to the first table shown in FIG. 31. If there is a connection portion, it is checked by referring to the second table shown in FIG. 32 whether the part/material can be dismantled. If the part/material can be dismantled, a dismantlement method (dismantlement unit) which can be applied to the part/material and its environmental load are read out. When a plurality of dismantlement methods are available, they are displayed in the region R14 shown in FIG. 23 in ascending order of environmental load. Alternatively, portions at which the part/material dismantles may be displayed in the region R14 on the window shown in FIG. 23 as text data or image data.

A case wherein "environmental load" is selected on the window shown in FIG. 23 as an improvement item has been described above. Even when "accrued cost" is selected an improvement measure that supports selection of a part/material aiming at reducing the cost can be generated and displayed, as in the above improvement measure generation and display for environmental load.

Figure 24:
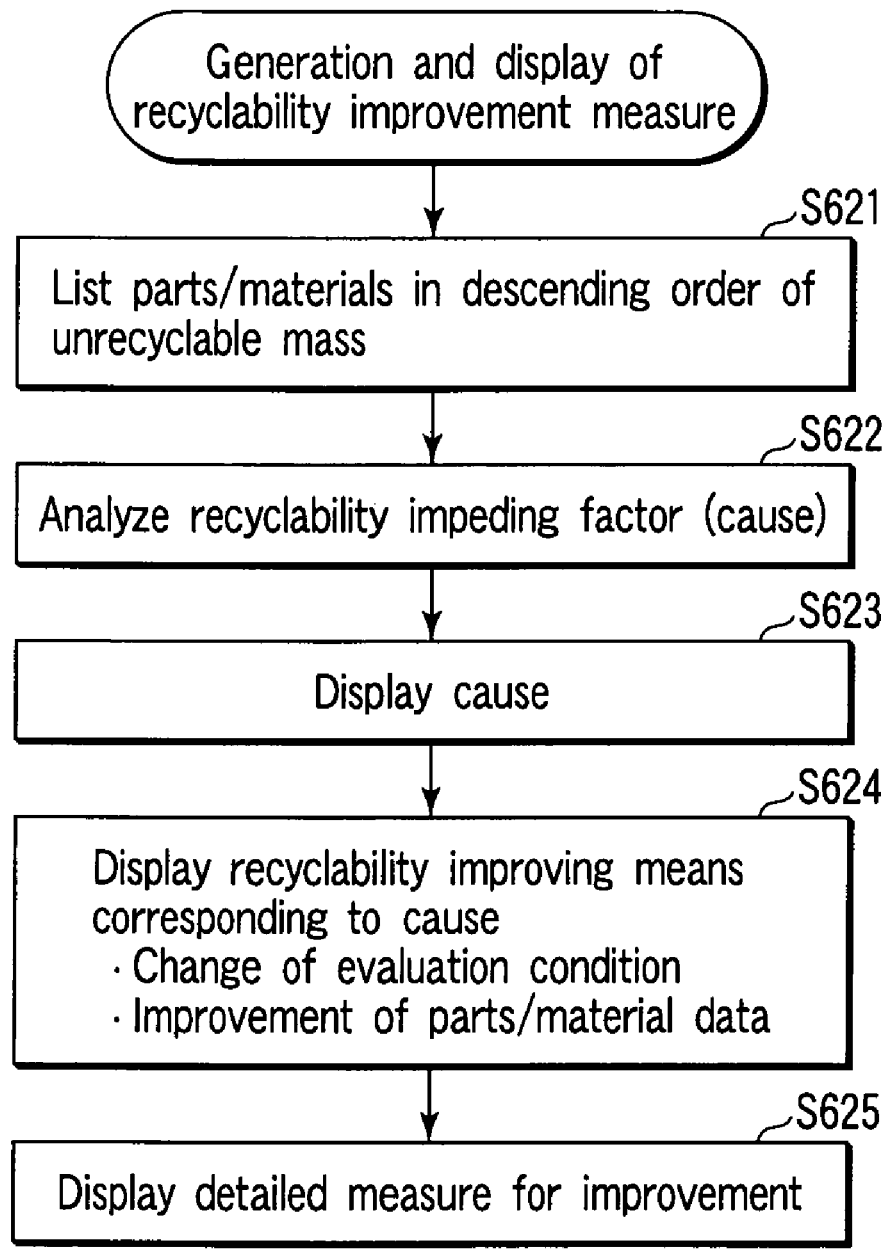
FIG. 24 is a flow chart for explaining the recyclability improvement proposal generation/display operation.
Figure 27:
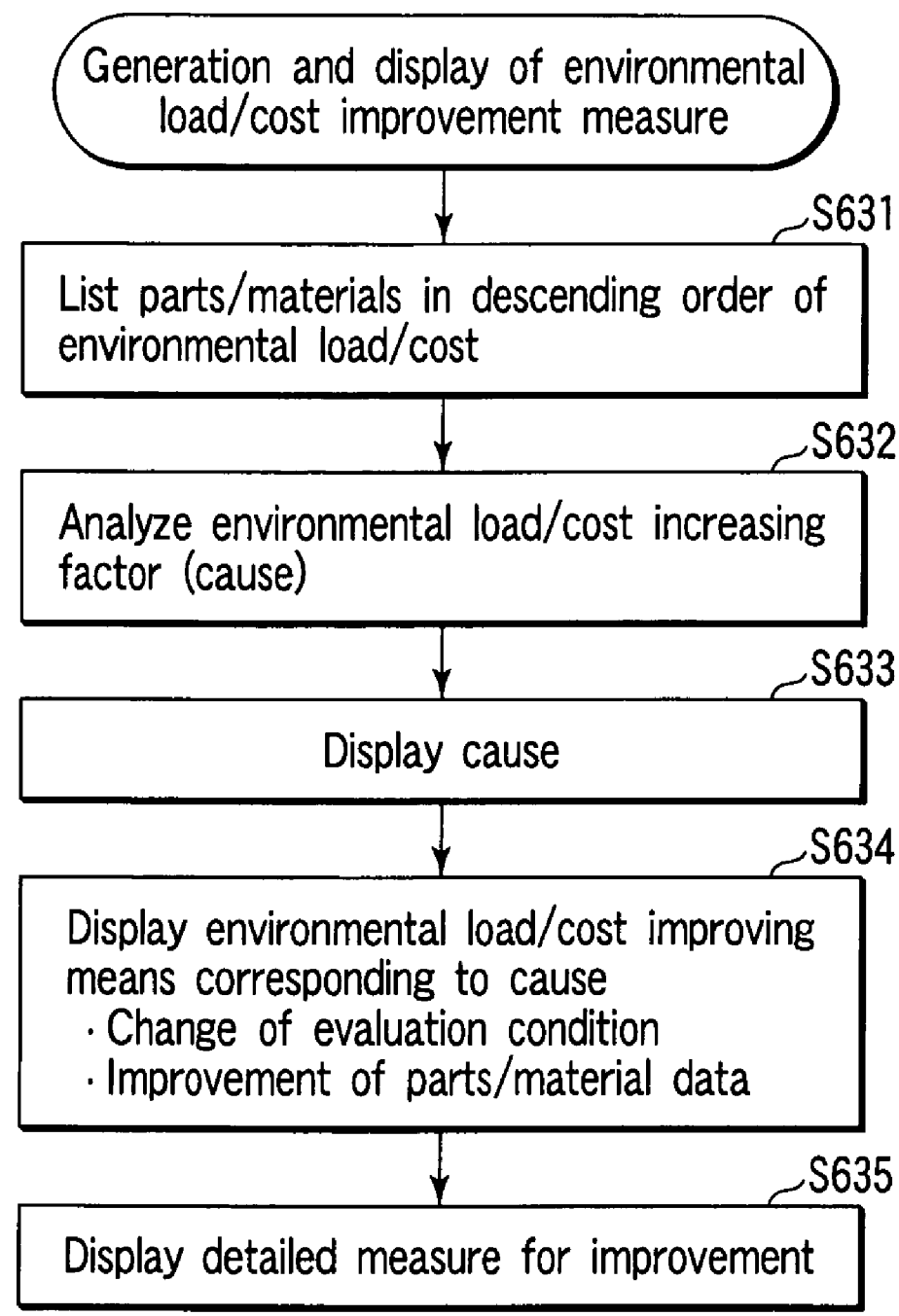
FIG. 27 is a flow chart for explaining the environmental load/cost improvement proposal generation/display operation.

As described above, when detailed measures for improvement are displayed in step S625 of FIG. 24 or step S635 of FIG. 27, and the user selects a desired measure from the displayed contents, the evaluation condition or parts/material data, which is to be used for trial computation of the improvement effect, is rewritten to the selected detailed measure.

An improvement effect computation section 312 shown in FIG. 1, i.e., the processor 10 executes the improvement proposal generation process program 108 shown in FIG. 2. That is, the improvement effect computation section 312 executes steps S607 and S608 in FIG. 22. At this time, the improvement effect computation section 312 copies, e.g., the parts/material data or evaluation condition stored in the storage unit 16 and rewrites it on the basis of the detailed improvement measure selected by the user.

The rewritten parts/material data or evaluation condition may be used to evaluate the recyclability, environmental load, or cost.

As described above, according to the above embodiment, on the basis of a result of evaluation of evaluation of the recyclability or environmental load (cost) of a product, which has been done on the basis of parts/material data containing parts that constitute the product, the kinds of materials of the parts, and the mass of each kind of material, the recyclability impeding factor or environmental load (cost) increasing factor of the product is analyzed, and an improvement measure corresponding to the impeding factor or increasing factor obtained as an analysis result is output. On the basis of this improvement measure, the evaluation condition or parts/material data used for evaluation is changed. On the basis of the changed evaluation condition or parts/material data, the recyclability of the product is evaluated as trial computation of the improvement effect, and the evaluation result is output. The changed parts/material data is converted into CAD (Computer Aided Design) data containing at least the names, amounts, and number of parts that constitute the product. In this way, the recyclability impeding factor or environmental load (cost) increasing factor is analyzed from the evaluation result of the recyclability or environmental load (cost) of the product, and an improvement measure that directly corresponding to the recyclability impeding factor or environmental load (cost) increasing factor is displayed for the user. Accordingly, the evaluation result of the recyclability or environmental load (cost) of the product can easily be reflected on selection of part/materials that constitute the product. That is, according to the present invention, the evaluation result of the recyclability or environmental load (cost) of the product can easily be reflected on selection of part/materials. In this way, selection of part/materials for production aiming at improving the recyclability and reducing the environmental load (cost) can be supported.

Examples of recyclability improvement measures to be displayed are (1) alternative part/materials which have higher recyclability than that of a part/material corresponding to an impeding factor in the product and should replace the part/material, (2) portions at which a part/material corresponding to an impeding factor in the product dismantles, and (3) recycling methods capable of improving the recyclability as a recycling method of a part/material corresponding to an impeding factor.

Examples of environmental load (cost) improvement measures to be displayed are (1) alternative part/materials which can realize a lower environmental load (cost) than that of a part/material corresponding to an increasing factor in the product and should replace the part/material, (2) portions at which a part/material corresponding to an increasing factor in the product dismantles, and (3) recycling methods capable of reducing the environmental load (cost) as a recycling method of a part/material corresponding to an increasing factor.

The method described in the embodiment of the present invention can be stored in a recording medium such as a magnetic disk (flexible disk or hard disk), optical disk (CD-ROM, CD-R, CD-RW, DVD, or MO) or semiconductor memory and distributed. The method can also be distributed by transmission through a network.

According to the above embodiment, the recyclability or environmental load of product can be efficiently evaluated by directly the CAD data of the product at the stage of product design. In addition, the work load of the user for evaluation of the recyclability or environmental load of the product can be reduced.

A design support apparatus and method and a program according to the second embodiment will be described with reference to FIGS. 36 and 37.

Figures 36, 39:
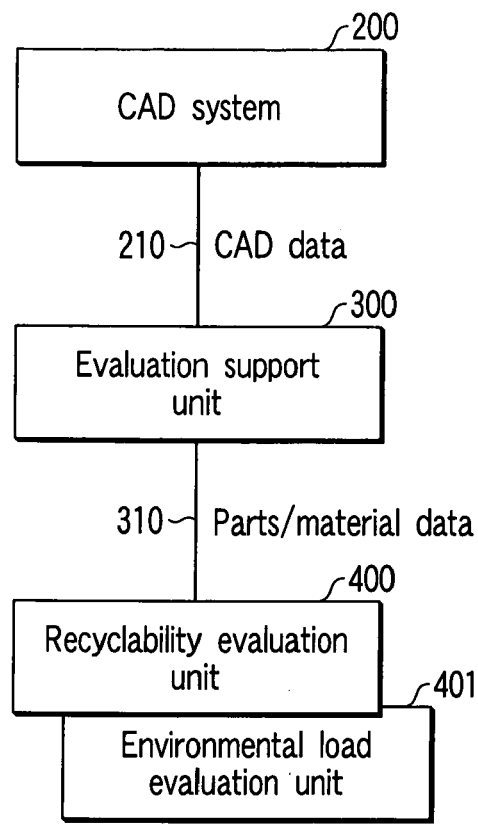
FIG. 36 is a view schematically showing the functional arrangement of the apparatus according to the second embodiment of the present invention.
FIG. 39 is a table showing a recycle condition setting example.

FIG. 36 schematically shows the functional arrangement of a recyclability evaluation unit according to this embodiment, which can support selection of part/materials for production aiming at increasing the recyclability of a product.

This recyclability evaluation unit comprises a CAD (Computer Aided Design) unit 200, an evaluation support unit 301, a recyclability evaluation unit 400, and an environmental load evaluation unit 401. The CAD unit 200 is the same as that used in the first embodiment.

The evaluation support unit 301 receives CAD data 210 output from the CAD unit 200 and generates, on the basis of the CAD data 210, parts/material data 310 as data to be processed by the recyclability evaluation unit 400 and environmental load evaluation unit 401.

The recyclability evaluation unit 400 executes a recyclability evaluation process (to be described later) using the parts/material data 310 generated by the evaluation support unit 301. The environmental load evaluation unit 401 executes an environmental load evaluation process (to be described later) using the parts/material data 310 generated by the evaluation support unit 301.

Figure 37:
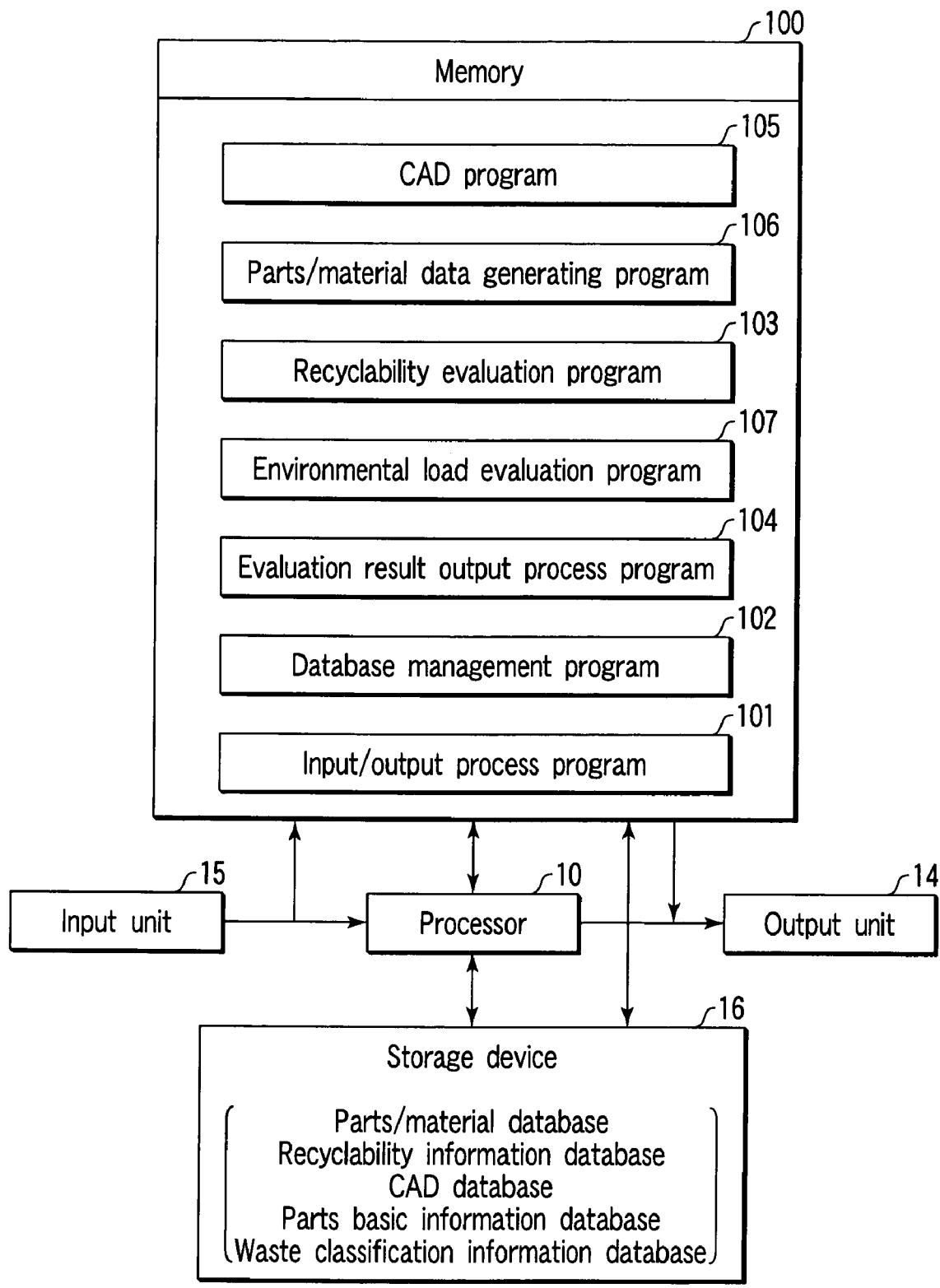
FIG. 37 is a block diagram showing an arrangement which implements the recyclability evaluation unit shown in FIG. 36 on, e.g., a computer.

FIG. 37 shows an arrangement which implements the recyclability evaluation unit shown in FIG. 36 on, e.g., a computer. This recyclability evaluation unit has the same arrangement as that of the first embodiment except the improvement proposal generation process program 108 stored in the memory 100 and the improvement proposal basic information database in the storage unit 16 in FIG. 1.

CAD data generally contains a product name (or product identification information such as a model), the dimensions of the product, composition information representing the composition of the product, and in correspondence with each composition portion (unit), the names of parts used in the unit, the amounts or numbers of parts, and shape information representing the shapes of the parts, as shown in FIG. 3.

A processor 10 executes a CAD program 105 to generate the CAD data 210 having the contents shown in FIG. 3 (in the CAD unit 200 shown in FIG. 36). The processor 10 executes a parts/material data generation program 106 to process the CAD data. With this process, the parts/material data 310 having contents shown in FIG. 3 is generated. The parts/material data 310 is stored in the parts/material database in a storage unit 16.

When the processor 10 executes the parts/material data generation program 106, the recyclability evaluation unit obtains, for each part contained in the CAD data 210, the kind (composition material kind) of material in the part and the mass (composition material mass) of the material in the part while referring to parts basic data stored in the parts basic information database stored in the storage unit 16. With this process, the parts/material data 310 for each product, which contains at least the parts name, the kind (composition material kind) of material in each part, and the mass (composition material mass) of each material, is generated and stored in the parts/material database in the storage unit 16. When the parts/material data is to be generated, each unit name in the CAD data may be replaced with identification information (e.g., a name representing a disassembly level) representing the hierarchical position (level) of a corresponding part.

Third Embodiment

Recyclability evaluation using the recyclability evaluation program according to the third embodiment of the present invention will be described with reference to FIGS. 38 to 45. This recyclability evaluation can be applied to the recyclability evaluation unit 400 of the above embodiment. Particularly, it is applied to the recyclability ration calculation (S34) shown in FIG. 8.

Figure 38:
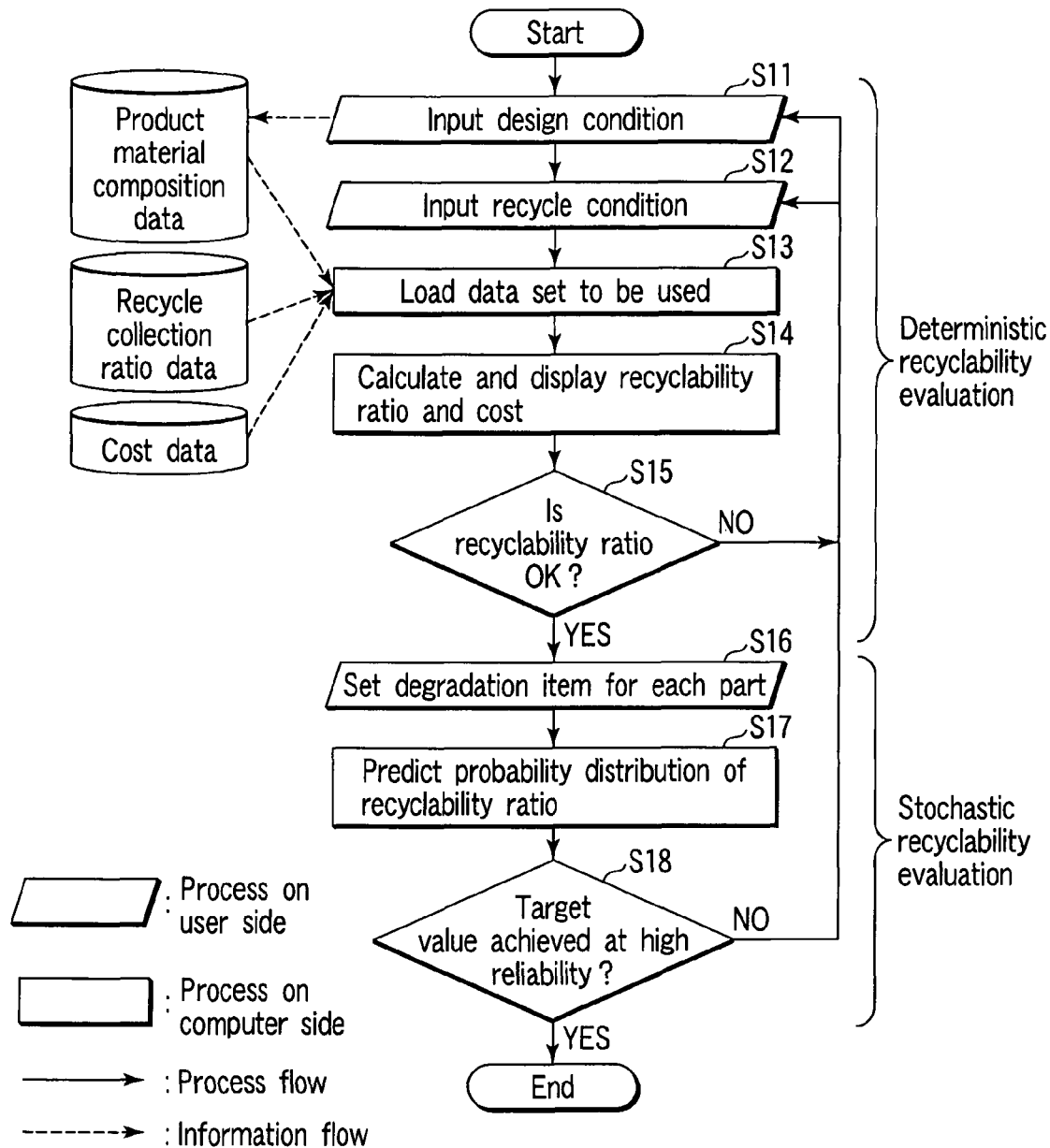
FIG. 38 is a view showing the flow of a recyclability evaluation program according to the third embodiment of the present invention.

FIG. 38 is a flow chart of the recyclability evaluation program according to the third embodiment of the present invention. In evaluating the recyclability, the user first inputs material composition information of an entire product as a presupposition condition, i.e., design condition (S11) to a recyclability evaluation system shown in FIG. 54, for example. The material composition information is generated using a CAD (Computer Aided Design) tool. Detailed examples of the design condition are material kinds (iron, aluminum, and the like) of each part and mass information of each material.

Next, a recycle condition for recyclability evaluation is set (S12). Examples of the recycle condition are the presence/absence of closed recycle of resins and setting of non-recycle parts. Closed recycle of resins means that resin materials collected from a used product are subjected to material recycle (reclamation) and reused in the company. FIG. 39 shows examples of the recycle condition.

Subsequently, the system selects a data set that coincides with the design condition and recycle condition from a database and loaded to the memory (S13). In this case, when the designer inputs the design condition, a data set to be used is automatically loaded. FIGS. 40A and 40B show information loaded to the memory under recycle condition 3.

Figure 41:
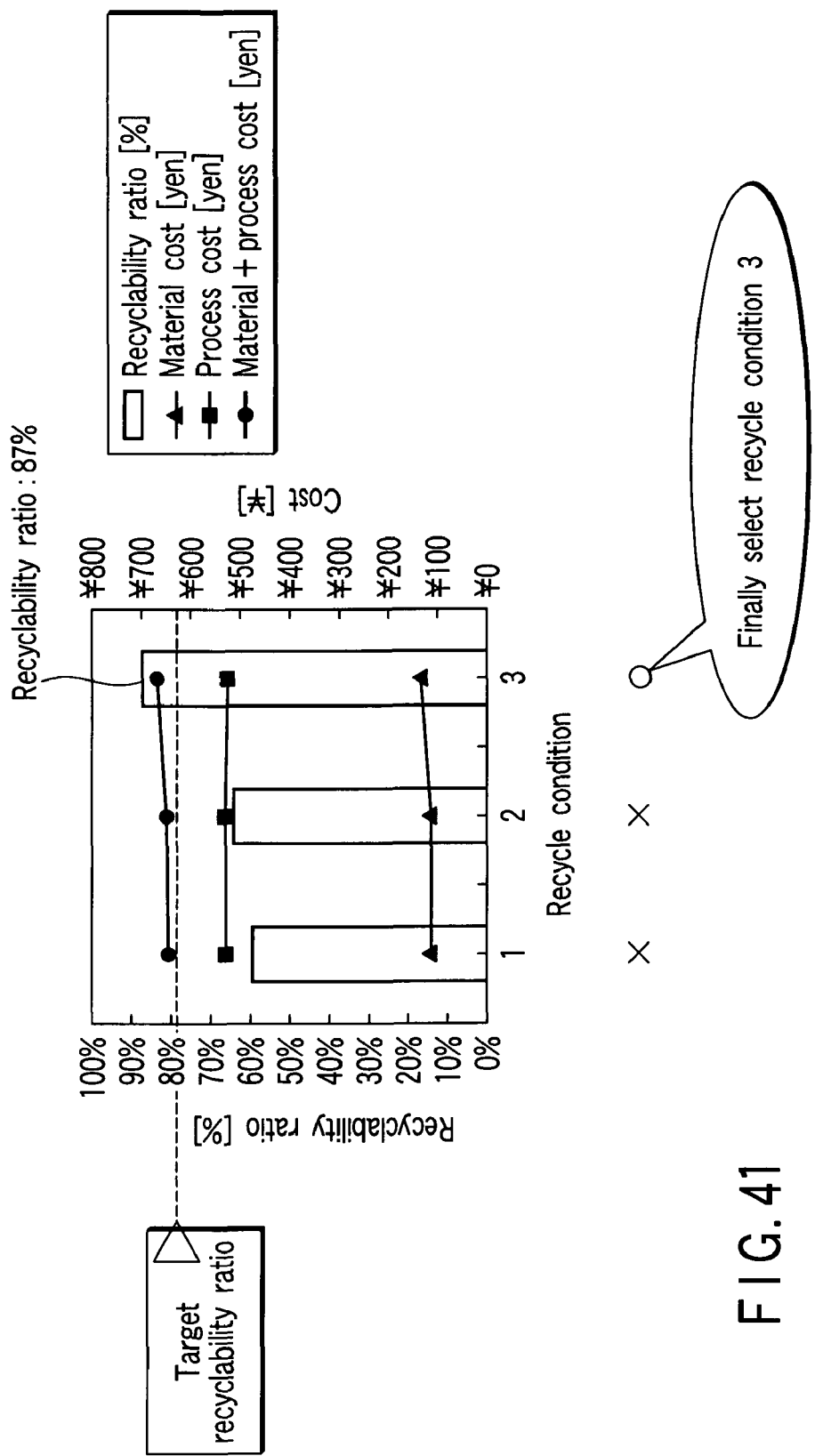
FIG. 41 is a graph showing a recycle condition selection example.

In step S14, the system computes the recyclability ratio, material cost, and process cost using the loaded information. FIG. 41 shows comparison between the environmental load evaluation, material cost, process cost, and (material cost+ process cost), which are computed for the recycle condition given in FIG. 39. The recyclability ratio and cost are computed using the information shown in FIGS. 40A and 40B in the following way.

Recyclability ratio=recyclable mass of entire product/product mass=sum Σ of all material kinds {total mass of material i contained in parts except non-recycle parts×recycle collection ratio of material i}/product mass.     Equation 1:

Material cost=sum Σ of all material kinds {total mass of material i×material unit price of material i}     Equation 2:

Process cost=sum Σ of all material kinds {total mass of material i contained in parts except non-recycle parts×collection unit price of material i}+product mass×(intermediate process unit price+transport unit price)+(product mass−recyclable mass of entire product)×landfill unit price.     Equation 3:

It is determined from the above computation results whether the target recyclability can be obtained (S15). If NO in step S15, the flow returns to step S11 or S12 to re-input the design condition or recycle condition. In this embodiment, since the target recyclability cannot be obtained for recycle conditions 1 and 2, recycle condition 3 is selected finally (FIG. 41).

Steps S11 to S15 described above correspond to deterministic recyclability evaluation. The processing of this deterministic recyclability evaluation corresponds to the processing of the first and second embodiments.

Subsequently, stochastic recyclability evaluation is executed. In this case, the user inputs a corresponding item of resin degradation factors that influence the recycle collection amount for each part of the product. Examples of resin degradation factors are thermal degradation, chemical degradation, and photo-degradation. The degradation factor changes depending on the position of a part. For example, a part located on the front side is readily exposed to light. A part placed on a motor side readily suffer thermal degradation. That is, the degradation factor changes depending on the part position or structure. The user first inputs the degradation factor (S16). FIG. 42 shows degradation factors of parts a to h that comprise a product. Number "1" in FIG. 42 indicates a resin degradation factor.

Next, the system causes the recycle collection amount to vary in accordance with the degree of resin degradation to compute the variation distribution of the recyclability ratio of the entire product using a method such as Monte Carlo simulation. That is, the probability distribution of the recyclability ratio is predicted (S17). On the basis of this predicted value, it is determined whether the target value of the recyclability ratio is achieved at a high reliability (S18). If NO in step S18, the process returns to step S11 or S12. If YES in step S18, the process is ended.

The number of applied degradation items shown in FIG. 43, which are used as parameters in Monte Carlo simulation, can be 0 without any degradation to 3 as indicated by the example shown in FIG. 42, i.e., the maximum number of degradation factors is 3. The variation width and stochastic variation width of the recycle collection amount is changed in accordance with the number of degradation items from 0 to 3.

Referring to FIG. 43, the maximum value indicates the mass of resin contained in each part. For example, when 100-g ABS (acrylonitrile-butadiene-styrene) is contained in a given part, the maximum value is 100 g. If all degradation items are applied, the number of degradation items is 3. The minimum value of recycle collection amount is given by maximum value×α, β or γ. The maximum variation width is γ. For example, α is 0.8, β is 0.6, and γ is 0.4.

Figure 44:
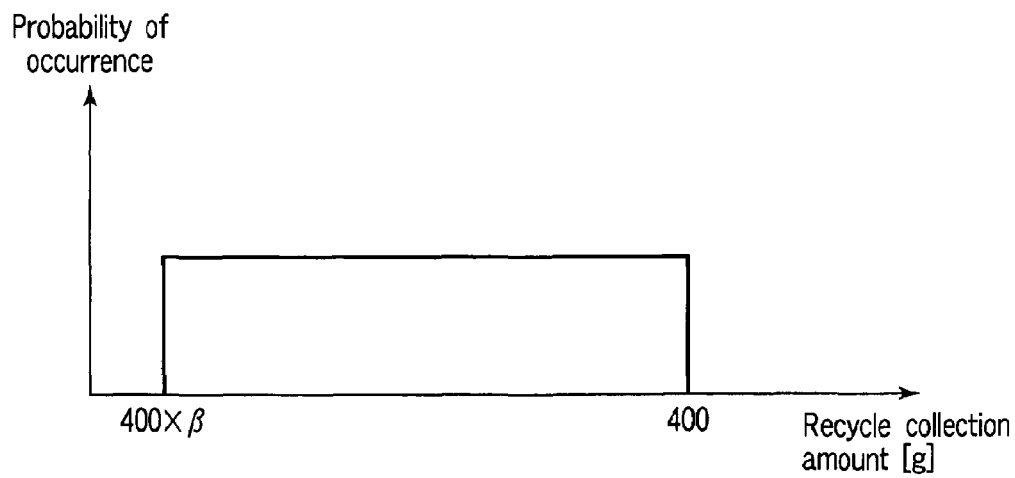
FIG. 44 is a graph showing a variation width setting example.

FIG. 44 shows an example of setting of a variation width of recycle collection amount for polypropylene of the part f. In this case, the part f has two resin degradation items applied. That is, as shown in FIG. 42, for the part f, "1" is set in photo-degradation and chemical degradation. Hence, a uniform probability distribution is generated for polypropylene to be collected for recycle between 400×β(=0.6) and 400 g and used to calculate the recycle collection ratio (collection amount) of the entire product.

In this embodiment, the recycle collection amount is changed for only resins to be subjected to closed recycle. In recycle condition 3 used here, only polypropylene is the resin to be subjected to closed recycle. Hence, the recycle collection amount is changed only for polypropylene contained in each part. The variation width is shown in FIG. 43. The variables α, β, and γ that determine the variation width are arbitrarily empirically set.

Figure 45:
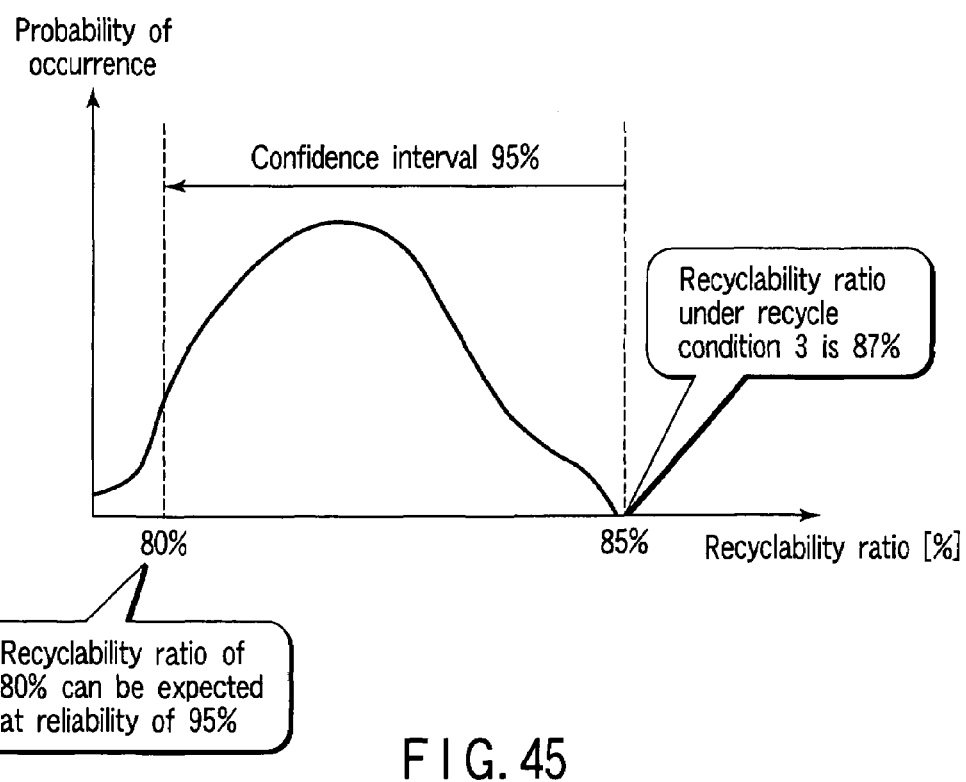
FIG. 45 is a graph showing a recyclability ratio computation result.

FIG. 45 shows the computation result of the variation distribution of the recyclability ratio of the product. The recyclability ratio under recycle condition is computed as 87% from the information shown in FIGS. 40A and 40B and Equation 1. When Monte Carlo simulation is executed using the information shown in FIGS. 42, 43, and 44, the actual recyclability ratio is predicted to have a stochastic distribution shape, as shown in FIG. 45. If the user wants to achieve the target value at a reliability of 95%, a point at which the cumulative value of probability of occurrence from a higher recyclability ratio becomes 95% is automatically computed and presented to the user. In the example shown in FIG. 45, the target recyclability ratio of 80% can be achieved at the reliability of 95%. If the target recyclability ratio cannot be achieved at the reliability of 95%, the user changes the design condition or recycle condition again, as shown in FIG. 38, and confirms whether the target value can be achieved at the reliability of 95%. For example, if the part f containing polypropylene as a material with the largest mass is to be changed, computation is performed again assuming that polypropylene is totally changed to aluminum.

Referring to FIGS. 44 and 45, the variation widths for the parts a to f are similarly determined as the probability distribution as shown in FIG. 44. A combination is generated at random in accordance with the variation width, and the recyclability ratio and cost are computed every time. Then, a computation result, i.e., a computation of Monte Carlo simulation as shown in FIG. 45 is obtained. In this example, the average value is not 85% but 82% to 83%. How to use the result will be described. The confidence interval is 95%. The region surrounded by the graph is defined as 100. When a recyclability ratio (e.g., 80%) at which the area from the right end of that region is set, that the recyclability ratio of 80% can be achieved at a reliability of 95% can be presented to the user.

In the above embodiment, when the reliability is 95%, the minimum value of the recyclability ratio is 80%. If the reliability can be 80%, the minimum value of the recyclability ratio is slightly larger (e.g., 81%). The reliability can be determined by the user.

With the above process, the user can develop a product whose target recyclability ratio can be achieved at a desired reliability.

In the above embodiment, Monte Carlo simulation is used when the recycle collection amount is changed for each part. However, the method is not limited to Monte Carlo simulation.

If there is an actual recycling process record of a similar product, the variables α, β, and γ in FIG. 43 may be adjusted such that the predicted distribution shape comes close to the actual distribution shape. This allows more practical prediction.

The method of the embodiment is not necessarily used only for a product containing only resins. The parts a to h are actually made of iron, copper, aluminum, or various resin or rubber materials, as shown in FIGS. 40A and 40B. The recycle collection amount is changed only for resins in these parts. For iron, copper, and glass, a recyclability ratio of 98% is directly used as a fixed value. For a product having a low resin ratio, the peak of the probability distribution shown in FIG. 45 is not so wide, and the error is not so large. Hence, the method of this embodiment is effective for a product having a high resin ratio.

Fourth Embodiment

Figure 46:
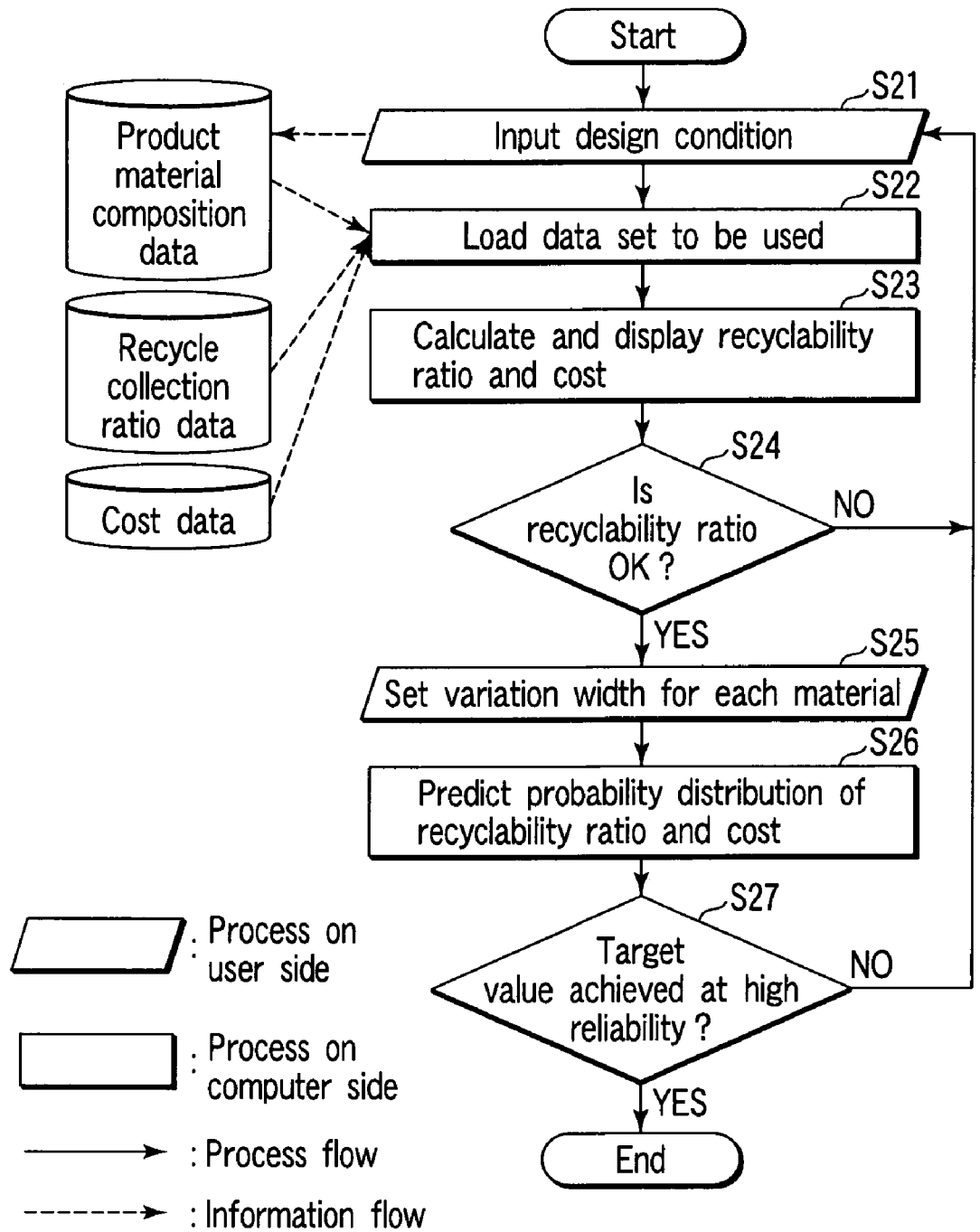
FIG. 46 is a view showing the flow of a recyclability evaluation program according to the fourth embodiment of the present invention.

In the third embodiment, the variation width is set for each part. In the fourth embodiment, the variation width is set for each material. More specifically, in the fourth embodiment shown in FIG. 46, the recycle collection ratio, average collection unit price, and average material unit price are stochastically changed for each material kind, and it is evaluated whether the target value is achieved at a desired reliability. According to the fourth embodiment, the user first inputs the material information of an entire product, which is generated using a CAD tool, as a presupposition condition, i.e., design condition (S21). Next, a data set that coincides with the design condition is selected and loaded to the memory (S22). In this case, when the designer inputs the design condition, a data set to be used is automatically loaded. FIG. 47 shows an example of information loaded when the variation width is to be set for each material.

Using the loaded information, the recyclability ratio, material cost, and process cost are computed on the basis of Equations 4 to 6 (S23).

Recyclability ratio=recyclable mass of entire product/product mass=sum Σ of all material kinds {total mass of material i×recycle collection ratio of material i}/product mass   Equation 4:

Material cost=sum Σ of all material kinds {total mass of=sum Σ of all material kinds {total mass of material i×material unit price of material i}   Equation 5:

Process cost=sum Σ of all material kinds {total mass of material i×collection unit price of material i}+product mass×(intermediate process unit price+transport unit price)−(product mass recyclable mass of entire product)×landfill unit price   Equation 6:

After that, it is determined from the computation results whether the target recyclability can be obtained (S24). If NO in step S24, the flow returns to step S21 to re-input the design condition. If YES in step S24, the variation width is set for each material by the user (S25).

Next, the recycle collection ratio is changed in accordance with the degree of resin degradation to compute the variation distribution of the recyclability ratio of the entire product using a method such as Monte Carlo simulation. That is, the probability distribution of the recyclability ratio and cost is predicted (S26). Then, it is determined whether the target value of the recyclability ratio is achieved at a high reliability (S27). If NO in step S27, the process returns to step S21. If YES in step S27, the process is ended.

Figure 48:
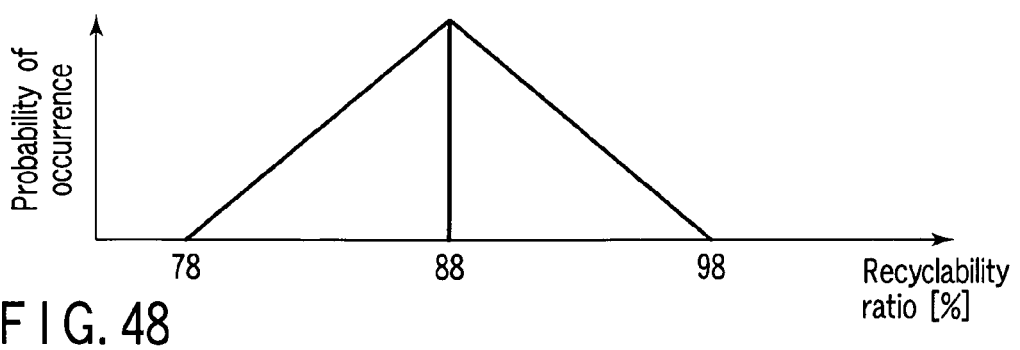
FIG. 48 is a graph showing a variation width setting example in the fourth embodiment.
Figure 49:
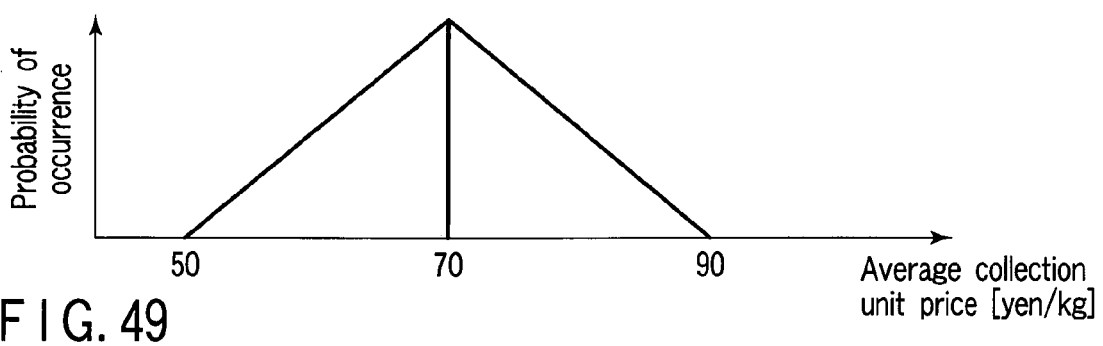
FIG. 49 is a graph showing another variation width setting example in the fourth embodiment.
Figure 50:
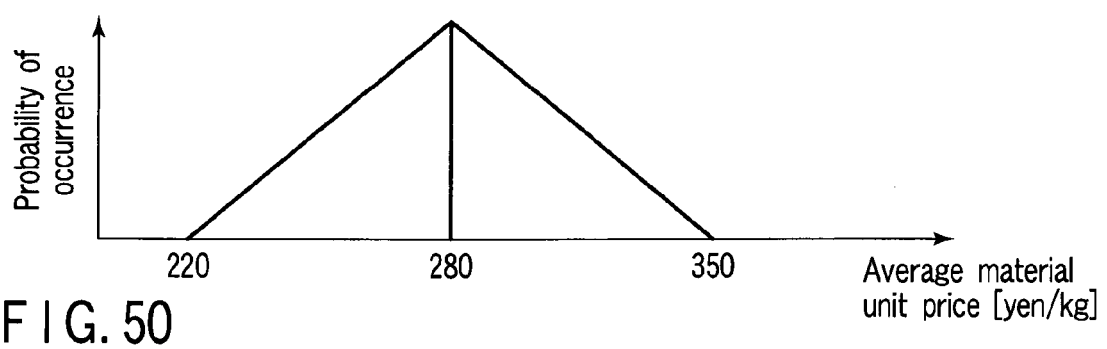
FIG. 50 is a graph showing still another variation width setting example in the fourth embodiment.

In the fourth embodiment, instead of using the concept of parts, the variation width is set for the entire product. As is apparent from FIG. 47, polypropylene with the highest ratio most largely influences the total variation. In this embodiment, the variation width is set not for the recycle collection amount but for the recyclability ratio, cost, and average collection cost. That is, the variation widths of the recyclability ratio, average collection unit price, and average material unit price of polypropylene are set, as shown in FIGS. 48, 49, and 50. The setting is similarly done for the remaining materials.

Referring to FIG. 48, the variation width of recyclability ratio of polypropylene is set as the probability distribution of triangle distribution. The upper limit is 98%, and the lower limit is 78%. Not the recyclability ratio but the total mass may be set. For example, for 424-g polypropylene, the upper limit may be set to 424 g, and the variation width may be set with an appropriate distribution.

Figure 51:
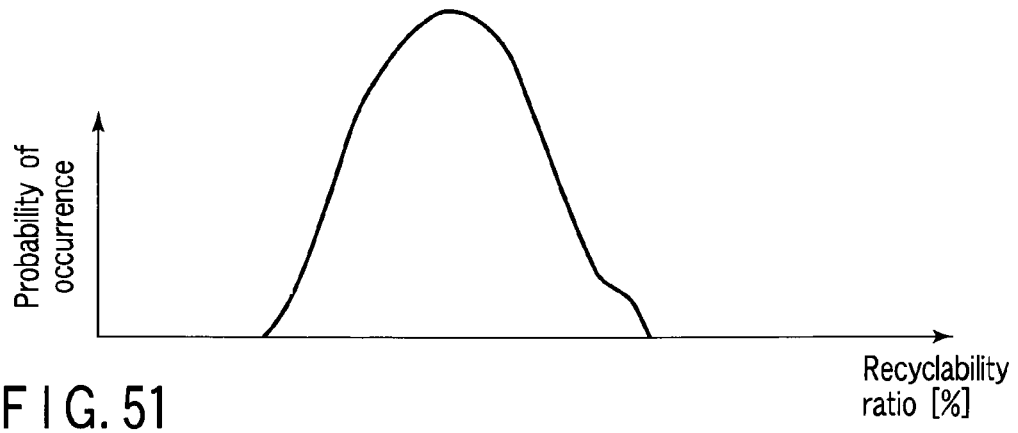
FIG. 51 is a graph showing a recyclability ratio computation result in the fourth embodiment.
Figure 52:
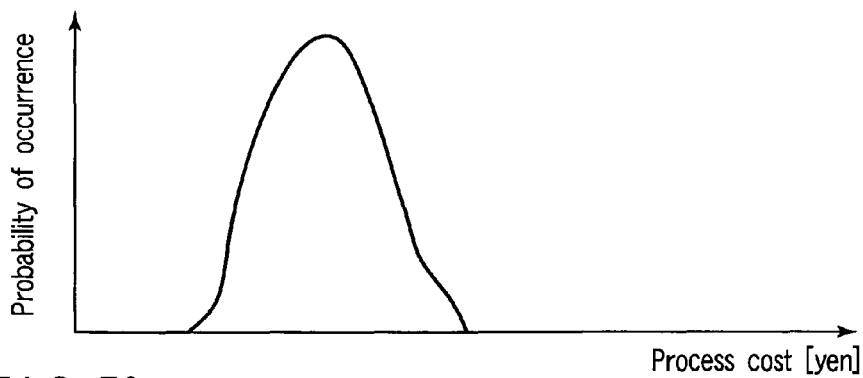
FIG. 52 is a graph showing a process cost computation result in the fourth embodiment.
Figure 53:
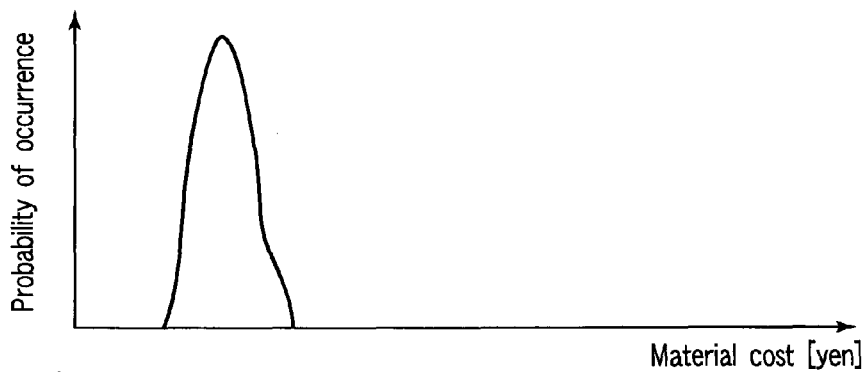
FIG. 53 is a graph showing a process cost computation result in the fourth embodiment.

When Monte Carlo simulation is executed using the information shown in FIGS. 47 to 50, predictions of the variation distribution of the recyclability ratio, variation distribution of the process cost, and variation distribution of the material cost of the entire product can be computed, as shown in FIGS. 51 to 53. After that, on the basis of the same idea as that described with reference to FIG. 45, the degrees of achievement of recyclability ratio, process cost, and material cost at the desired reliability can be computed and presented to the user.

Figure 54:
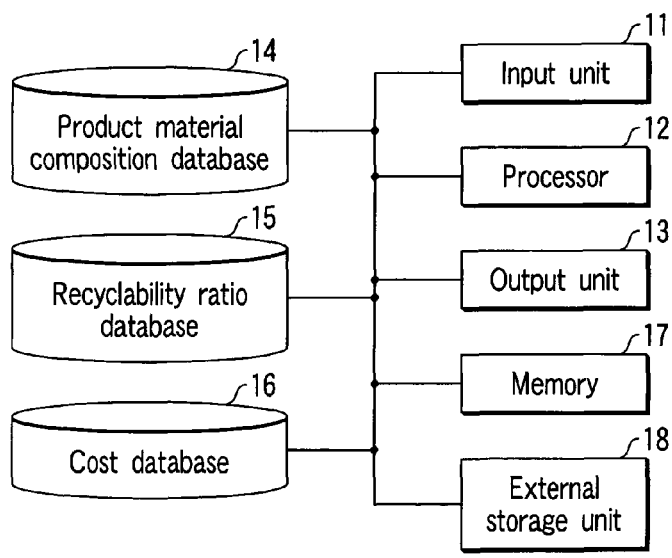
FIG. 54 is a block diagram showing a computer used to execute the recyclability evaluation program.

FIG. 54 shows a computer used to execute the recyclability evaluation program according to the embodiment of the present invention. The computer has an input unit 211 used by the user to input information such as a design condition, a processor 212, an output unit 213, an external storage unit 217 which stores the programs in the present invention, and a memory 218 to which a program or data is loaded in the operation mode. The processor 212 accesses a product material composition database 214, recyclability ratio database 215, and cost database 216 to load information to the memory 218 and operates in accordance with the recyclability evaluation program according to the embodiment of the present invention.

According to the present invention, the user can develop a product that has an appropriate tolerance and achieve a target recyclability ratio at a desired reliability. Because of the tolerance determined by the present invention, risk avoidance related to recycle regulations in the future can be done without any excessive increase in cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A design support apparatus which supports a design of a product, the apparatus comprising:
   a data generator which generates parts/material data including parts composing the product, kinds of materials composing the parts and mass of each of the materials that differ in kind;
   a setting unit configured to set an evaluation condition;
   an evaluation unit configured to evaluate a recyclability of the product, using the evaluation condition and the parts/material data;
   an analysis unit configured to analyze a factor obstructing the recyclability based on an evaluation result of the evaluating unit;
   an output unit configured to output a remedy for an obstruction factor provided as an analysis result of the analysis unit; and
   an update unit configured to update, based on the remedy outputted, the evaluation condition and the parts/material data which are used in the evaluation by the evaluation unit, and wherein the evaluation unit is configured to evaluate a recyclability of the product based on the updated evaluation condition and the updated parts/material data, and the output unit is configured to output an updated evaluation result of the evaluation unit.

2. The design support apparatus according to claim 1, which further comprises a conversion unit configured to convert the parts/material data used in the evaluation by the evaluation unit to Computer Aided Design (CAD) data including a name of parts composing the product and a quantity or a number of the parts.

3. The design support apparatus according to claim 1, wherein the output unit comprises a display unit configured to display at least one part and material having higher recyclability than the parts and the materials and used as a substitute for the parts and the materials corresponding to the obstruction factor.

4. The design support apparatus according to claim 1, wherein the output unit comprises a display unit configured to display a demountable portion of the parts and materials corresponding to the obstruction factor as a recyclability remedy.

5. A design support apparatus which supports a design of a product, comprising:
   a data generator which generates parts/material data including parts composing a product, kinds of materials composing the parts and mass of each of the materials that differ in kind;
   a setting unit configured to set an evaluation condition;
   a first evaluation unit configured to evaluate an environmental load occurring in a recycling of the product, using the parts/material data and the evaluation condition;
   an analysis unit configured to analyze an aggravation factor of the environmental load based on an evaluation result of the evaluation unit;
   a first display unit configured to display a remedy for the aggravation factor according to an analysis result of the analysis unit;
   an update unit configured to update the evaluation condition and the parts/material data used in the evaluation by the evaluation unit, using the remedy displayed on the first display unit;
   a second evaluation unit configured to evaluate the environment load based on updated evaluation condition and parts/material data obtained by the update unit;
   a second display unit configured to display an evaluation result of the second evaluation unit; and
   a conversion unit configured to convert the parts/material data used in evaluation by the second evaluation unit to Computer Aided Design (CAD) data including names of the parts composing the product, a quantity of the parts or a number of the parts.

6. The design support apparatus according to claim 5, wherein the first display unit displays part/material having a lower environmental load than the part/materials and used as a substitute for the part/material corresponding to the obstruction factor as a recyclability remedy.

7. The design support apparatus according to claim 5, wherein the first display unit displays a demountable portion of the part/material corresponding to the aggravation factor of the environmental load as the remedy.

8. A design support apparatus which supports a design of a product, comprising:
- a data generator which generates parts/material data including parts composing a product, kinds of materials composing the parts and mass of each of the materials that differ in kind;
- a setting unit configured to set an evaluation condition;
- a first evaluation unit configured to evaluate a recyclability of the product and an environmental load occurring in a recycling of the product, using the evaluation condition and the parts/material data;
- an analysis unit configured to analyze an obstruction factor of the recyclability and an aggravation factor of the environmental load based on an evaluation result of the evaluation unit;
- a first display unit configured to display a remedy for the obstruction factor and the aggravation factor according to an analysis result of the analysis unit;
- an update unit configured to update the evaluation condition and the parts/material data used in the evaluation by the evaluation unit, based on the remedy displayed on the first display unit;
- a second evaluating unit configured to evaluate the recyclability of the product and the environment load, using updated evaluation condition and parts/material data which are obtained by the update unit;
- a second displaying unit configured to display an evaluation result of the second evaluating unit; and
- a conversion unit configured to convert the parts/material data used in evaluation by the second evaluation unit to Computer Aided Design (CAD) data including names of parts composing the product, a quantity of the parts or a number of the parts.

9. A method for supporting a design of a product comprising:
- evaluating a recyclability of the product based on parts/material data including parts composing a product, kinds of materials composing the parts and mass of each of the materials that differ in kind;
- analyzing an obstruction factor of the recyclability of the product based on an evaluation result of the recyclability;
- displaying a remedy for the obstruction factor according to an analysis result; and
- updating evaluation condition and the parts/material data used in the evaluation according to the remedy displayed, and displaying the evaluation result of the recyclability based on updated evaluation condition and parts/material data.

10. The method according to claim 9, which includes converting the updated parts/material data to CAD data including names of parts composing the product, a quantity of the parts and a number of the parts.

11. The method according to claim 9, which includes displaying part/material having a higher recyclability than the part/materials and used as a substitute for the part/materials corresponding to the obstruction factor as a recyclability remedy.

12. The method according to claim 9, which includes displaying a demountable portion of the part/material corresponding to the obstruction factor as a recyclability remedy.

* * * * *